(12) United States Patent
Takemoto et al.

(10) Patent No.: US 11,307,400 B2
(45) Date of Patent: Apr. 19, 2022

(54) ZOOM LENS AND IMAGE PICKUP APPARATUS

(71) Applicant: CANON KABUSHIKI KAISHA, Tokyo (JP)

(72) Inventors: Shoichi Takemoto, Saitama (JP); Tomoya Yamada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 101 days.

(21) Appl. No.: 16/507,482

(22) Filed: Jul. 10, 2019

(65) Prior Publication Data

US 2020/0018946 A1    Jan. 16, 2020

(30) Foreign Application Priority Data

Jul. 13, 2018 (JP) .............................. JP2018-133622

(51) Int. Cl.
*G02B 23/00* (2006.01)
*G03B 13/10* (2021.01)
(Continued)

(52) U.S. Cl.
CPC .............. *G02B 23/145* (2013.01); *G02B 3/14* (2013.01); *G02B 7/10* (2013.01); *G02B 15/14* (2013.01); *G03B 13/10* (2013.01)

(58) Field of Classification Search
CPC .............. H04N 5/2254; H04N 5/23209; H04N 5/23296; H04N 5/232; H04N 5/2251; H04N 5/23212; H04N 5/238; H04N 13/236; H04N 5/225; H04N 5/23241; H04N 5/23299; H04N 5/77; H04N 5/907; H04N 9/3176; H04N 9/7921; G02B 15/173; G02B 15/177; G02B 15/14; G02B 15/144113; G02B 13/009; G02B 15/143507; G02B 27/646; G02B 15/00; G02B 3/14; G02B 15/144511; G02B 3/0081; G02B 7/102;
(Continued)

(56) References Cited

U.S. PATENT DOCUMENTS 9,645,369 B2    5/2017    Takemoto
9,709,781 B2    7/2017    Takemoto
(Continued)

FOREIGN PATENT DOCUMENTS

JP        2016099396 A    5/2016
JP        2017068095 A    4/2017

*Primary Examiner* — William R Alexander
*Assistant Examiner* — Sharrief I Broome
(74) *Attorney, Agent, or Firm* — Carter, DeLuca & Farrell LLP

(57) ABSTRACT

A zoom lens includes: a master lens including in order from an object side: a positive first lens unit configured not to move for zooming; a negative second lens unit configured to move for zooming; at least one lens unit configured to move for zooming; and a positive relay lens unit arranged closest to the image side; and an extender lens unit configured to change a focal length range of the zoom lens by one of: being inserted in place of a lens unit arranged adjacent to the relay lens unit on the object side; and being inserted into a space adjacent to the positive relay lens unit on the object side, wherein the extender lens unit includes a positive lens Gp, and an Abbe number and a partial dispersion ratio of the positive lens Gp are suitably set.

14 Claims, 31 Drawing Sheets

(51) Int. Cl.
*G02B 7/10* (2021.01)
*G02B 3/14* (2006.01)
*G02B 15/14* (2006.01)

(58) Field of Classification Search
CPC ............... G02B 13/0045; G02B 15/17; G02B 27/0025; G02B 13/18; G02B 15/1421; G02B 15/144109; G02B 15/145113; G02B 15/145129; G03B 2205/0046; G03B 17/00; G03B 17/17; G03B 5/00; G03B 13/32; G03B 13/36; G03B 15/00; G03B 17/06; G03B 17/14; G03B 17/54; G03B 19/00; G03B 19/14; G03B 21/005; G03B 21/14; G03B 21/142; G03B 21/28; G03B 2205/0007; G03B 2205/0084; G03B 2217/007; G03B 3/10

See application file for complete search history.

(56) References Cited

U.S. PATENT DOCUMENTS

| | | | |
|---|---|---|---|
| 9,739,986 | B2 | 8/2017 | Wakazono et al. |
| 9,897,803 | B2 | 2/2018 | Sanjo et al. |
| 9,904,044 | B2 | 2/2018 | Kikuchi et al. |
| 10,095,010 | B2 | 10/2018 | Takemoto |
| 10,168,546 | B2 | 1/2019 | Takemoto et al. |
| 2014/0118607 | A1* | 5/2014 | Takemoto ......  G02B 15/145129 348/345 |
| 2015/0362711 | A1* | 12/2015 | Wakazono ......... G02B 15/1441 359/684 |
| 2016/0054549 | A1* | 2/2016 | Takemoto .......... H04N 5/23296 359/683 |
| 2016/0124199 | A1* | 5/2016 | Sanjo .................... G02B 15/17 359/684 |
| 2016/0187628 | A1* | 6/2016 | Sanjo .................... G02B 15/10 359/674 |
| 2018/0045929 | A1 | 2/2018 | Takemoto |
| 2018/0292627 | A1 | 10/2018 | Takemoto |
| 2018/0356617 | A1 | 12/2018 | Yamada et al. |

* cited by examiner

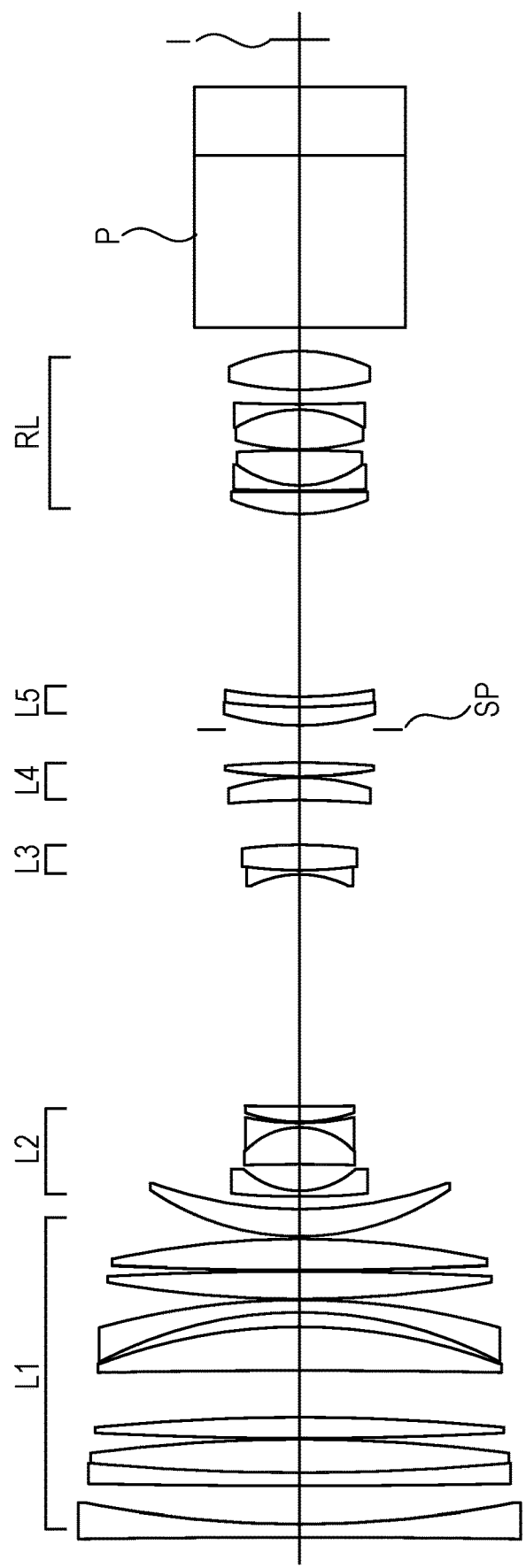

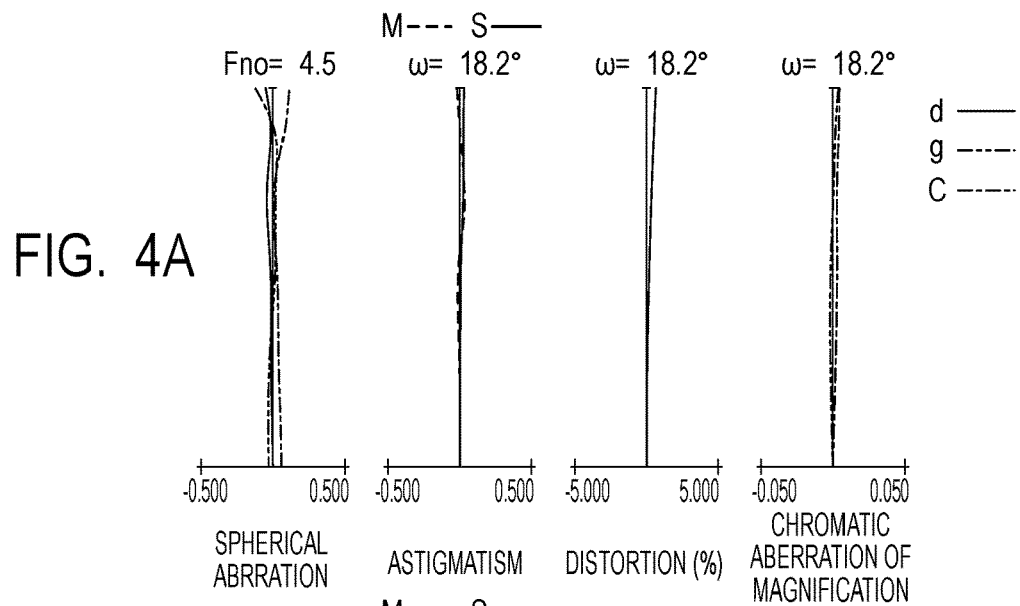
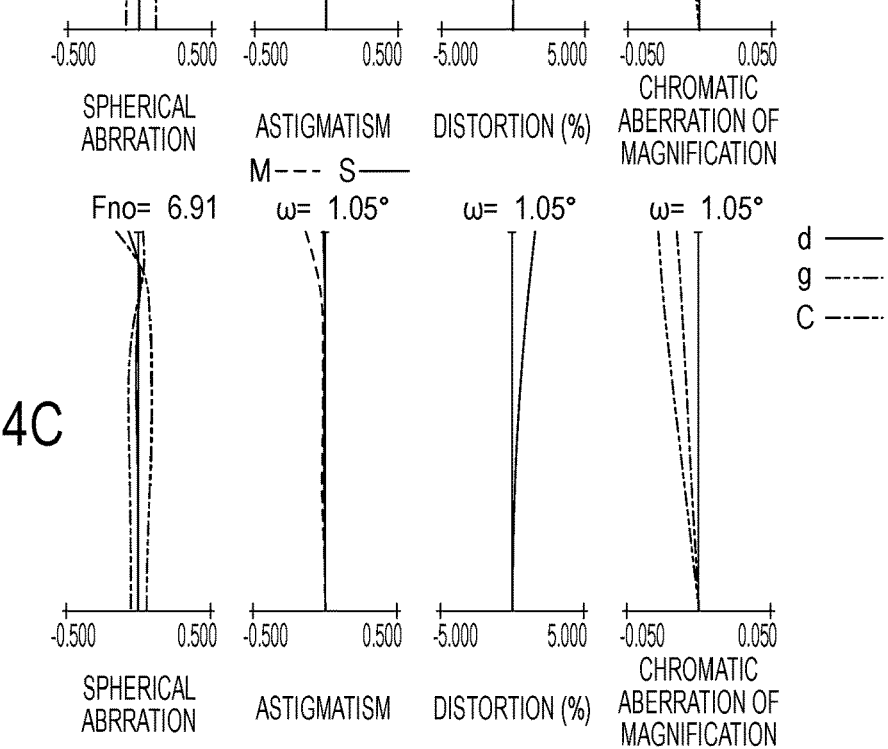
FIG. 4A
FIG. 4B
FIG. 4C

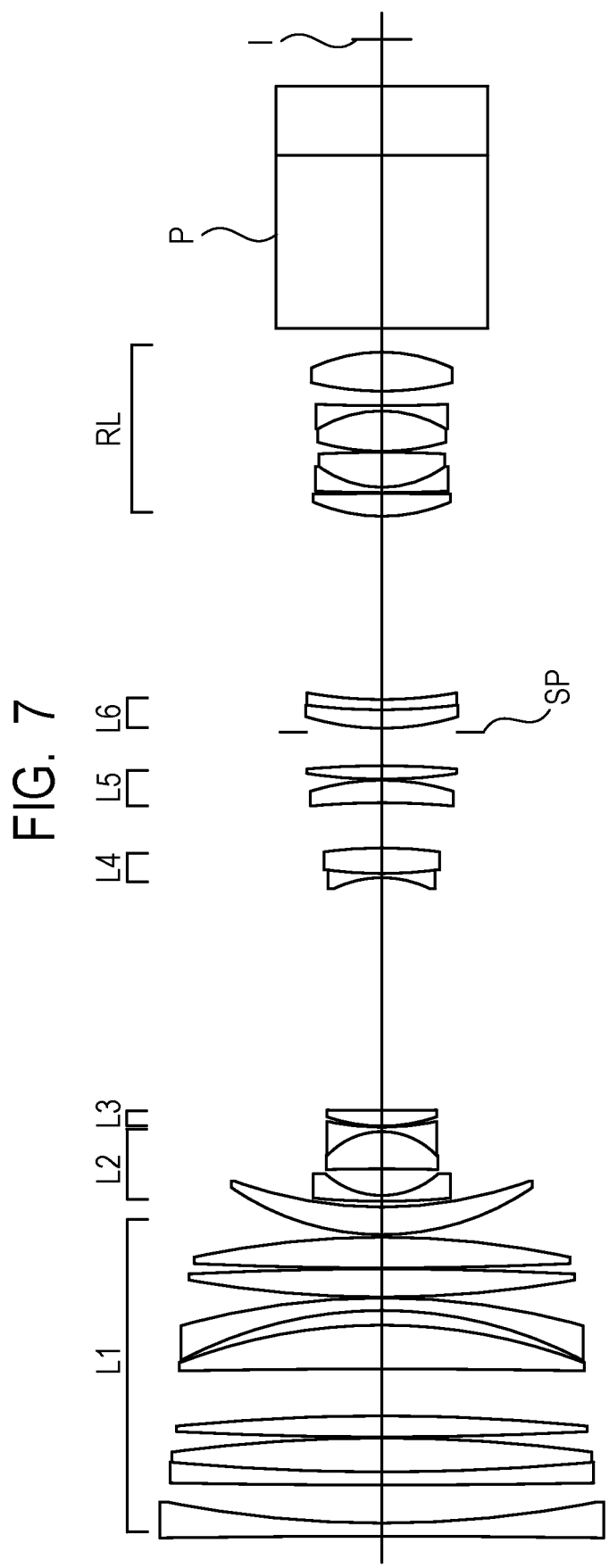

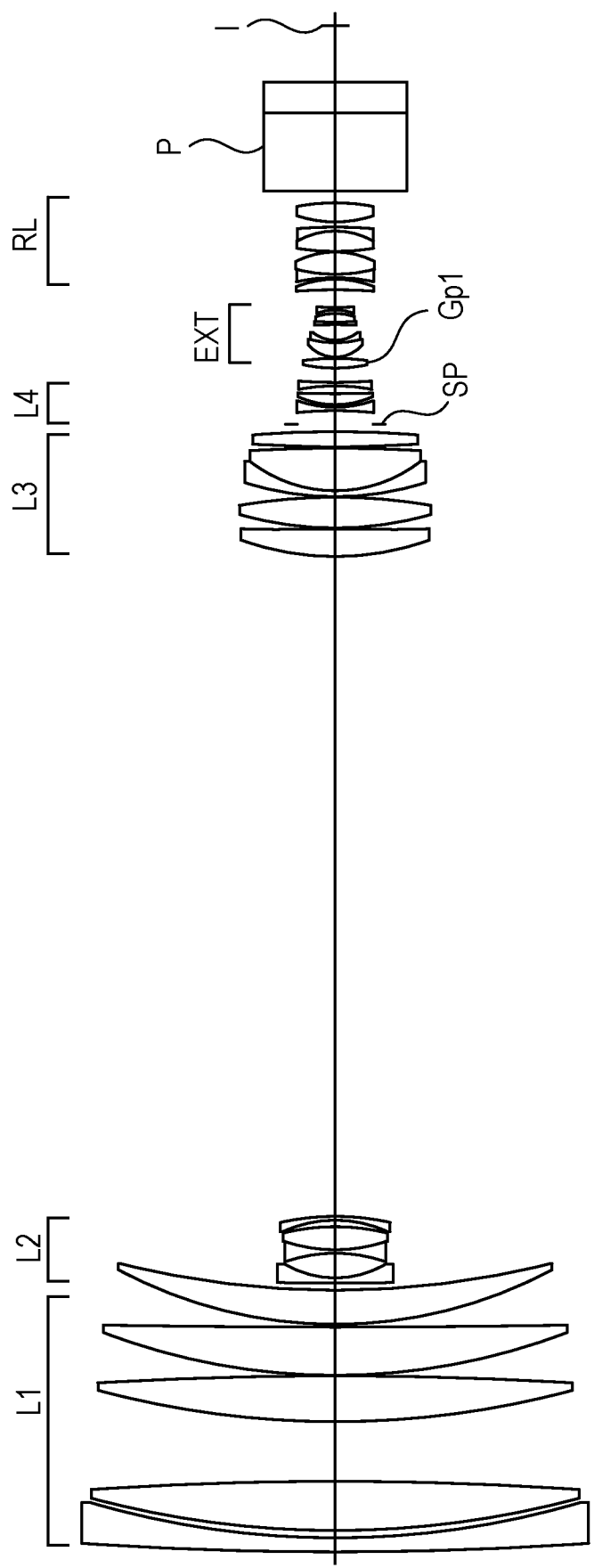

ZOOM LENS AND IMAGE PICKUP APPARATUS

BACKGROUND OF THE INVENTION

Field of the Invention

The aspect of the embodiments relates to a zoom lens and an image pickup apparatus.

Description of the Related Art

For image pickup apparatus such as a television camera and a video camera, there has been demanded a zoom lens having a high zoom ratio (high magnification-varying ratio) and high optical performance. Further, as a method of obtaining a wide focal length range by shifting a focal length range toward a telephoto side in the zoom lens, an internal extender mechanism (built-in extender mechanism) has been known. In the internal extender mechanism, in a relay lens unit, an extender lens unit is inserted into or removed from a secured space or a space in which a part of lenses is retracted, to thereby change the focal length range of the zoom lens to a long focal length side.

As a zoom lens for a broadcasting television camera including a ⅔-inch image pickup element, there has been known a zoom lens having built therein an extender lens unit for changing a focal length range to a long focal length side (Japanese Patent Application Laid-Open No. 2017-68095 and Japanese Patent Application Laid-Open No. 2016-99396).

In the zoom lens employing the internal extender mechanism described above, a longitudinal aberration is increased by insertion of the extender, and a magnification of the increase is a square of a magnification of the extender. When the number of pixels of an image pickup element is increased along with an increase in resolution of an image pickup apparatus, the area of each pixel becomes smaller, and hence color bleeding due to an axial chromatic aberration may be conspicuous. It is therefore important to reduce, in particular, a secondary spectrum of the axial chromatic aberration. Correction of the chromatic aberration for specific two wavelengths is also called "achromatization for two wavelengths (primary spectrum correction)". Correction of the chromatic aberration for specific three wavelengths, which is obtained by adding a further specific wavelength, is also called "secondary spectrum correction". In order to correct the secondary spectrum of the axial chromatic aberration generated when the extender lens unit is inserted while increasing an extender magnification, it is required to reduce the secondary spectrum of the axial chromatic aberration within the extender lens unit. To achieve this, it is important to select an appropriate partial dispersion ratio of a glass material to be used in the extender lens unit. However, there is no description regarding the partial dispersion ratio in any of Japanese Patent Application Laid-Open No. 2017-68095 and Japanese Patent Application Laid-Open No. 2016-99396.

SUMMARY OF THE INVENTION

The aspect of the embodiments is directed to, for example, a zoom lens including an extender lens unit, beneficial in correction of a secondary spectrum of an axial chromatic aberration.

According to an aspect of the embodiments, a zoom lens includes: a master lens including in order from an object side to an image side: a first lens unit having a positive refractive power and configured not to move for zooming; a second lens unit having a negative refractive power and configured to move for zooming; at least one lens unit configured to move for zooming; and a relay lens unit having a positive refractive power and arranged closest to the image side; and an extender lens unit configured to change a focal length range of the zoom lens by one of: being inserted in place of a lens unit arranged adjacent to the relay lens unit on the object side; and being inserted into a space adjacent to the relay lens unit on the object side, wherein the extender lens unit includes a positive lens Gp, and the positive lens Gp satisfies conditional expressions $$\theta gF - (-1.6650 \times 10^{-7} \cdot vd^3 + 5.2130 \times 10^{-5} \cdot vd^2 - 5.6560 \times 10^{-3} \cdot vd + 0.7370) > 0;$$

$$0.5450 < \theta gF; \text{ and}$$

$$50.0 < vd < 85.0,$$

where $vd$ and $\theta gF$ represent an Abbe number and a partial dispersion ratio of the positive lens Gp, respectively, wherein an Abbe number $vd$ and a partial dispersion ratio $\theta gF$ of a material are expressed by expressions:

$$vd = (Nd-1)/(NF-NC); \text{ and}$$

$$\theta gF = (Ng-NF)/(NF-NC), \text{respectively,}$$

where Ng, NF, NC, and Nd represent refractive indices of the material with respect to a g-line (wavelength of 435.8 nm), an F-line (wavelength of 486.1 nm), a C-line (wavelength of 656.3 nm), and a d-line (wavelength of 587.6 nm), respectively.

Further features of the present invention will become apparent from the following description of exemplary embodiments with reference to the attached drawings.

BRIEF DESCRIPTION OF THE DRAWINGS

FIG. 1 is a lens cross-sectional view of a master lens M1 when focus is at an object at infinity at a wide angle end.

FIG. 4A is an aberration diagram of the master lens M2 when focus is at an object at infinity at the wide angle end.

FIG. 4B is an aberration diagram of the master lens M2 when focus is at an object at infinity at an intermediate zoom position.

FIG. 4C is an aberration diagram of the master lens M2 when focus is at an object at infinity at a telephoto end.

FIG. 7 is a lens cross-sectional view of a master lens M4 when focus is at an object at infinity at a wide angle end.

FIG. 21 is a lens cross-sectional view when an extender lens unit IE7 is inserted into the master lens M3 in Example 7 (Numerical Example 7) of the present invention and focus is at an object at infinity at the wide angle end.

DESCRIPTION OF THE EMBODIMENTS

Figure 2A:
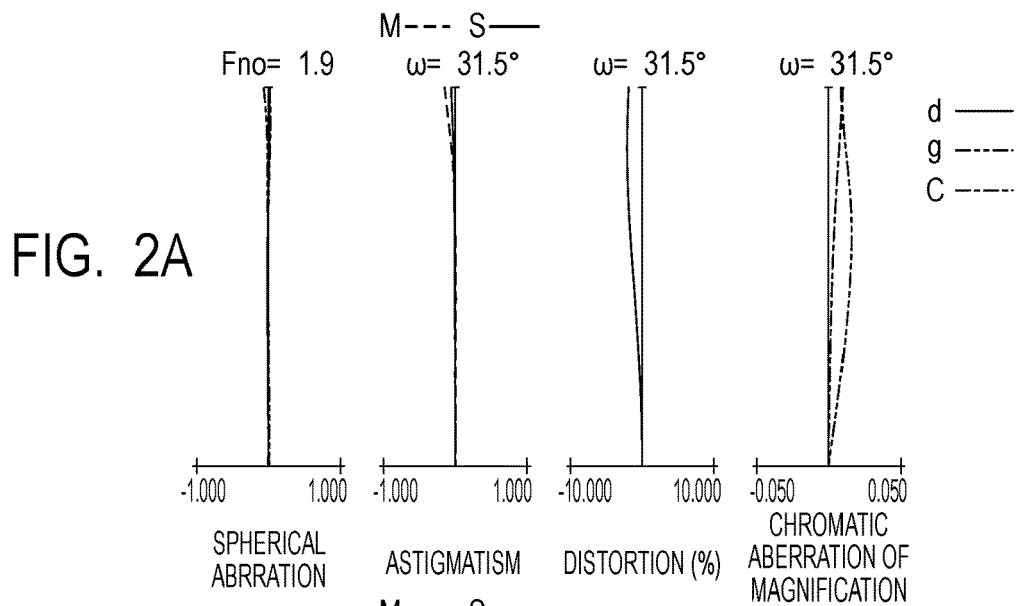
FIG. 2A is an aberration diagram of the master lens M1 when focus is at an object at infinity at the wide angle end.

Now, exemplary embodiments of the present invention are described in detail with reference to the attached drawings. The description is given by way of features of lens configurations of Numerical Examples 1 to 10 of the present invention, which correspond to Examples 1 to 10 of the present invention, respectively. Master lenses M1 to M4 are described in Numerical Examples 1, 5, 7, and 10, respectively.

In each lens cross-sectional view, a left side is an object side (front side) and an image pickup optical system side, and a right side is an image side (rear side).

Example 1

Example 1 corresponds to Numerical Example 1, and has a configuration in which an extender lens unit IE1 is inserted into the master lens M1.

First, the master lens M1 corresponding to Numerical Example 1 is described. FIG. 1 is a lens cross-sectional view of the master lens M1 when focus is at an object at infinity at a wide angle end. A first lens unit L1 having a positive refractive power is configured not to move for zooming. A part of lens sub-units included in the first lens unit L1 is configured to move during focusing from an object at infinity to an object at close distance. A second lens unit L2 having a negative refractive power for zooming is configured to move toward the image side during zooming from the wide angle end (short focal length end) to a telephoto end (long focal length end). A third lens unit L3 having a negative refractive power for zooming is configured to move on an optical axis during zooming from the wide angle end to the telephoto end. A fourth lens unit L4 having a positive refractive power is configured to correct an image plane variation accompanying zooming. A positive fifth lens unit L5 includes an aperture stop SP configured not to move during zooming, and is configured not to move during zooming. A relay lens unit RL is configured not to move during zooming, and has an image forming action. An optical element P is a prism, for example. An image plane I corresponds to an image pickup surface of a solid-state image pickup element (photoelectric transducer).

Next, a configuration of the master lens unit M1 is described. In the following, the lenses are arranged in order from the object side to the image side.

The first lens unit L1 consists of nine lenses of a negative lens, a negative lens, a positive lens, a positive lens, a positive lens, a negative lens, a positive lens, a positive lens, and a positive lens. During focusing, four lenses, namely, the fifth to eighth lenses of the first lens unit from the object side move toward the object side during focusing from the object at infinity to the object at close distance, and one positive lens closest to the image side moves toward the object side along with the movement. The second lens unit L2 consists of a negative lens, a cemented lens of a positive lens and a negative lens, and a positive lens. The third lens unit L3 consists of a cemented lens of a negative lens and a positive lens. The fourth lens unit L4 consists of a positive lens and a positive lens. During zooming, the second lens unit, the third lens unit, and the fourth lens unit move. The fifth lens unit L5 consists of a cemented lens of a positive lens and a negative lens. The relay lens unit RL consists of a positive lens, a cemented lens of a negative lens and a positive lens, a cemented lens of a positive lens and a negative lens, and a positive lens.

Figure 9:
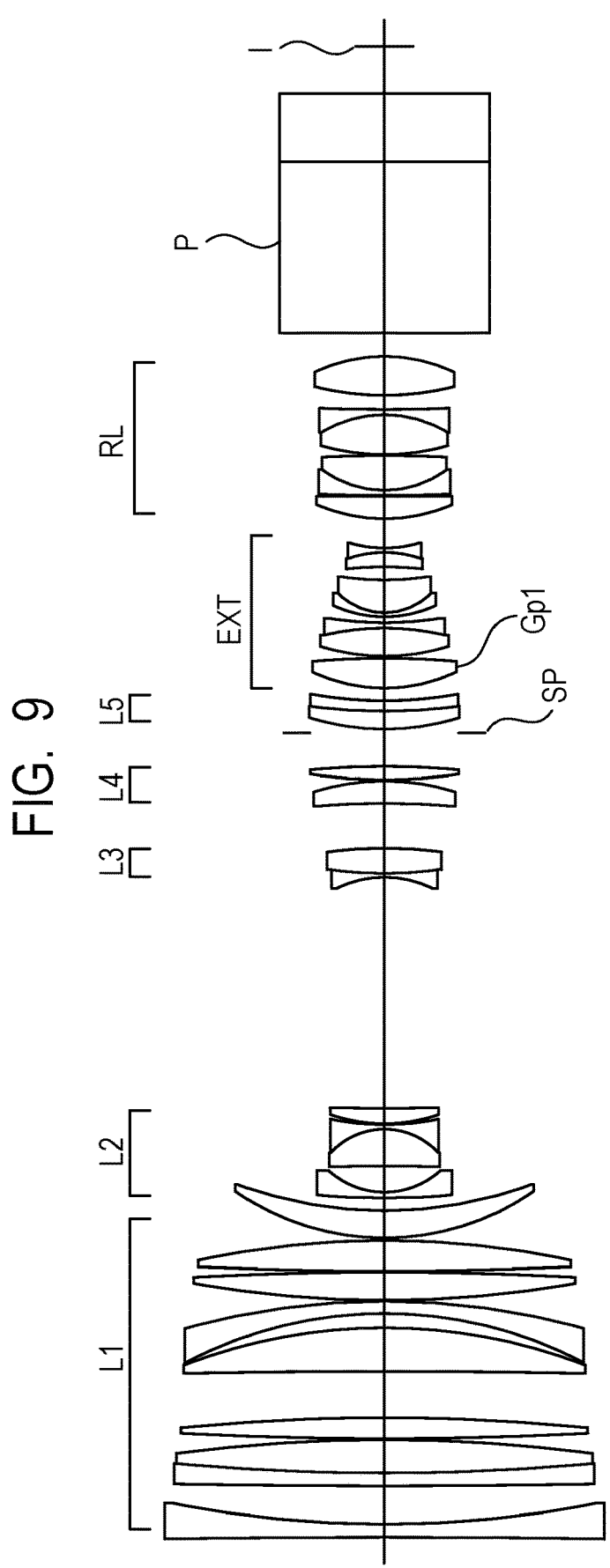
FIG. 9 is a lens cross-sectional view when an extender lens unit IE1 is inserted into the master lens M1 in Example 1 (Numerical Example 1) of the present invention and focus is at an object at infinity at the wide angle end.

Next, the extender lens unit IE1, which is configured to increase the focal length of the entire system of the zoom lens to double by being inserted on the object side of the relay lens unit RL of the master lens M1, is described. FIG. 9 is a cross-sectional view when the extender lens unit IE1 is inserted into the master lens M1 and focus is at an object at infinity at a wide angle end in the zoom lens according to Example 1 (Numerical Example 1) of the present invention. The extender lens unit IE1 in Example 1 corresponds to surface numbers IE01 to IE11. The extender lens unit IE1 consists of, in order from the object side, a positive lens being a positive lens Gp (Gp1) described later, a cemented lens of a positive lens and a negative lens, a cemented lens of a negative lens and a positive lens, and a cemented lens of a positive lens and a negative lens.

The zoom lens of each Example includes the master lens including, in order from the object side to the image side, the first lens unit having a positive refractive power, which is configured not to move for zooming, the second lens unit having a negative refractive power, which is configured to move for zooming, at least one unit configured to move for zooming, and the relay lens unit having a positive refractive power, which is arranged closest to the image side. The zoom lens of each Example further includes the extender lens unit configured to change the focal length range of the entire master lens to a long focal length side by replacing a lens unit adjacent to the relay lens unit on the object side or by being inserted into a space adjacent to the relay lens unit on the object side. The zoom lens has a feature in that at least one of the positive lenses of the extender lens unit is the positive lens (lens element) Gp made of a material satisfying the following conditional expressions.

$$\theta gF-(-1.6650\times10^{-7}\cdot vd^3+5.2130\times10^{-5}\cdot vd^2-5.6560\times 10^{-3}\cdot vd+0.7370)>0 \quad (1)$$

$$0.5450<\theta gF \quad (2)$$

$$50.0<vd<85.0 \quad (3).$$

When refractive indices of a material with respect to a g-line (wavelength: 435.8 nm), an F-line (wavelength: 486.1 nm), a C-line (wavelength: 656.3 nm), and a d-line (wavelength: 587.6 nm) of the Fraunhofer lines are represented by Ng, NF, NC, and Nd, respectively, an Abbe number "vd" and a partial dispersion ratio θgF of the material are defined as the following conditional expressions:

$$vd=(Nd-1)/(NF-NC); \text{ and}$$

$$\theta gF=(Ng-NF)/(NF-NC).$$

Figure 30:
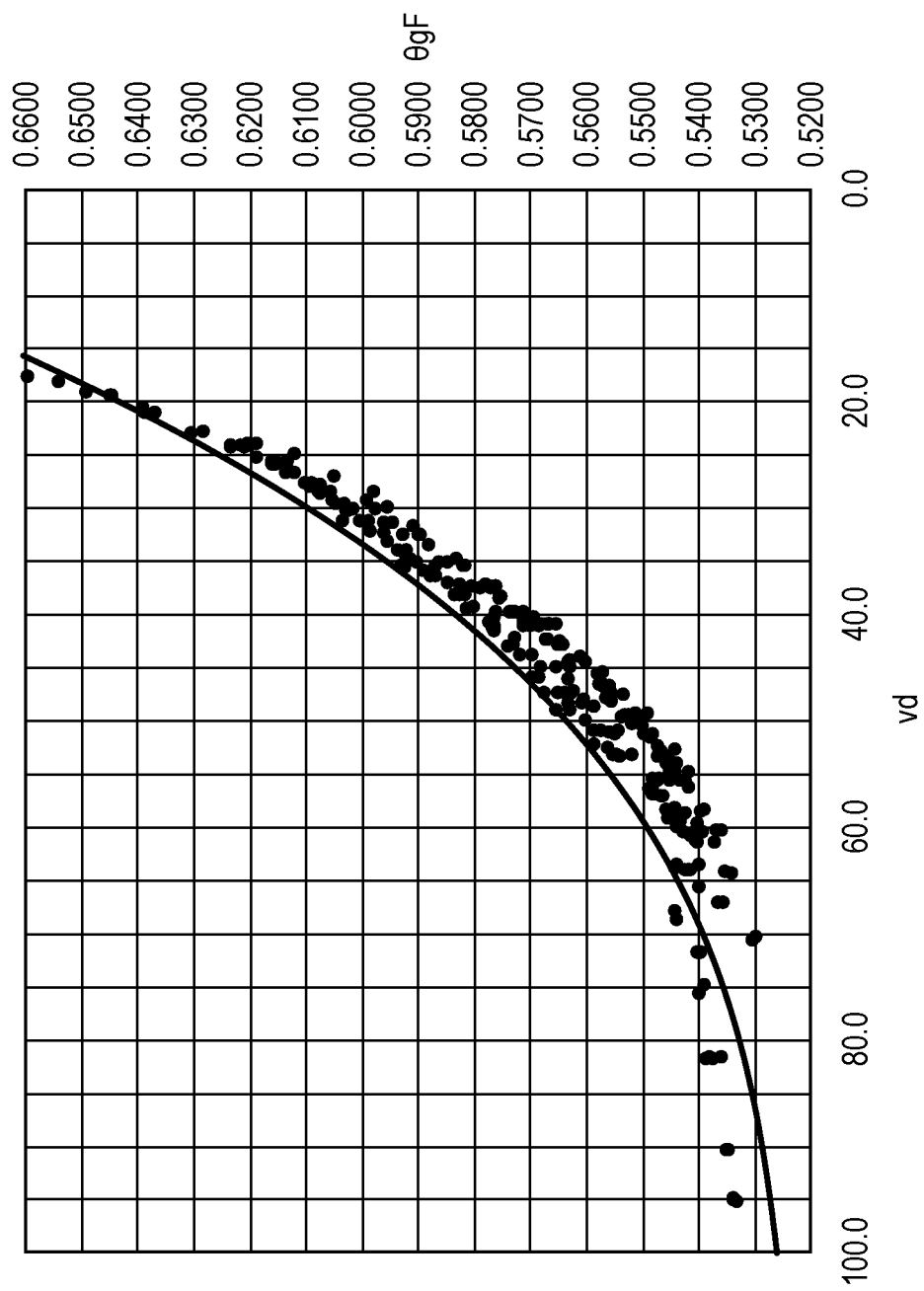
FIG. 30 is a θgF-vd graph.
Figure 31:
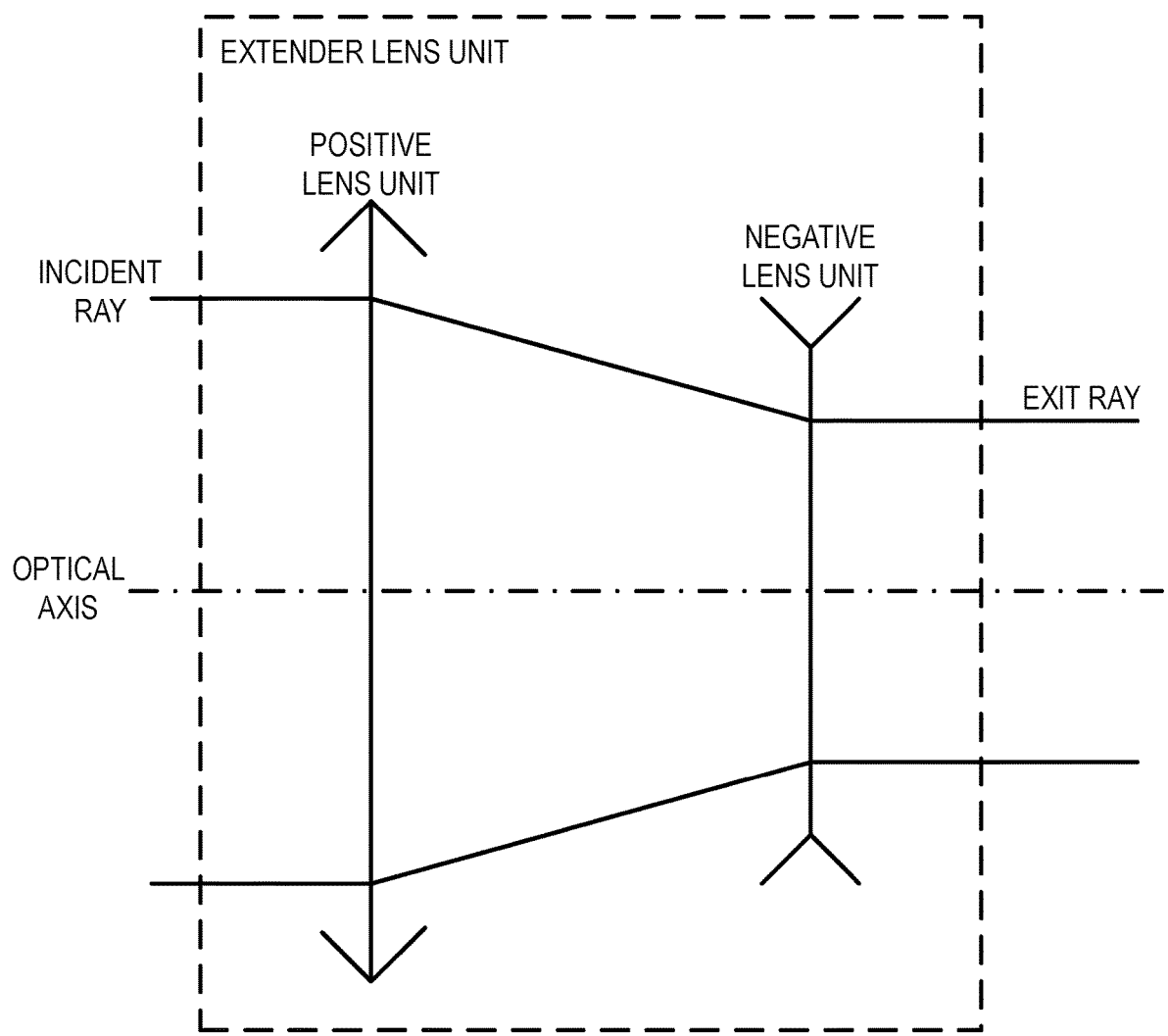
FIG. 31 is a schematic diagram of an extender lens unit in at least one embodiment of the present invention.

The conditional expressions (1) and (2) define the partial dispersion ratio θgF of the material of the positive lens Gp included in the extender lens unit. FIG. 30 is a graph having the Abbe number "vd" as the horizontal axis and the partial dispersion ratio θgF as the vertical axis, which is obtained by plotting values corresponding to existing optical glass materials. As shown in FIG. 30, the existing optical glass materials have such a tendency that the partial dispersion ratio θgF is distributed in a narrow range with respect to the Abbe number "vd", and the partial dispersion ratio θgF becomes larger as the Abbe number "vd" becomes smaller. FIG. 31 is a schematic diagram of the extender lens unit in at least one embodiment of the present invention. As illustrated in FIG. 31, the extender lens unit is configured such that a ray entering the extender lens unit as a parallel ray or a substantially parallel ray is converted into a convergent ray by a positive lens unit having a positive refractive power and the ray is emitted as a parallel ray or a substantially parallel ray from a negative lens unit having a negative refractive power.

In order to suppress a secondary spectrum of an axial chromatic aberration in the extender lens unit, a secondary spectrum of the axial chromatic aberration is required to be suppressed in each of the positive lens unit and the negative lens unit forming the extender lens unit. In the positive lens unit, the refractive power of a positive lens is stronger than that of a negative lens, and hence, in order to suppress an axial chromatic aberration generated in the positive lens, the positive lens is required to be made of a material having a small dispersion (having a large Abbe number) than that of the negative lens. However, the existing optical glass materials have such a tendency that θgF becomes larger as "vd" becomes smaller, and hence the partial dispersion ratio of the positive lens becomes relatively smaller, and the secondary spectrum is thus under corrected. Through application of a glass material satisfying the conditional expressions (1) and (2) to the positive lens included in the extender lens unit, under correction of the secondary spectrum of the axial chromatic aberration generated in the above-mentioned positive lens unit is solved, to thereby be able to suppress the secondary spectrum of the axial chromatic aberration caused by the extender lens unit. When the value of the conditional expression (1) falls below the lower limit value of the conditional expression (1) to become too smaller, it becomes difficult to suppress the secondary spectrum of the axial chromatic aberration generated when the extender lens unit is inserted. In FIG. 30, the solid line indicates a curved line satisfying the conditional expression (1).

The conditional expression (3) defines the Abbe number "vd" of the positive lens Gp included in the extender lens unit. When the value of the conditional expression (3) exceeds the upper limit value of the conditional expression (3) such that the Abbe number "vd" becomes too larger, the refractive index becomes smaller in general, and a curvature radius of each surface becomes smaller. Thus, a lens thickness required to secure a sufficient edge thickness is increased, and hence the zoom lens is disadvantageously upsized. In contrast, when the value of the conditional expression (3) falls below the lower limit value of the conditional expression (3) such that the Abbe number "vd" becomes too smaller, primary achromatization is under corrected, and hence it becomes difficult to obtain high optical performance.

In each of Examples, it is preferred to set the numerical ranges of the conditional expression (1) to the conditional expression (3) as follows.

$$\theta gF-(-1.6650\times10^{-7}\cdot vd^3+5.2130\times10^{-5}\cdot vd^2-5.6560\times 10^{-3}\cdot vd+0.7398)>0 \quad (1a)$$

$$0.5490<\theta gF<0.600 \quad (2a)$$

$$50.0<vd<81.0 \quad (3a).$$

Moreover, it is further preferred to set the numerical ranges of the conditional expression (2a) and the conditional expression (3a) as follows.

$$0.5490<\theta gF<0.5950 \quad (2b)$$

$$54.0<vd<67.0 \quad (3b).$$

In another mode of the zoom lens according to at least one embodiment of the present invention, it is desired to satisfy the following conditional expression:

$$1.3<fiew/fw<3.0 \quad (4).$$

In this expression, "fw" represents a focal length of the entire system of the zoom lens at the wide angle end in a state in which the extender lens unit is removed from the zoom lens, and "fiew" represents a focal length of the entire system of the zoom lens at the wide angle end in a state in which the extender lens unit is inserted into the zoom lens. The conditional expression (4) represents a ratio between the focal lengths of the entire system of the zoom lens at the wide angle end exhibited before and after the extender lens unit is inserted, and defines an extender magnification.

When the ratio of the conditional expression (4) exceeds the upper limit value of the conditional expression (4), the refractive power of each lens unit included in the extender lens becomes stronger, and hence a spherical aberration and a field curvature generated when the extender lens is inserted disadvantageously deteriorate. In contrast, when the ratio of the conditional expression (4) falls below the lower limit value of the conditional expression (4), the extender magnification becomes lower, and hence the function as the extender lens unit becomes disadvantageously insufficient.

It is more preferred to set the conditional expression (4) as follows:

$$1.35<fiew/fw<2.80 \quad (4a).$$

In another mode of the zoom lens according to at least one embodiment of the present invention, it is desired to satisfy the following conditional expression:

$$0 < LGp1/Lie < 0.4 \qquad (5).$$

In this expression, Lie represents a distance from a position of an apex of a surface of the extender lens unit closest to the object side to a position of an apex of a surface of the extender lens unit closest to the image side. Further, LGp1 represents a distance from the position of the apex of the surface of the extender lens unit closest to the object side to a position of an apex of a surface on the object side of a positive lens Gp1, which is arranged closest to the object side in the positive lens Gp. The conditional expression (5) defines a ratio of the distance from the surface of the extender lens unit closest to the object side to the positive lens Gp1, to the total length of the extender lens unit. When the ratio of the conditional expression (5) exceeds the upper limit value of the conditional expression (5), the positive lens Gp1 is arranged further on the image side in the extender lens unit, and hence an axial ray is arranged at a more converged position. As a result, the effect of correction of the secondary spectrum of the axial chromatic aberration in the positive lens unit described above becomes weaker, and hence it becomes difficult to suppress the secondary spectrum of the axial chromatic aberration generated when the extender lens unit is inserted.

It is more preferred to set the conditional expression (5) as follows:

$$0 < LGp1/Lie < 0.3 \qquad (5a).$$

As a further aspect of the zoom lens according to at least one embodiment of the present invention, it is preferred that the extender lens unit consist of, in order from the object side, a positive lens and three cemented lenses. With this configuration, it becomes easier to correct a Petzval sum of the extender lens unit, and hence it is possible to suppress the field curvature generated when the extender lens unit is inserted.

As a further aspect of the zoom lens according to at least one embodiment of the present invention, it is preferred that the extender lens unit consist of, in order from the object side, at least one positive lens and two cemented lenses. With this configuration, the spherical aberration and the axial chromatic aberration can be suitably corrected with a small number of lenses, and hence it is possible to achieve both downsizing and high optical performance.

As a further aspect of the zoom lens according to at least one embodiment of the present invention, it is preferred that the extender lens unit consist of, in order from the object side, one positive lens, two cemented lenses, and one negative lens. With this configuration, the negative refractive power of the negative lens unit included in the extender lens described above can be increased, and hence it is possible to increase the extender magnification without increasing the total length of the extender lens unit.

In another mode of the zoom lens according to at least one embodiment of the present invention, it is desired to satisfy the following conditional expression:

$$1.50 < NdGp < 1.75 \qquad (6).$$

In this expression, NdGp represents a refractive index of the positive lens Gp with respect to the d-line.

The conditional expression (6) defines the refractive index of the positive lens Gp. When the value of the conditional expression (6) exceeds the upper limit value of the conditional expression (6), the Petzval sum deteriorates, and hence it becomes difficult to correct the field curvature. In contrast, when the value of the conditional expression (6) falls below the lower limit value of the conditional expression (6), a curvature radius of each surface becomes smaller in order to allow the positive lens Gp to obtain a predetermined refractive power, and hence the spherical aberration disadvantageously deteriorates.

It is more preferred to set the conditional expression (6) as follows:

$$1.52 < NdGp < 1.70 \qquad (6a).$$

Figure 2B:
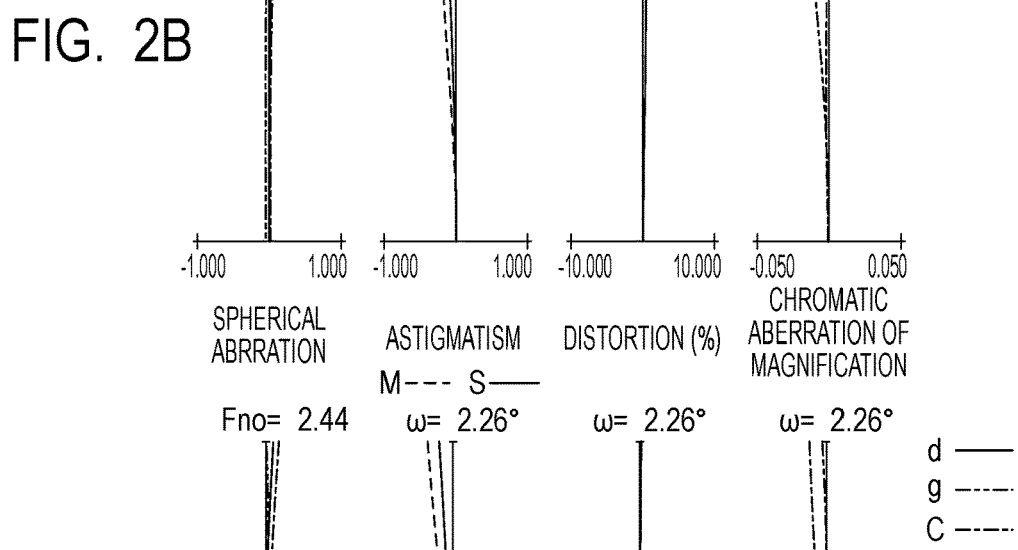
FIG. 2B is an aberration diagram of the master lens M1 when focus is at an object at infinity at an intermediate zoom position.
Figure 2C:
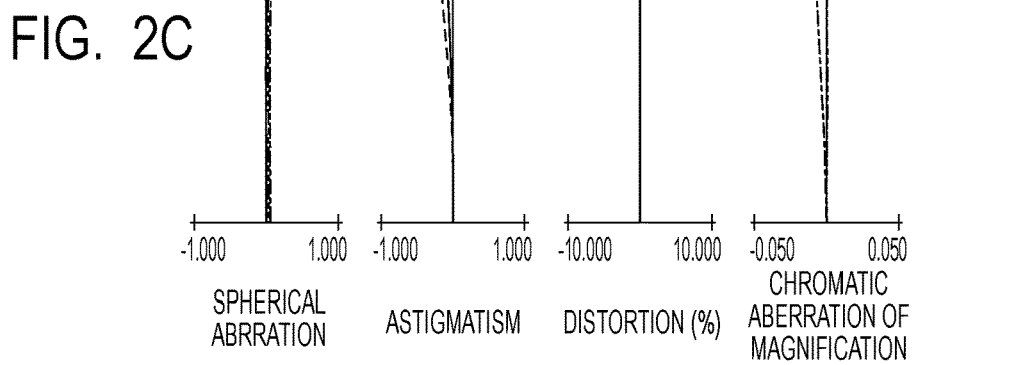
FIG. 2C is an aberration diagram of the master lens M1 when focus is at an object at infinity at a telephoto end.

FIG. 2A, FIG. 2B, and FIG. 2C are longitudinal aberration diagrams of the master lens M1 when focus is at an object at infinity at the wide angle end, a focal length of 72.7 mm, and the telephoto end, respectively. The value of the focal length is a value obtained when expressing Numerical Example, which is described later, in units of mm. In the aberration diagrams, the spherical aberration, the astigmatism, the distortion, and the chromatic aberration of magnification are drawn on scales of 1.00 mm, 1.00 mm, 10%, and 0.050 mm, respectively. Symbol Fno represents an f-number, and symbol "ω" represents a half angle of view. The wide angle end and the telephoto end refer to zoom positions at the time when the second lens unit L2 for zooming is located at both ends of the range in which the second lens unit L2 is mechanically movable on the optical axis. This also applies to each of the following Examples.

In all Numerical Examples without limiting to the master lens M1, the order of a surface (optical surface) from the object side is represented by "i", a curvature radius of the i-th surface from the object side is represented by "ri", and an interval between the i-th surface and the (i+1)-th surface from the object side (on the optical axis) is represented by "di". Moreover, a refractive index and an Abbe number with respect to a medium (optical member) between the i-th surface and the (i+1)-th surface are represented by "ndi" and "vdi", respectively, and a back focus is represented by BF. An aspherical shape in aspherical data is expressed by the following expression:

$$X = \frac{H^2/R}{1 + \sqrt{1-(1+k)(H/R)^2}} + A3H^3 + A4H^4 +$$
$$A5H^5 + A6H^6 + A7H^7 + A8H^8 + A9H^9 + A10H^{10} +$$
$$A11H^{11} + A12H^{12} + A13H^{13} + A14H^{14} + A15H^{15} + A16H^{16}$$

where the X axis corresponds to an optical axis direction, the H axis corresponds to a direction perpendicular to the optical axis, a light propagation direction is a positive direction in the X axis, R represents a paraxial curvature radius, "k" represents a conic constant, and A3, A4, A5, A6, A7, A8, A9, A10, A11, A12, A13, A14, A15, and A16 each represent an aspherical coefficient.

Moreover, "e-Z" means "$\times 10^{-Z}$". The half angle of view is a value obtained by ray tracing.

Figure 10A:
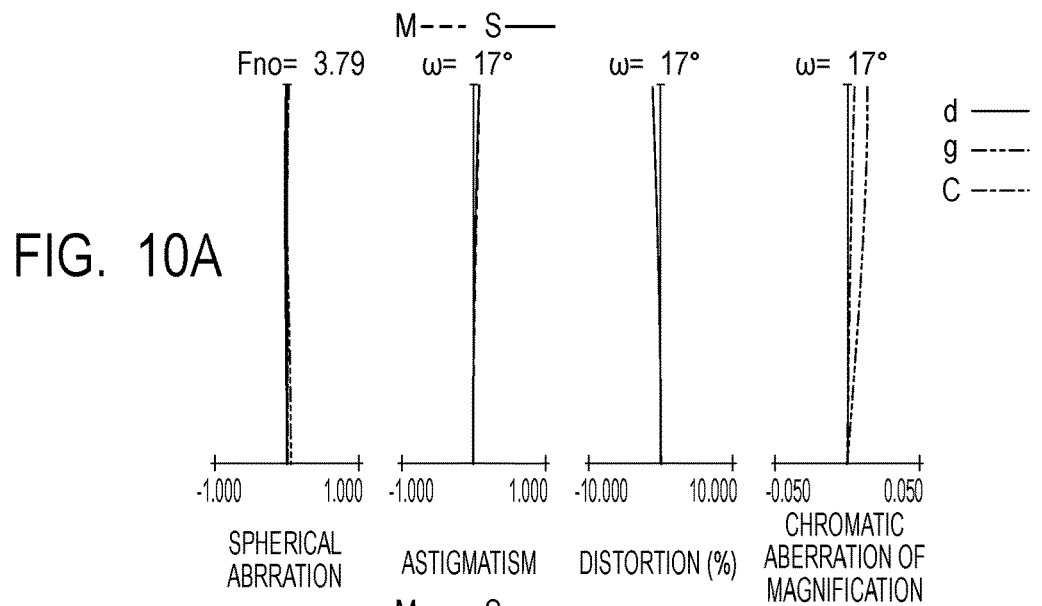
FIG. 10A is an aberration diagram when the extender lens unit IE1 is inserted into the master lens M1 in Numerical Example 1 and focus is at an object at infinity at the wide angle end.
Figure 10B:
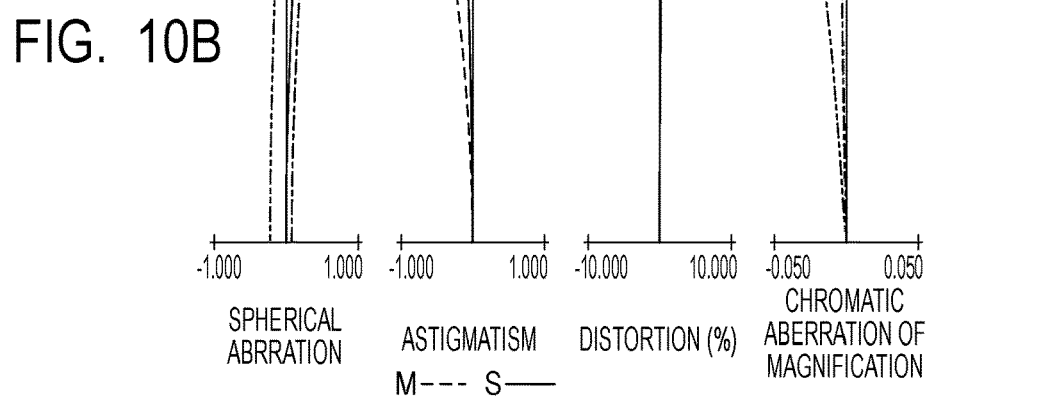
FIG. 10B is an aberration diagram when the extender lens unit IE1 is inserted into the master lens M1 in Numerical Example 1 and focus is at an object at infinity at the intermediate zoom position.
Figure 10C:
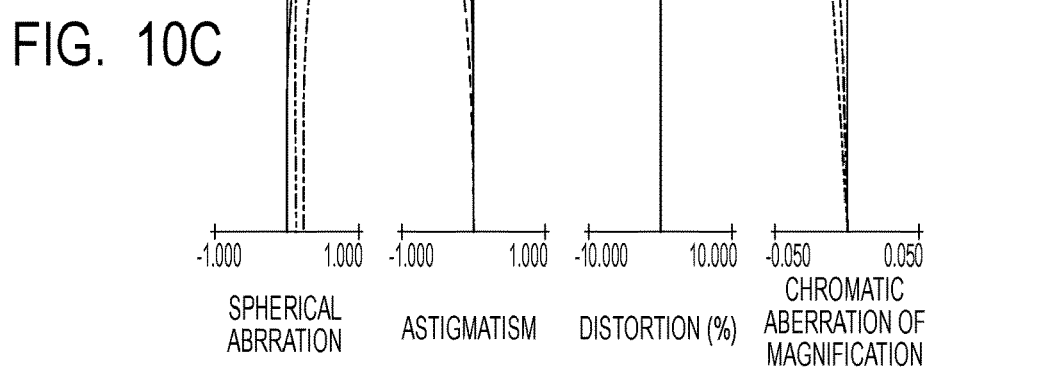
FIG. 10C is an aberration diagram when the extender lens unit IE1 is inserted into the master lens M1 in Numerical Example 1 and focus is at an object at infinity at the telephoto end.

FIG. 10A, FIG. 10B, and FIG. 10C are longitudinal aberration diagrams when the extender lens unit IE1 is inserted into the master lens M1 and focus is at an object at infinity at the wide angle end, at a focal length of 145.4 mm, and at the telephoto end, respectively. The zoom lens of Example 1 includes the extender lens unit having an extender magnification of 2.0×. A lens written as "Gp1" on the rightmost side in Numerical Examples is the positive lens Gp included in the extender lens unit and made of a material satisfying the conditional expressions (1) to (3). In Numerical Example 1, the number of positive lenses Gp made of a material satisfying the conditional expressions (1) to (3) is one. In the following Examples, the positive lens Gp may include two positive lenses, but in this case, those positive lenses are referred to as "Gp1" and "Gp2" in order from the object side.

In Table 1, values corresponding to the respective conditional expressions in Numerical Example 1 are shown.

Numerical Example 1 satisfies all of the conditional expressions (1) to (6) to suitably correct, despite the extender having a high magnification, the secondary spectrum of the axial chromatic aberration, and achieve high optical performance. It is essential that the zoom lens according to at least one embodiment of the present invention satisfy the expressions (1) to (3), but the zoom lens is not always required to satisfy the expressions (4) to (6). However, when at least one of the expressions (4) to (6) is satisfied, even better effects may be provided. This is also true for the other Examples.

Example 2

Figure 11:
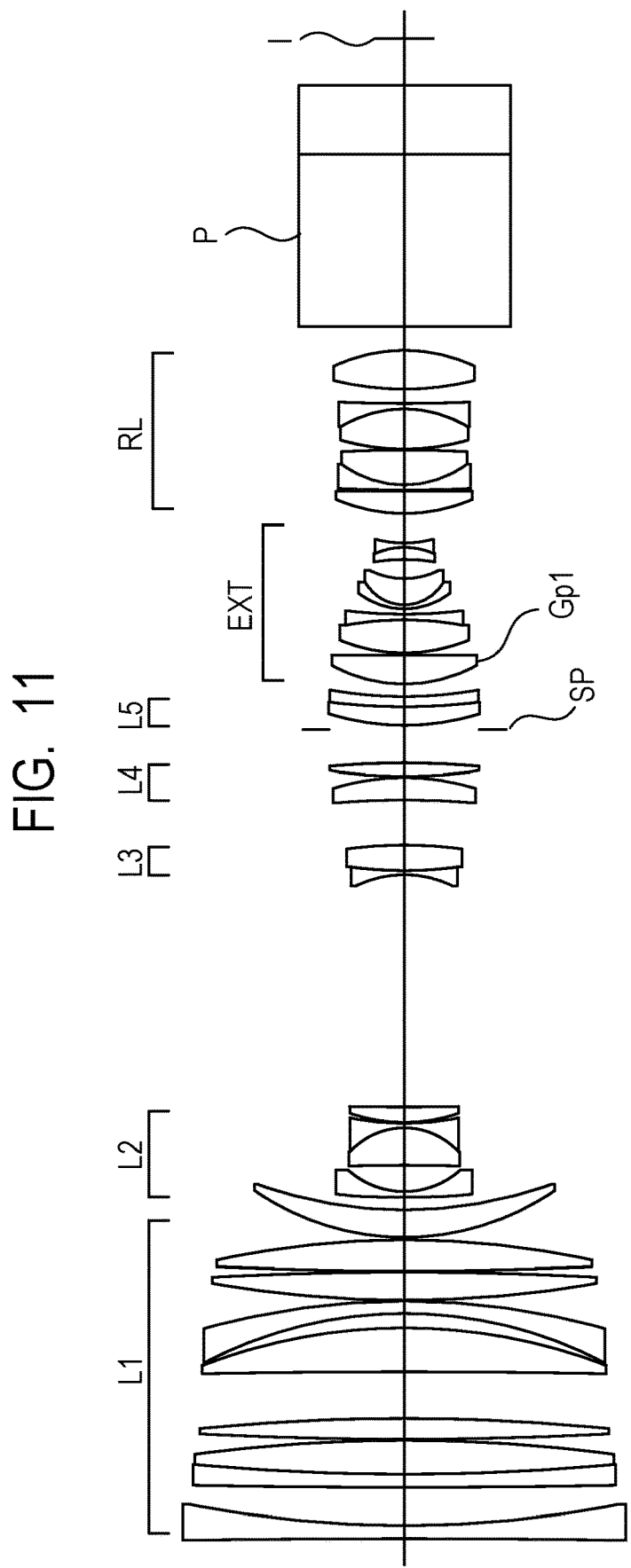
FIG. 11 is a lens cross-sectional view when an extender lens unit IE2 is inserted into the master lens M1 in Example 2 (Numerical Example 2) of the present invention and focus is at an object at infinity at the wide angle end.

Example 2 corresponds to Numerical Example 2, and has a lens configuration in which an extender lens unit IE2 is inserted into the master lens M1. FIG. 11 is a cross-sectional view when the extender lens unit IE2 is inserted into the master lens M1 and focus is at an object at infinity at a wide angle end in a zoom lens according to Example 2 (Numerical Example 2) of the present invention.

The extender lens unit IE2 in Example 2 has the same configuration as that of the extender lens unit IE1 in Example 1, and a positive lens of the extender lens unit IE2 arranged closest to the object side is a positive lens Gp (Gp1).

Figure 12A:
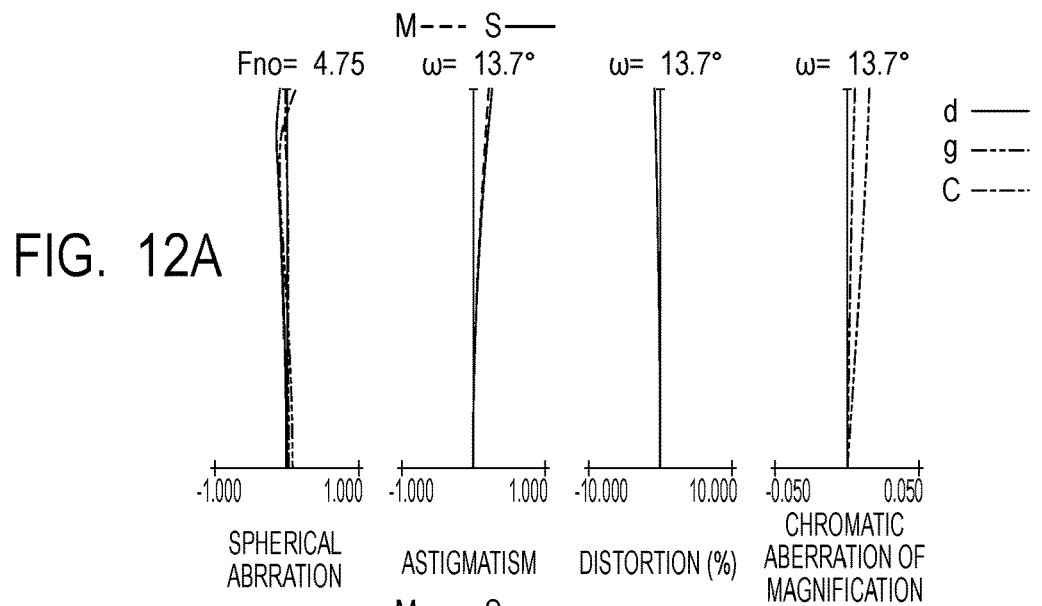
FIG. 12A is an aberration diagram when the extender lens unit IE2 is inserted into the master lens M1 in Numerical Example 2 and focus is at an object at infinity at the wide angle end.
Figure 12B:
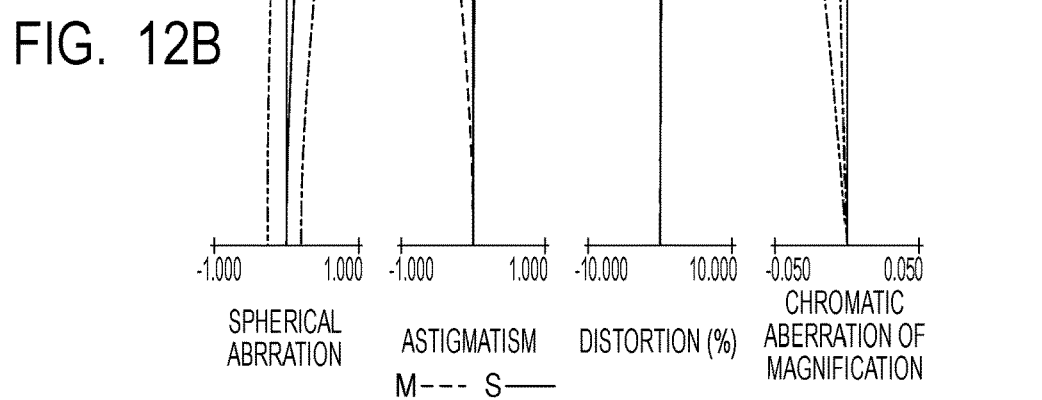
FIG. 12B is an aberration diagram when the extender lens unit IE2 is inserted into the master lens M1 in Numerical Example 2 and focus is at an object at infinity at the intermediate zoom position.
Figure 12C:
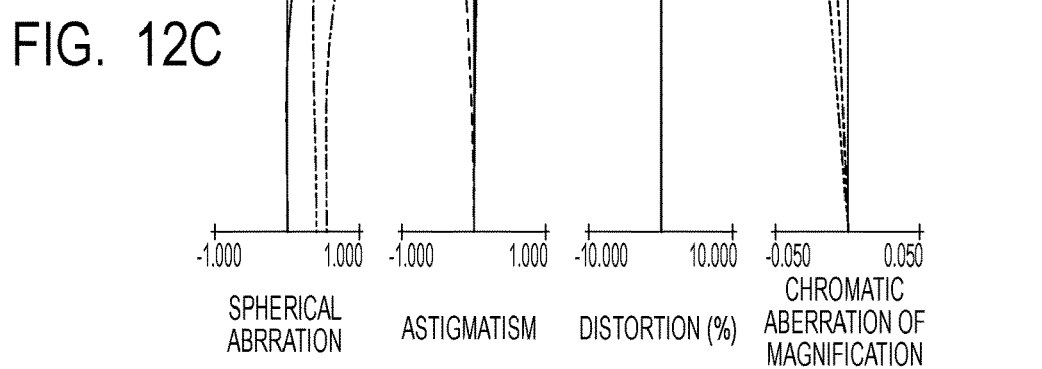
FIG. 12C is an aberration diagram when the extender lens unit IE2 is inserted into the master lens M1 in Numerical Example 2 and focus is at an object at infinity at the telephoto end.

FIG. 12A, FIG. 12B, and FIG. 12C are longitudinal aberration diagrams when focus is at an object at infinity at the wide angle end, at a focal length of 145.4 mm, and at a telephoto end, respectively. The zoom lens of Example 2 includes the extender lens unit having an extender magnification of 2.5×.

In Table 1, values corresponding to the respective conditional expressions in Numerical Example 2 are shown.

Numerical Example 2 satisfies all of the conditional expressions (1) to (6) to suppress, despite the extender having a high magnification, the secondary spectrum of the axial chromatic aberration, and achieve high optical performance.

Example 3

Figure 13:
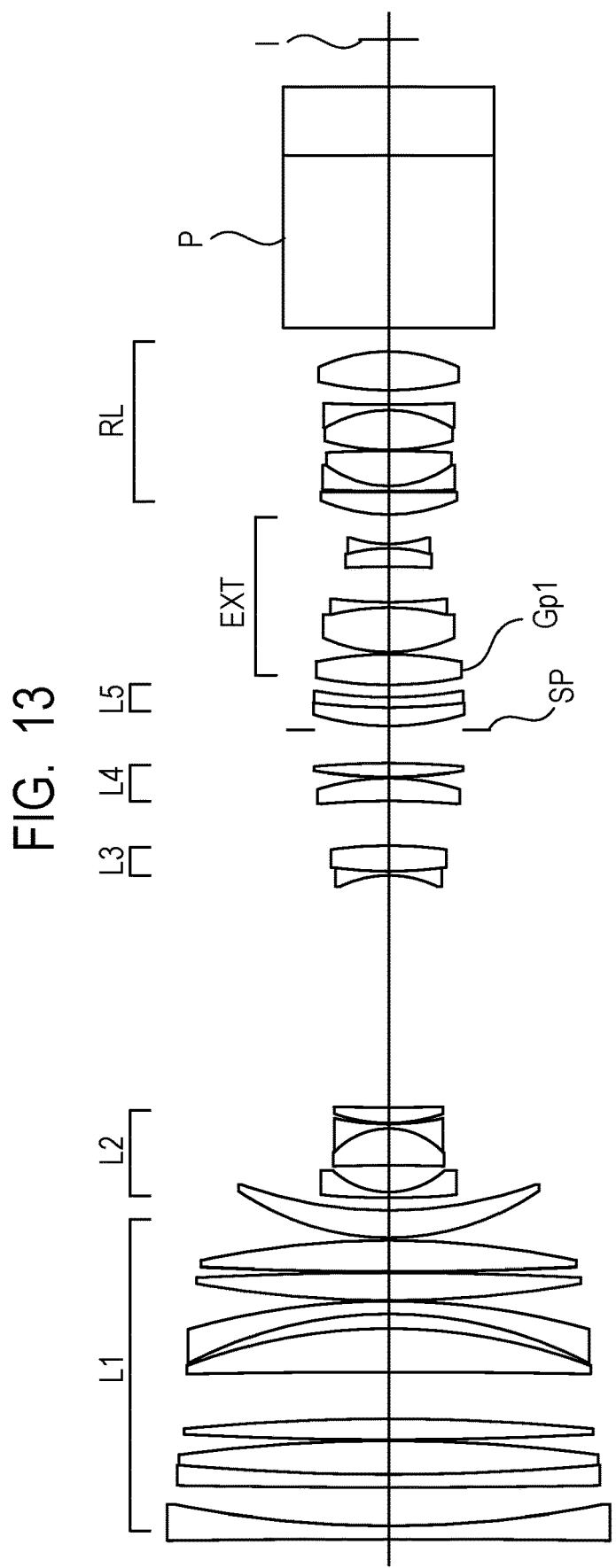
FIG. 13 is a lens cross-sectional view when an extender lens unit IE3 is inserted into the master lens M1 in Example 3 (Numerical Example 3) of the present invention and focus is at an object at infinity at the wide angle end.

Example 3 corresponds to Numerical Example 3, and has a lens configuration in which an extender lens unit IE3 is inserted into the master lens M1. FIG. 13 is a cross-sectional view when the extender lens unit IE3 is inserted into the master lens M1 and focus is at an object at infinity at a wide angle end in a zoom lens according to Example 3 (Numerical Example 3) of the present invention.

The extender lens unit IE3 in Example 3 corresponds to the surface numbers IE01 to IE08, and consists of, in order from the object side, a positive lens (Gp1) being a positive lens Gp, a cemented lens of a positive lens and a negative lens, and a cemented lens of a positive lens and a negative lens.

Figure 14A:
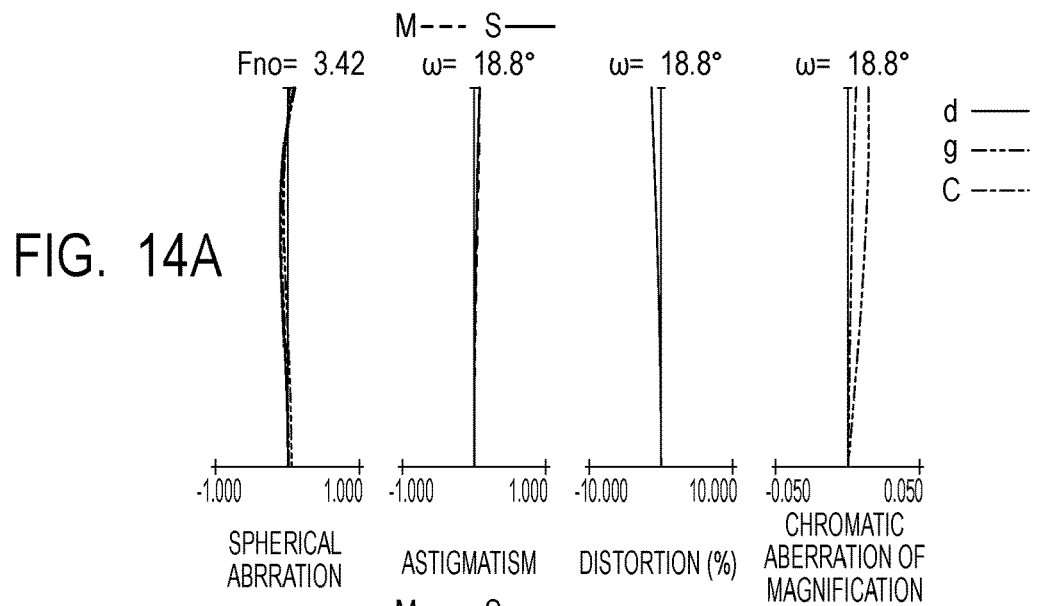
FIG. 14A is an aberration diagram when the extender lens unit IE3 is inserted into the master lens M1 in Numerical Example 3 and focus is at an object at infinity at the wide angle end.
Figure 14B:
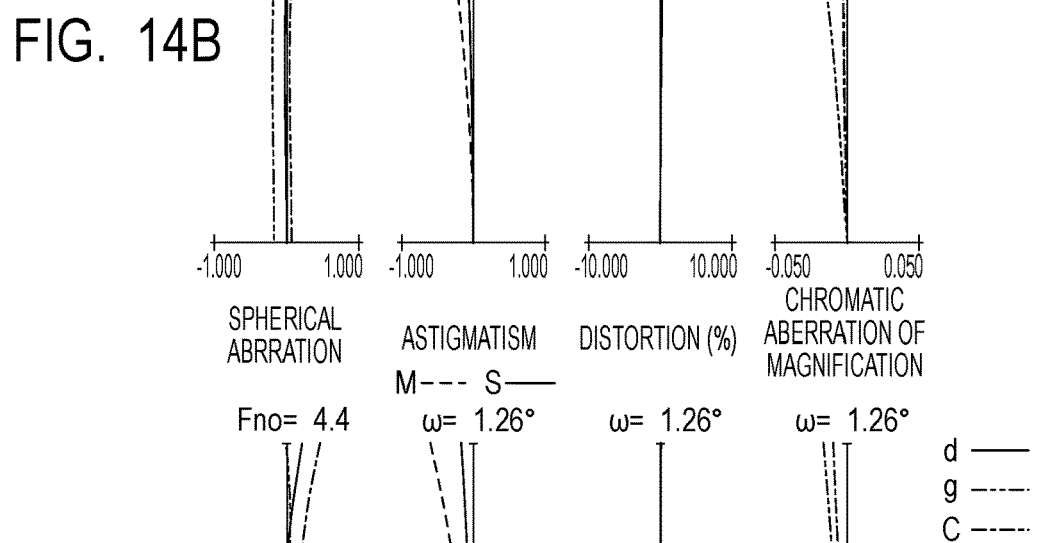
FIG. 14B is an aberration diagram when the extender lens unit IE3 is inserted into the master lens M1 in Numerical Example 3 and focus is at an object at infinity at the intermediate zoom position.
Figure 14C:
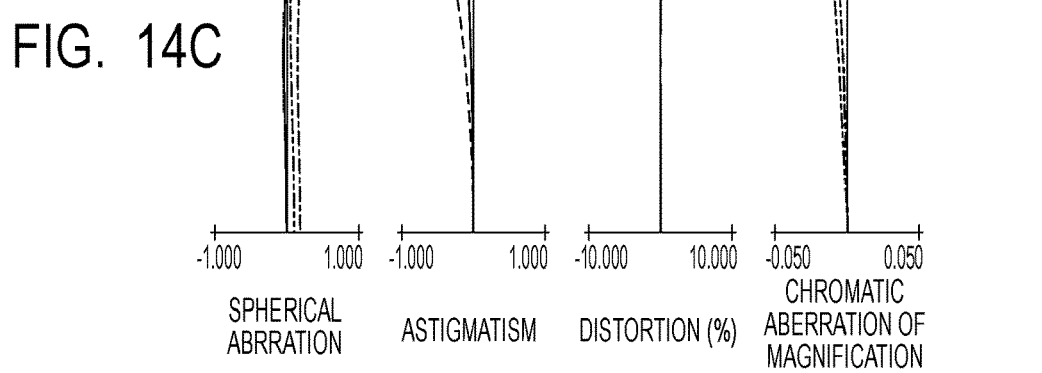
FIG. 14C is an aberration diagram when the extender lens unit IE3 is inserted into the master lens M1 in Numerical Example 3 and focus is at an object at infinity at the telephoto end.

FIG. 14A, FIG. 14B, and FIG. 14C are longitudinal aberration diagrams when focus is at an object at infinity at the wide angle end, at a focal length of 130.9 mm, and at a telephoto end, respectively. The zoom lens of Example 3 includes the extender lens unit having an extender magnification of 1.8×.

In Table 1, values corresponding to the respective conditional expressions in Numerical Example 3 are shown.

Numerical Example 3 satisfies the conditional expressions (1) to (5) to achieve, despite the extender having a high magnification, the reductions in size and weight, and achieve high optical performance from a center of an image to a periphery thereof.

Example 4

Figure 15:
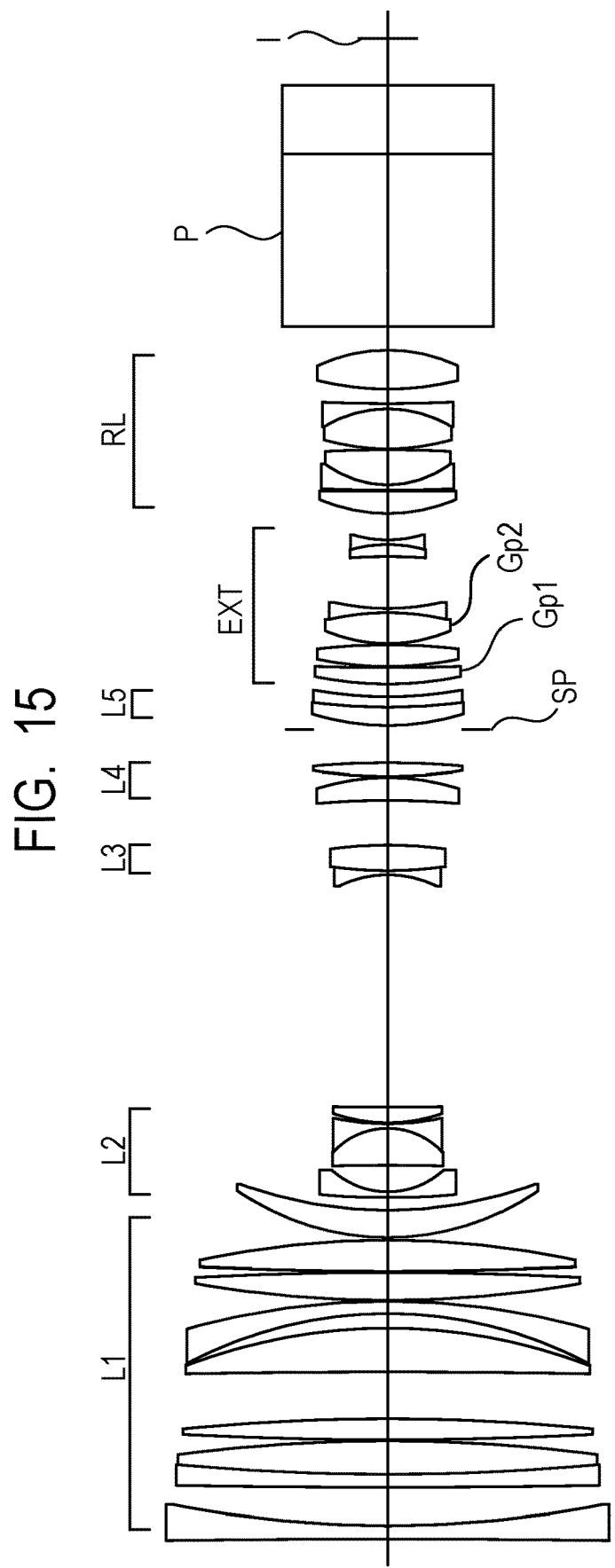
FIG. 15 is a lens cross-sectional view when an extender lens unit IE4 is inserted into the master lens M1 in Example 4 (Numerical Example 4) of the present invention and focus is at an object at infinity at the wide angle end.

Example 4 corresponds to Numerical Example 4, and has a lens configuration in which an extender lens unit IE4 is inserted into the master lens M1. FIG. 15 is a cross-sectional view when the extender lens unit IE4 is inserted into the master lens M1 and focus is at an object at infinity at a wide angle end in a zoom lens according to Example 4 (Numerical Example 4) of the present invention.

The extender lens unit IE4 in Example 4 corresponds to the surface numbers IE01 to IE10. The extender lens unit IE4 consists of, in order from the object side, a positive lens (Gp1) being a positive lens Gp, a positive lens, a cemented lens of a positive lens (Gp2) being the positive lens Gp and a negative lens, and a cemented lens of a positive lens and a negative lens.

Figure 16A:
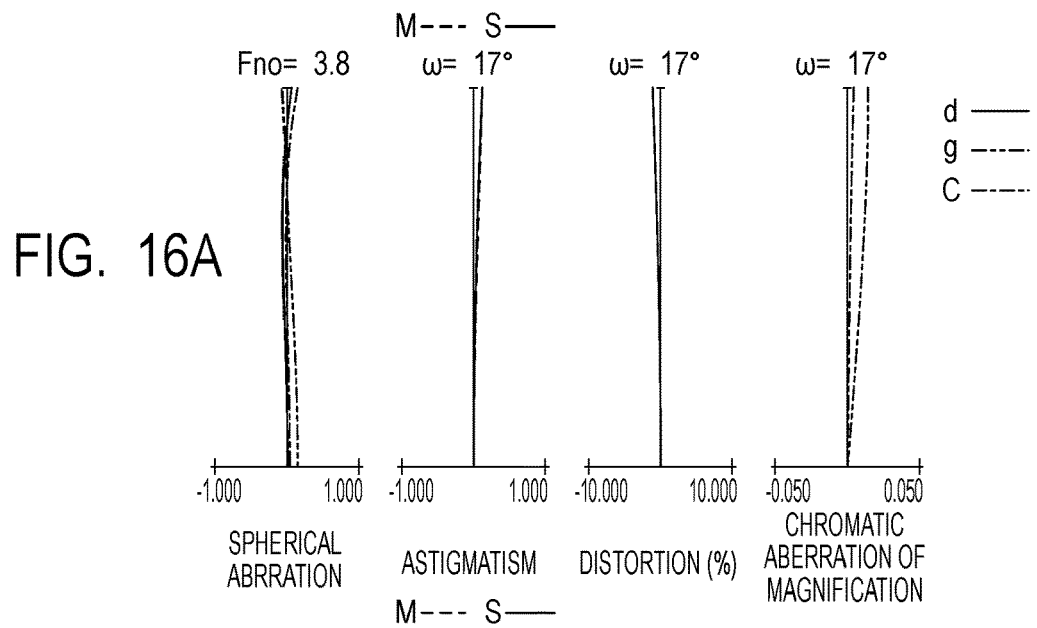
FIG. 16A is an aberration diagram when the extender lens unit IE4 is inserted into the master lens M1 in Numerical Example 4 and focus is at an object at infinity at the wide angle end.
Figure 16B:
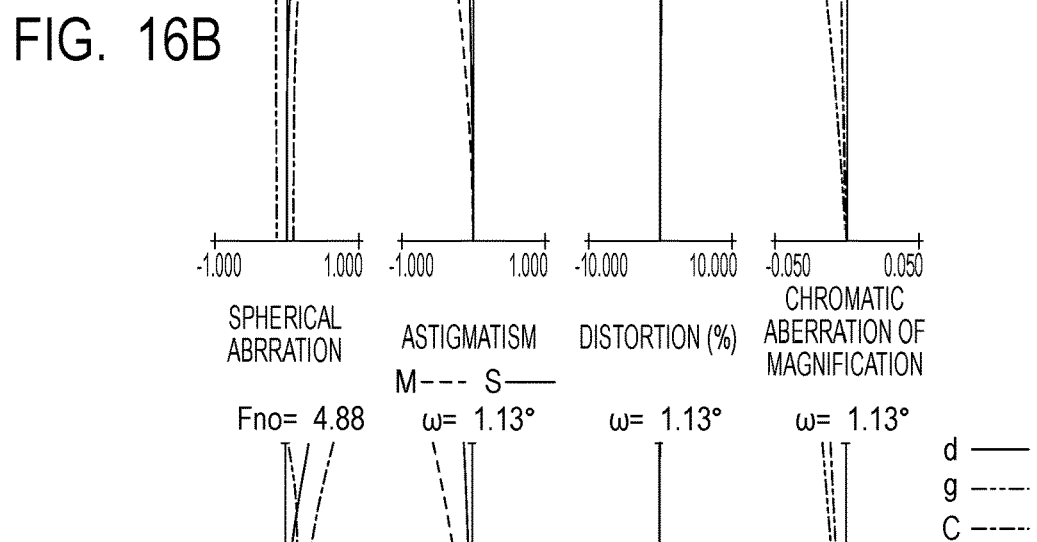
FIG. 16B is an aberration diagram when the extender lens unit IE4 is inserted into the master lens M1 in Numerical Example 4 and focus is at an object at infinity at the intermediate zoom position.
Figure 16C:
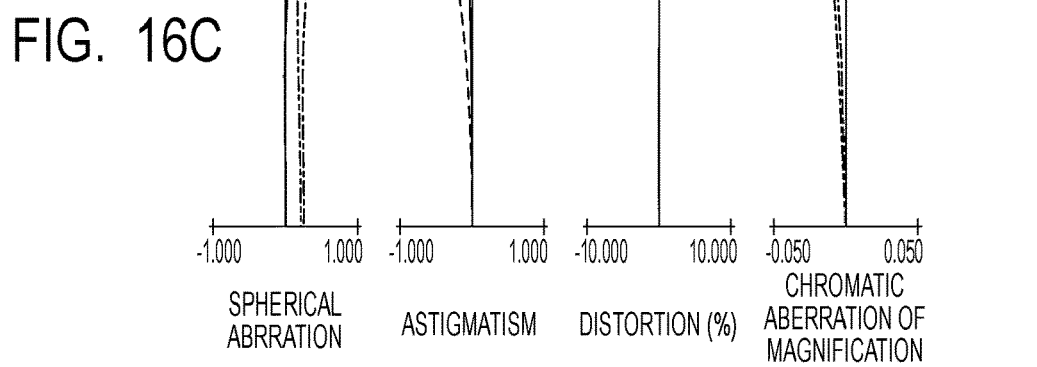
FIG. 16C is an aberration diagram when the extender lens unit IE4 is inserted into the master lens M1 in Numerical Example 4 and focus is at an object at infinity at the telephoto end.

FIG. 16A, FIG. 16B, and FIG. 16C are longitudinal aberration diagrams when focus is at an object at infinity at the wide angle end, at a focal length of 145.4 mm, and at a telephoto end, respectively. The zoom lens of Example 4 includes the extender lens unit having an extender magnification of 1.8×.

In Table 1, values corresponding to the respective conditional expressions in Numerical Example 4 are shown.

Numerical Example 4 satisfies all of the conditional expressions (1) to (6) to suppress, despite the extender having a high magnification, the secondary spectrum of the axial chromatic aberration, and achieve high optical performance.

Example 5

Example 5 corresponds to Numerical Example 5, and has a lens configuration in which an extender lens unit IE5 is inserted into the master lens M2.

Figure 3:
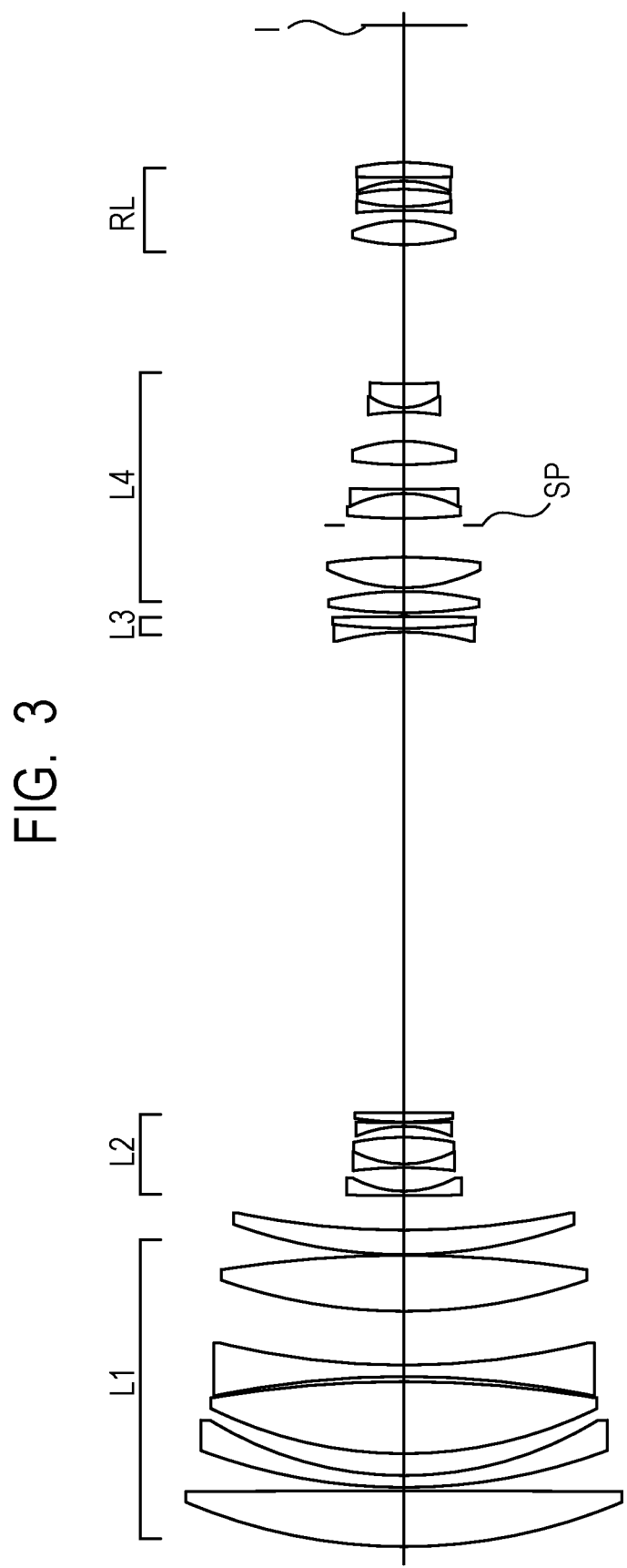
FIG. 3 is a lens cross-sectional view of a master lens M2 when focus is at an object at infinity at a wide angle end.

First, the master lens M2 corresponding to Numerical Example 5 is described. FIG. 3 is a cross-sectional view of the master lens M2 when focus is at an object at infinity at a wide angle end. A first lens unit L1 having a positive refractive power is configured not to move for zooming. A part of lens sub-units included in the first lens unit L1 is configured to move during focusing from the object at infinity to the object at close distance. A second lens unit L2 having a negative refractive power for zooming is configured to move toward the image side during zooming from the wide angle end (short focal length end) to a telephoto end (long focal length end). A third lens unit L3 having a negative refractive power for zooming is configured to move on the optical axis during zooming from the wide angle end to the telephoto end. A positive fourth lens unit L4 includes an aperture stop SP configured not to move during zooming, and is configured not to move during zooming. A relay lens unit RL is configured not to move during zooming, and has an image forming action. An image plane I corresponds to an image pickup surface of a solid-state image pickup element (photoelectric transducer).

Next, a configuration of each lens unit of the master lens M1 is described. The first lens unit L1 consists of six lenses of a positive lens, a negative lens, a positive lens, a negative lens, a positive lens, and a positive lens. During focusing, two lenses, namely, the fifth and sixth lenses of the first lens unit from the object side move toward the object side when an object at close distance is to be in focus. The second lens unit L2 consists of a negative lens, a cemented lens of a negative lens and a positive lens, a negative lens, and a positive lens. The third lens unit L3 consists of a cemented lens of a negative lens and a positive lens. The fourth lens unit L4 consists of a positive lens, a positive lens, an aperture stop, a cemented lens of a negative lens and a positive lens, a positive lens, and a cemented lens of a negative lens and a positive lens. During zooming, the second lens unit and the third lens unit move. The relay lens unit RL consists of a positive lens, a cemented lens of a negative lens and a positive lens, and a cemented lens of a negative lens and a positive lens. FIG. 4A, FIG. 4B, and FIG. 4C are longitudinal aberration diagrams of the master lens M2 when focus is at an object at infinity at the wide angle end, at a focal length of 484.2 mm, and at the telephoto end, respectively.

Figure 17:
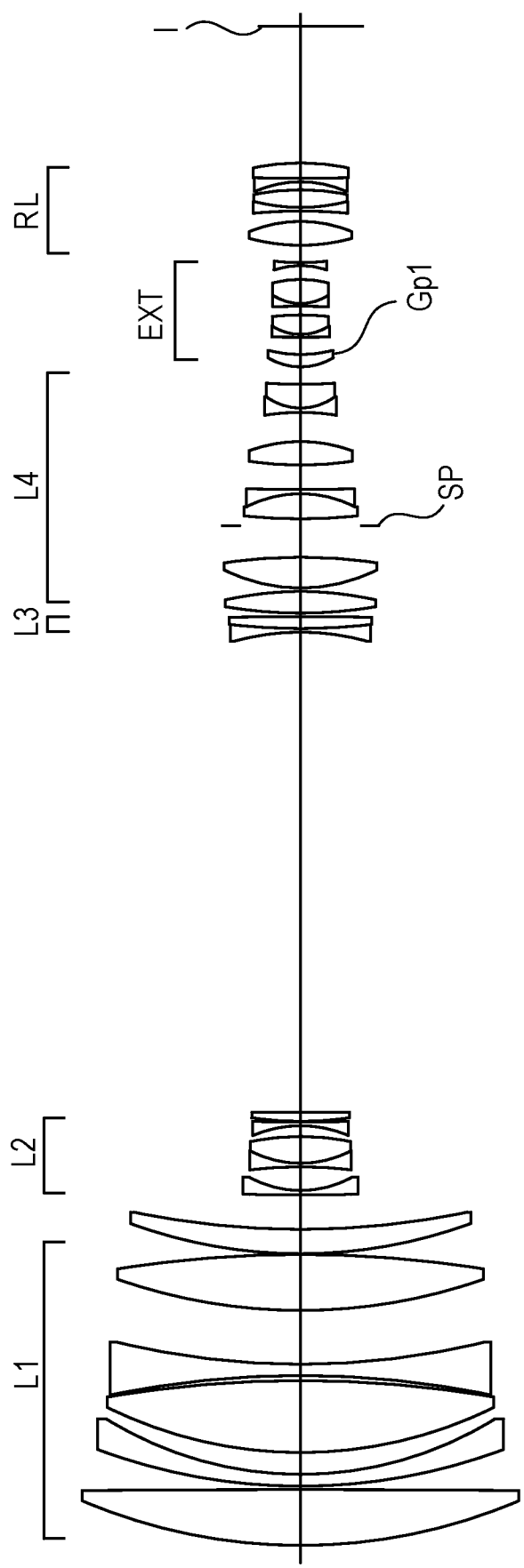
FIG. 17 is a lens cross-sectional view when an extender lens unit IE5 is inserted into the master lens M2 in Example 5 (Numerical Example 5) of the present invention and focus is at an object at infinity at the wide angle end.

FIG. 17 is a cross-sectional view when the extender lens unit IE5 is inserted into the master lens M2 and focus is at an object at infinity at the wide angle end in a zoom lens according to Example 5 (Numerical Example 5) of the present invention.

The extender lens unit IE5 in Example 5 corresponds to the surface numbers IE01 to IE10, and consists of, in order from the object side, a positive lens (Gp1) being a positive lens Gp, a cemented lens of a negative lens and a positive lens, a cemented lens of a negative lens and a positive lens, and a negative lens.

Figure 18A:
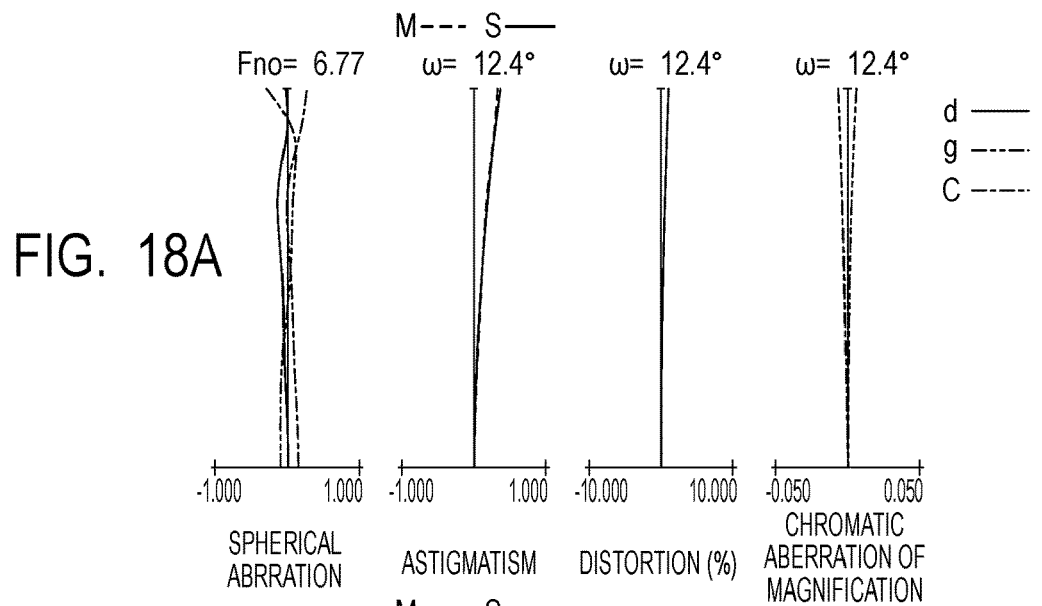
FIG. 18A is an aberration diagram when the extender lens unit IE5 is inserted into the master lens M2 in Numerical Example 5 and focus is at an object at infinity at the wide angle end.
Figure 18B:
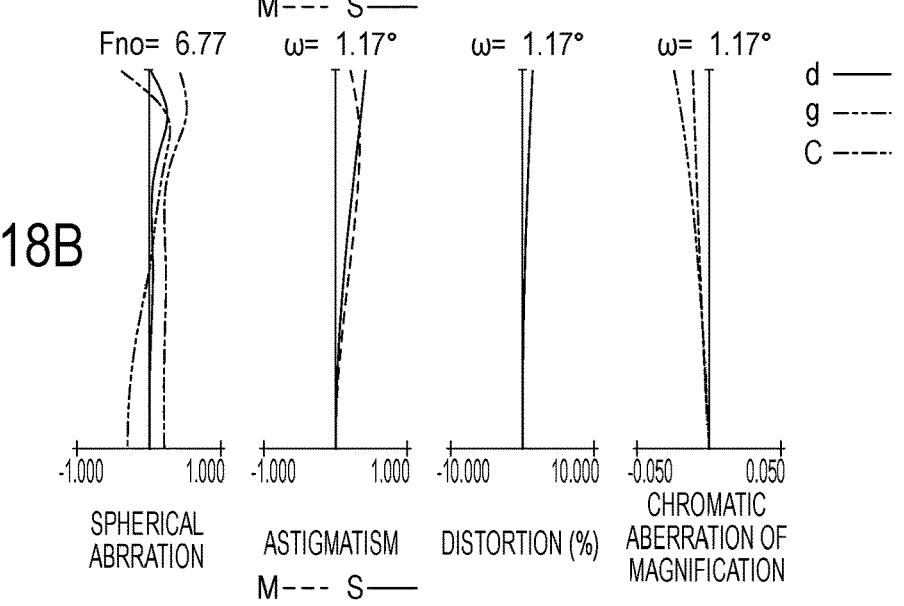
FIG. 18B is an aberration diagram when the extender lens unit IE5 is inserted into the master lens M2 in Numerical Example 5 and focus is at an object at infinity at the intermediate zoom position.
Figure 18C:
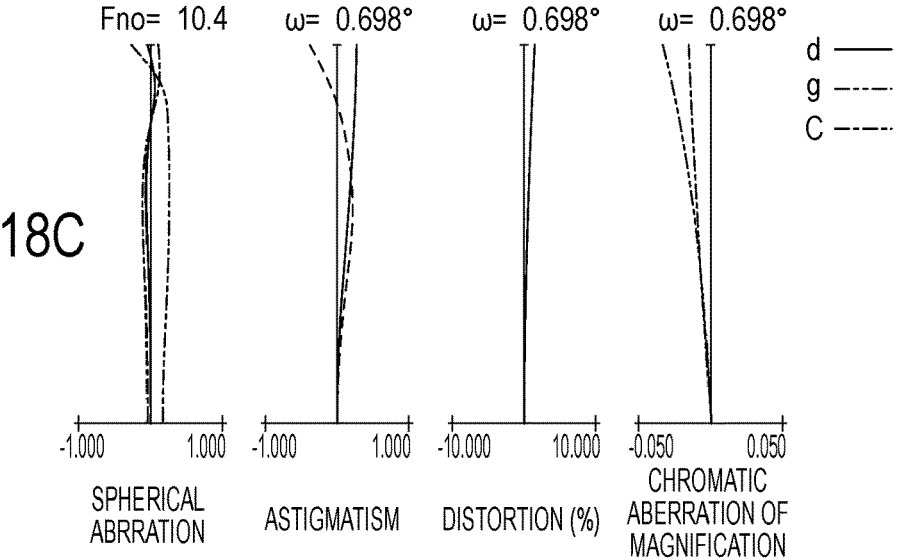
FIG. 18C is an aberration diagram when the extender lens unit IE5 is inserted into the master lens M2 in Numerical Example 5 and focus is at an object at infinity at the telephoto end.

FIG. 18A, FIG. 18B, and FIG. 18C are longitudinal aberration diagrams when focus is at an object at infinity at the wide angle end, at a focal length of 726.3 mm, and at the telephoto end, respectively. The zoom lens of Example 5 includes the extender lens unit having an extender magnification of 1.5×.

In Table 1, values corresponding to the respective conditional expressions in Numerical Example 5 are shown.

Numerical Example 5 satisfies the conditional expressions (1) to (5) to suitably suppress, despite the extender having a high magnification, the secondary spectrum of the axial chromatic aberration, and achieve high optical performance.

Example 6

Figure 19:
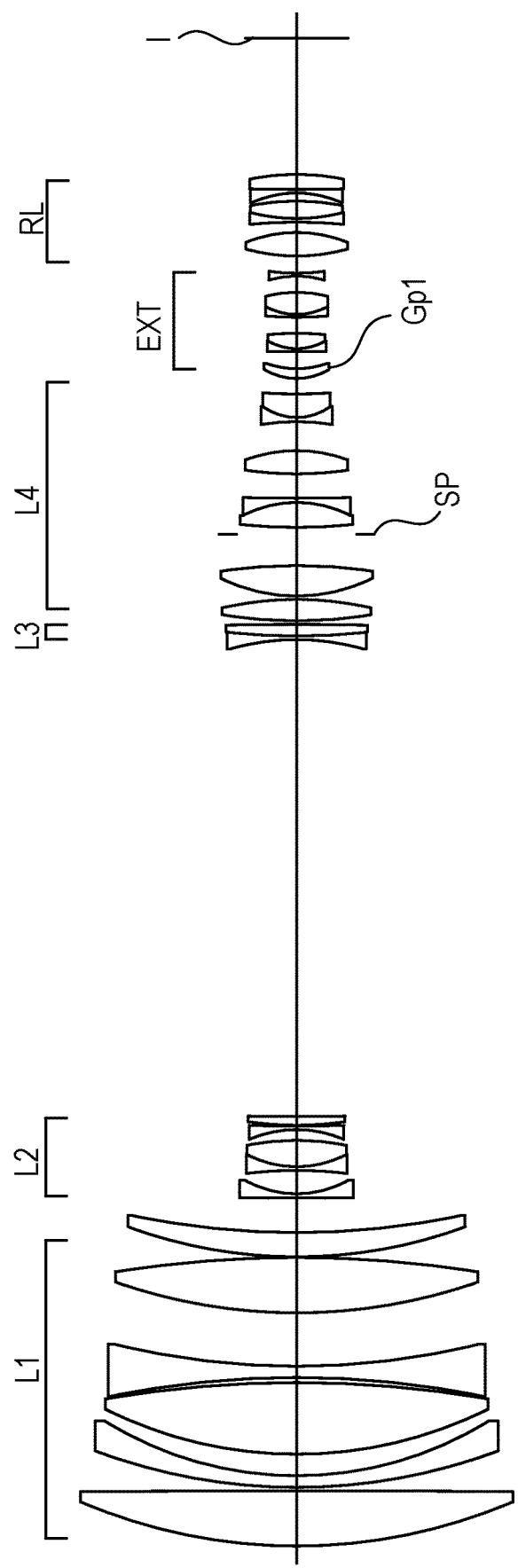
FIG. 19 is a lens cross-sectional view when an extender lens unit IE6 is inserted into the master lens M2 in Example 6 (Numerical Example 6) of the present invention and focus is at an object at infinity at the wide angle end.

Example 6 corresponds to Numerical Example 6, and has a lens configuration in which an extender lens unit IE6 is inserted into the master lens M2. FIG. 19 is a cross-sectional view when the extender lens unit IE6 is inserted into the master lens M2 and focus is at an object at infinity at a wide angle end in a zoom lens according to Example 6 (Numerical Example 6) of the present invention.

Figure 20A:
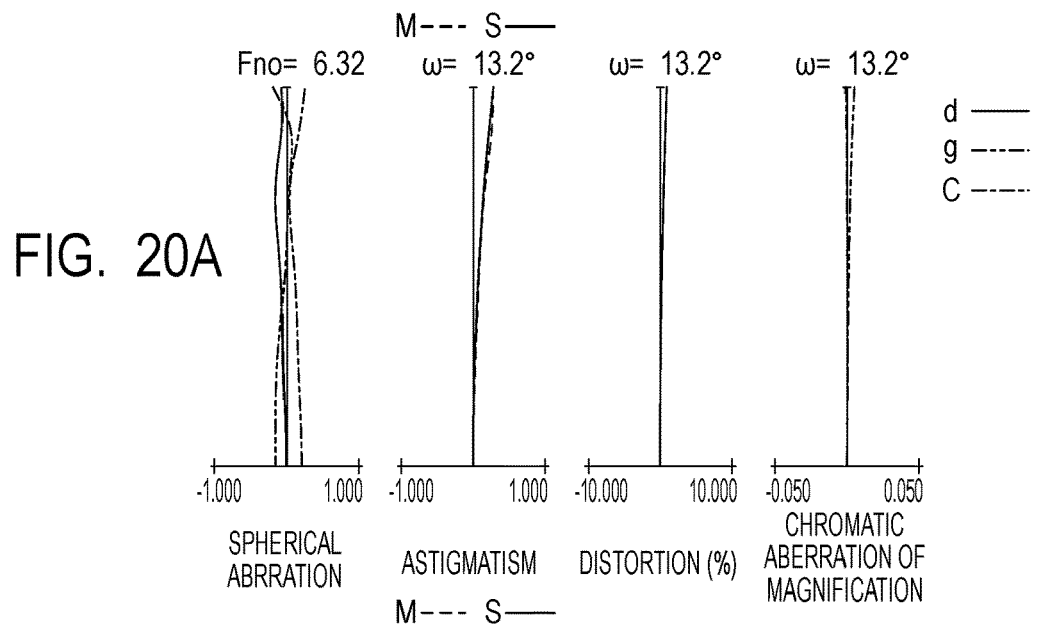
FIG. 20A is an aberration diagram when the extender lens unit IE6 is inserted into the master lens M2 in Numerical Example 6 and focus is at an object at infinity at the wide angle end.
Figure 20B:
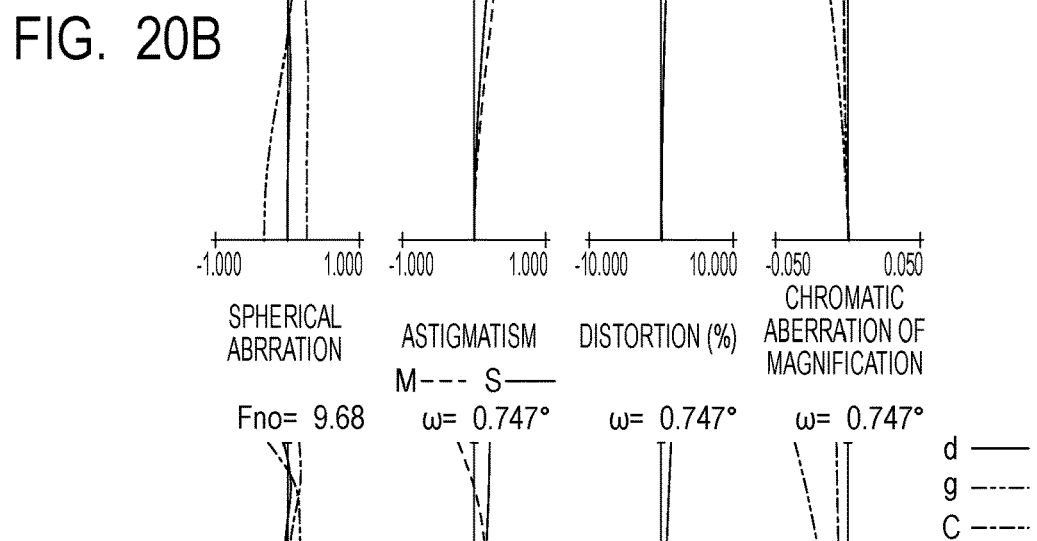
FIG. 20B is an aberration diagram when the extender lens unit IE6 is inserted into the master lens M2 in Numerical Example 6 and focus is at an object at infinity at the intermediate zoom position.
Figure 20C:
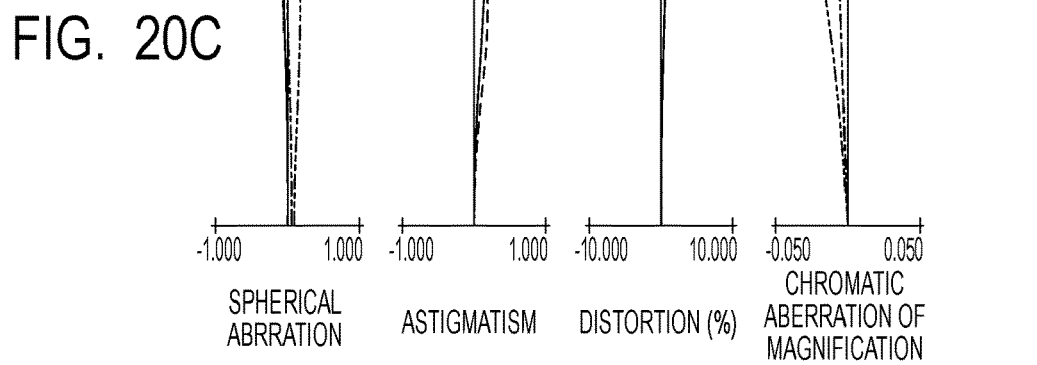
FIG. 20C is an aberration diagram when the extender lens unit IE6 is inserted into the master lens M2 in Numerical Example 6 and focus is at an object at infinity at the telephoto end.

The extender lens unit IE6 in Example 6 has the same configuration as that of the extender lens unit IE5 in Example 5, and a positive lens arranged closest to the object side is a positive lens Gp1. FIG. 20A, FIG. 20B, and FIG. 20C are longitudinal aberration diagrams when focus is at an object at infinity at the wide angle end, at a focal length of 677.9 mm, and at the telephoto end, respectively. The zoom lens of Example 6 includes the extender lens unit having an extender magnification of 1.4×.

In Table 1, values corresponding to the respective conditional expressions in Numerical Example 6 are shown.

Numerical Example 6 satisfies all of the conditional expressions (1) to (6) to suitably suppress, despite the extender having a high magnification, the secondary spectrum of the axial chromatic aberration, and achieve high optical performance.

Example 7

Example 7 corresponds to Numerical Example 7, and has a lens configuration in which a part of the master lens M3 is replaced by an extender lens unit IE7.

Figure 5:
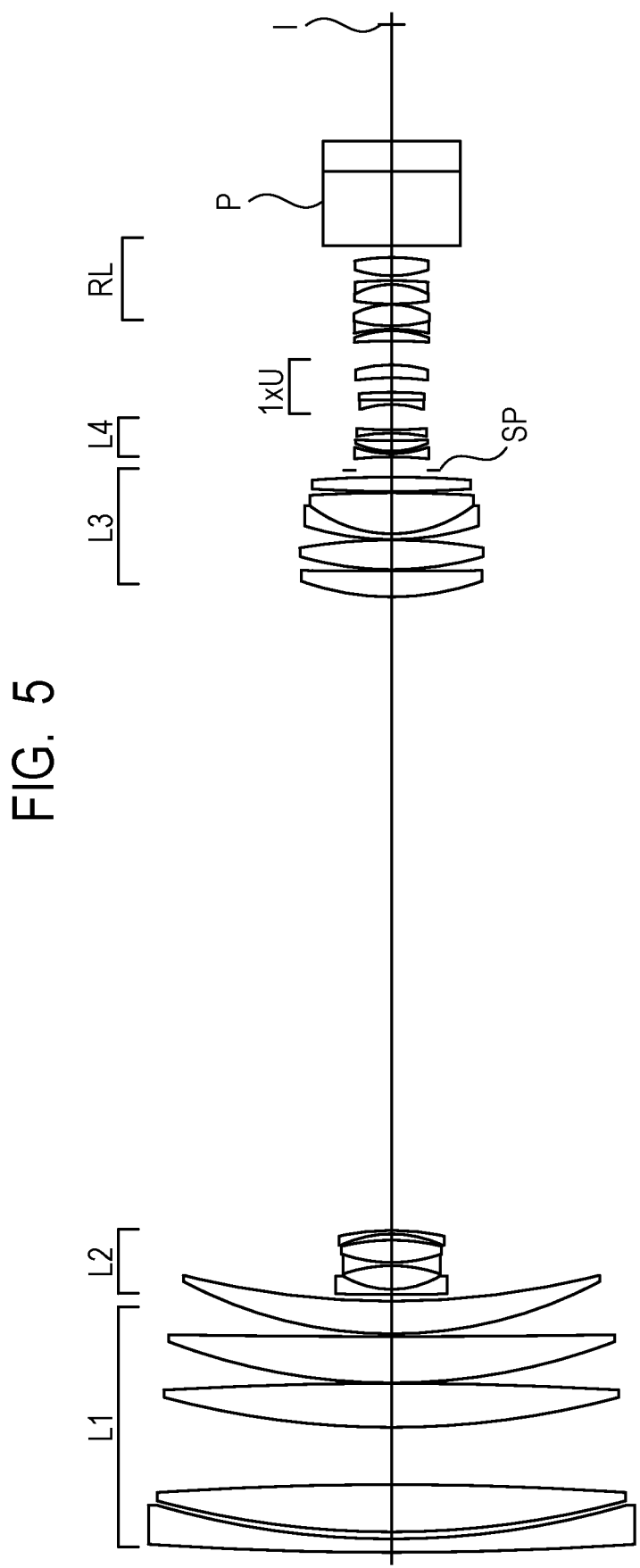
FIG. 5 is a lens cross-sectional view of a master lens M3 when focus is at an object at infinity at a wide angle end.

First, the master lens M3 corresponding to Numerical Example 7 is described. FIG. 5 is a lens cross-sectional view of the master lens M3 when focus is at an object at infinity at a wide angle end. A first lens unit L1 having a positive refractive power is configured not to move for zooming. A part of lens sub-units included in the first lens unit L1 is configured to move during focusing from the object at infinity to the object at close distance. A second lens unit L2 having a negative refractive power for zooming is configured to move toward the image side during zooming from the wide angle end (short focal length end) to a telephoto end (long focal length end). A third lens unit L3 having a positive refractive power for zooming is configured to move toward the object side during zooming from the wide angle end to the telephoto end. A positive fourth lens unit L4 includes an aperture stop SP configured not to move during zooming, and is configured not to move during zooming. A 1× lens unit 1×U is configured not to move during zooming, and to retract from the optical path when the extender lens unit is to be inserted. A relay lens unit RL is configured not to move during zooming, and has an image forming action. An optical element P is a prism, for example. An image plane I corresponds to an image pickup surface of a solid-state image pickup element (photoelectric transducer).

Figure 6A:
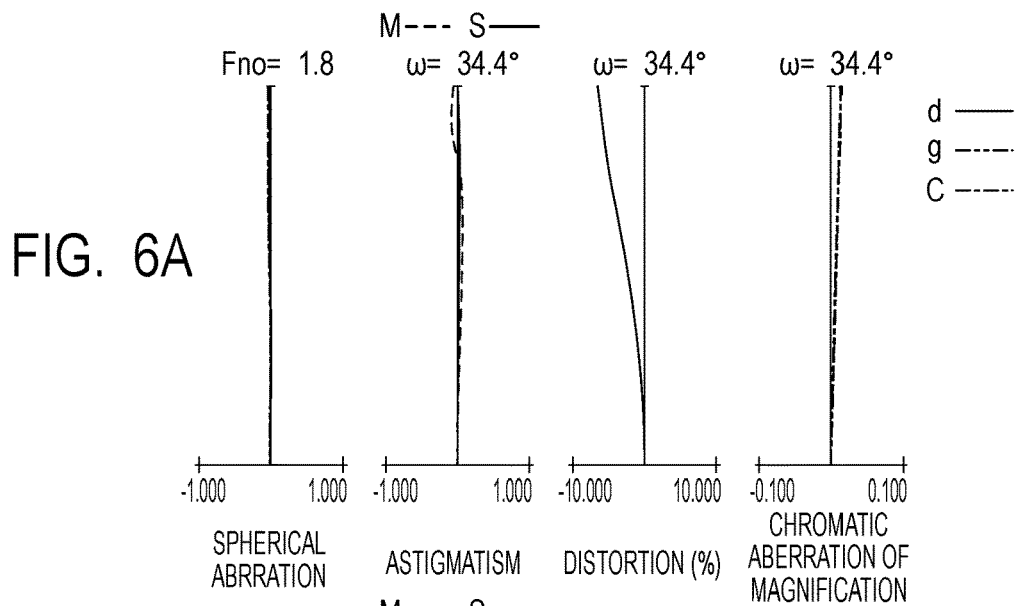
FIG. 6A is an aberration diagram of the master lens M3 when focus is at an object at infinity at the wide angle end.
Figure 6B:
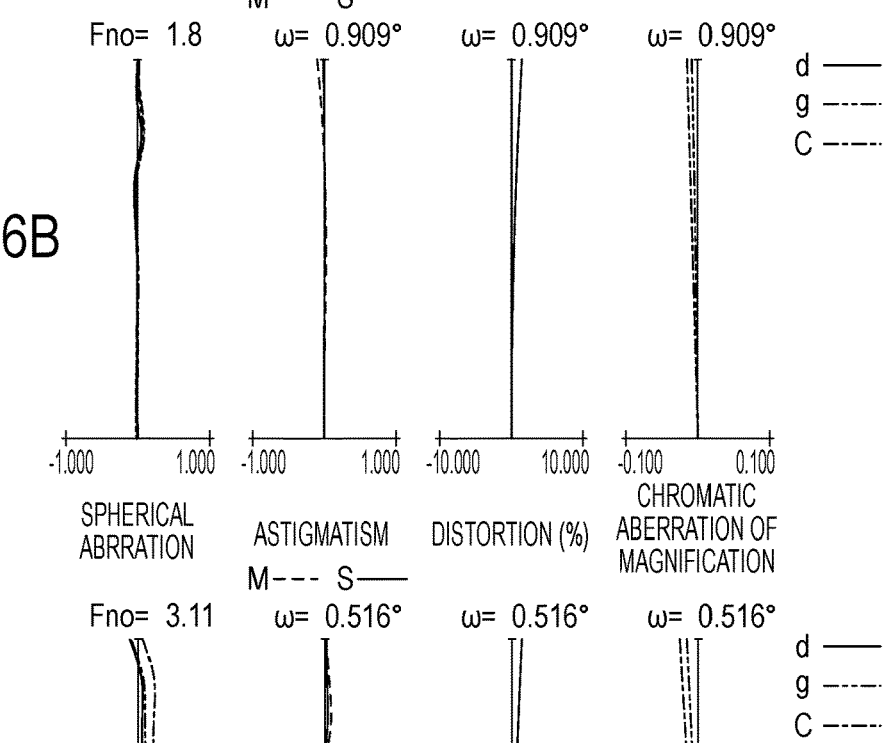
FIG. 6B is an aberration diagram of the master lens M3 when focus is at an object at infinity at an intermediate zoom position.
Figure 6C:
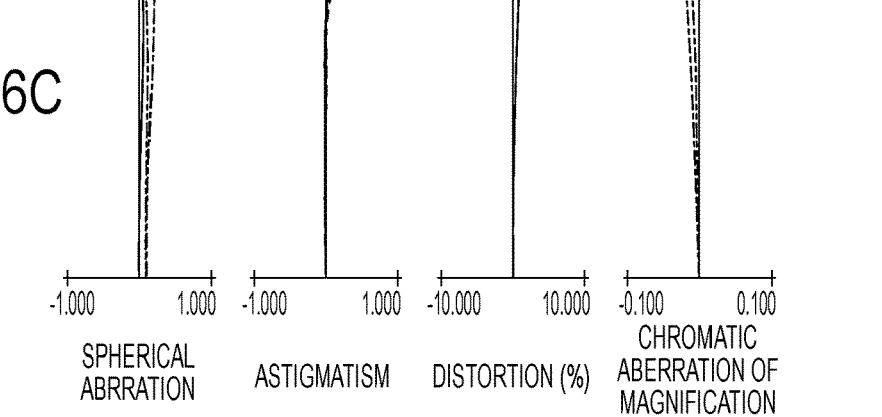
FIG. 6C is an aberration diagram of the master lens M3 when focus is at an object at infinity at a telephoto end.

Next, a configuration of each lens unit of the master lens M3 is described. The first lens unit L1 consists of five lenses of a negative lens, a positive lens, a positive lens, a positive lens, and a positive lens. During focusing, three lenses, namely, the third to fifth lenses of the first lens unit from the object side move toward the object side when an object at close distance is to be in focus. The second lens unit L2 consists of a negative lens, a cemented lens of a negative lens and a positive lens, and a negative lens. The third lens unit L3 consists of a positive lens, a positive lens, a cemented lens of a negative lens and a positive lens, and a positive lens. During zooming, the second lens unit and the third lens unit move. The fourth lens unit L4 consists of a negative lens, a positive lens, and a negative lens. The 1× lens unit 1×U consists of a cemented lens of a negative lens and a positive lens, and a positive lens. The relay lens unit RL consists of a positive lens, a cemented lens of a negative lens and a positive lens, a cemented lens of a positive lens and a negative lens, and a positive lens. FIG. 6A, FIG. 6B, and FIG. 6C are longitudinal aberration diagrams of the master lens M3 when focus is at an object at infinity at the wide angle end, at a focal length of 341.7 mm, and at the telephoto end, respectively.

FIG. 21 is a cross-sectional view when the 1× lens unit 1×U of the master lens M3 is replaced by the extender lens unit IE7 and focus is at an object at infinity at a wide angle end in a zoom lens according to Example 7 (Numerical Example 7) of the present invention. The extender lens unit IE7 in Example 7 corresponds to the surface numbers IE01 to IE10, and consists of, in order from the object side, a positive lens (Gp1) being a positive lens Gp, a cemented lens of a positive lens and a negative lens, a cemented lens of a negative lens and a positive lens, and a negative lens.

Figure 22A:
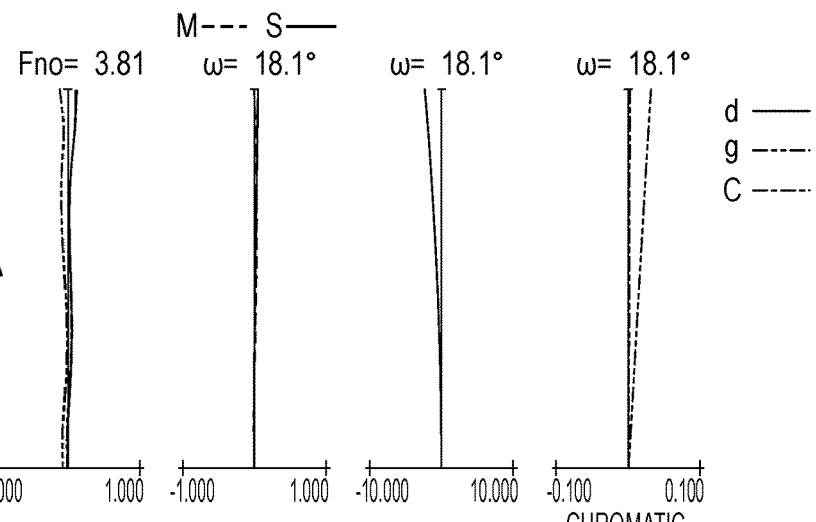
FIG. 22A is an aberration diagram when the extender lens unit IE7 is inserted into the master lens M3 in Numerical Example 7 and focus is at an object at infinity at the wide angle end.
Figure 22B:
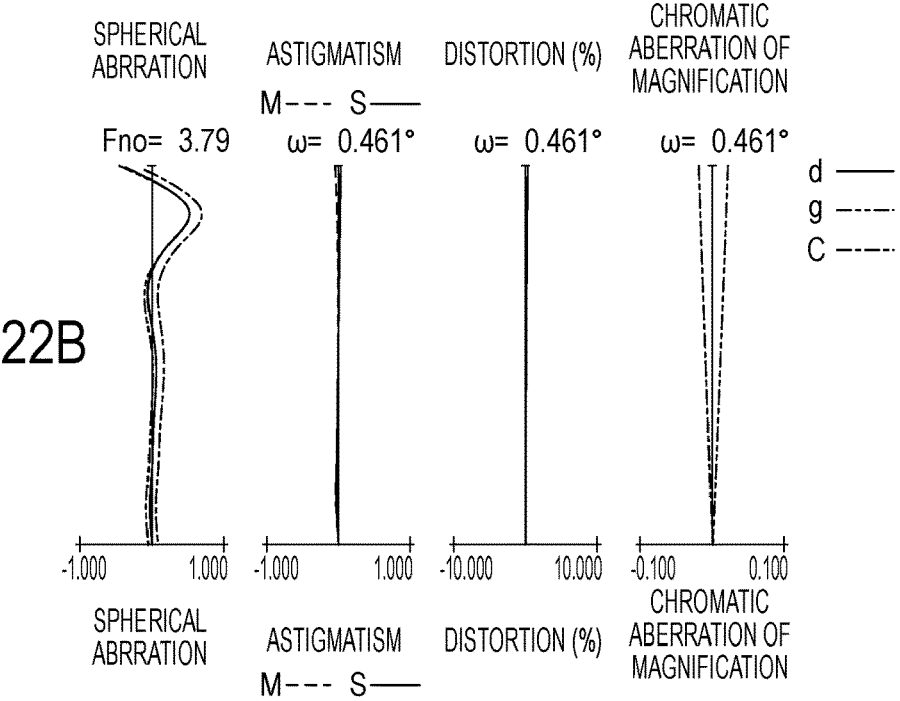
FIG. 22B is an aberration diagram when the extender lens unit IE7 is inserted into the master lens M3 in Numerical Example 7 and focus is at an object at infinity at the intermediate zoom position.
Figure 22C:
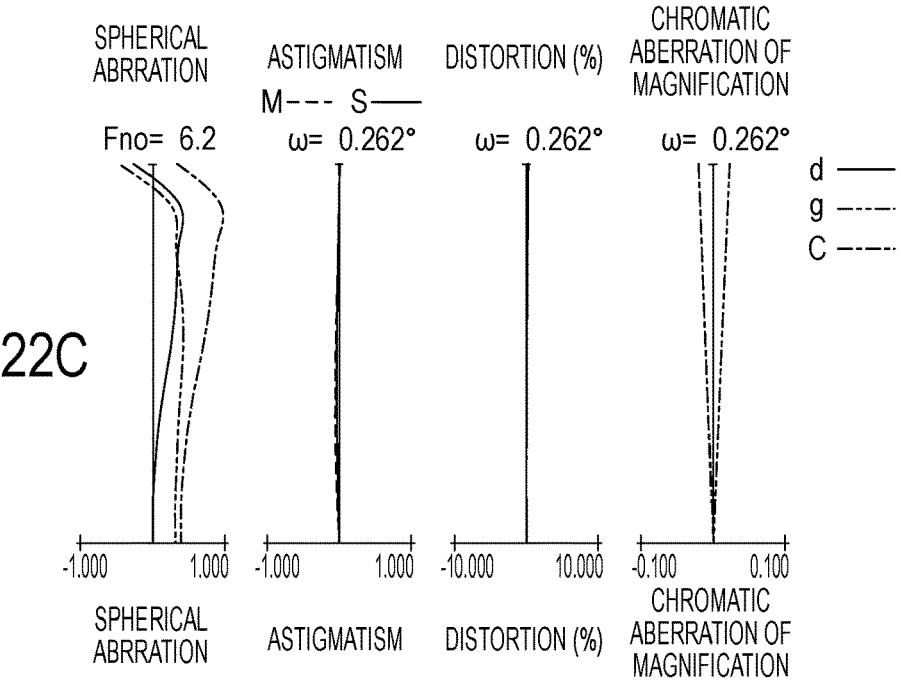
FIG. 22C is an aberration diagram when the extender lens unit IE7 is inserted into the master lens M3 in Numerical Example 7 and focus is at an object at infinity at the telephoto end.

FIG. 22A, FIG. 22B, and FIG. 22C are longitudinal aberration diagrams when focus is at an object at infinity at the wide angle end, at a focal length of 682 mm, and at the telephoto end, respectively. The zoom lens of Example 7 includes the extender lens unit having an extender magnification of 2.0×.

In Table 1, values corresponding to the respective conditional expressions in Numerical Example 7 are shown.

Numerical Example 7 satisfies all of the conditional expressions (1) to (6) to suitably suppress, despite the extender having a high magnification, the secondary spectrum of the axial chromatic aberration, and achieve high optical performance.

Example 8

Figure 23:
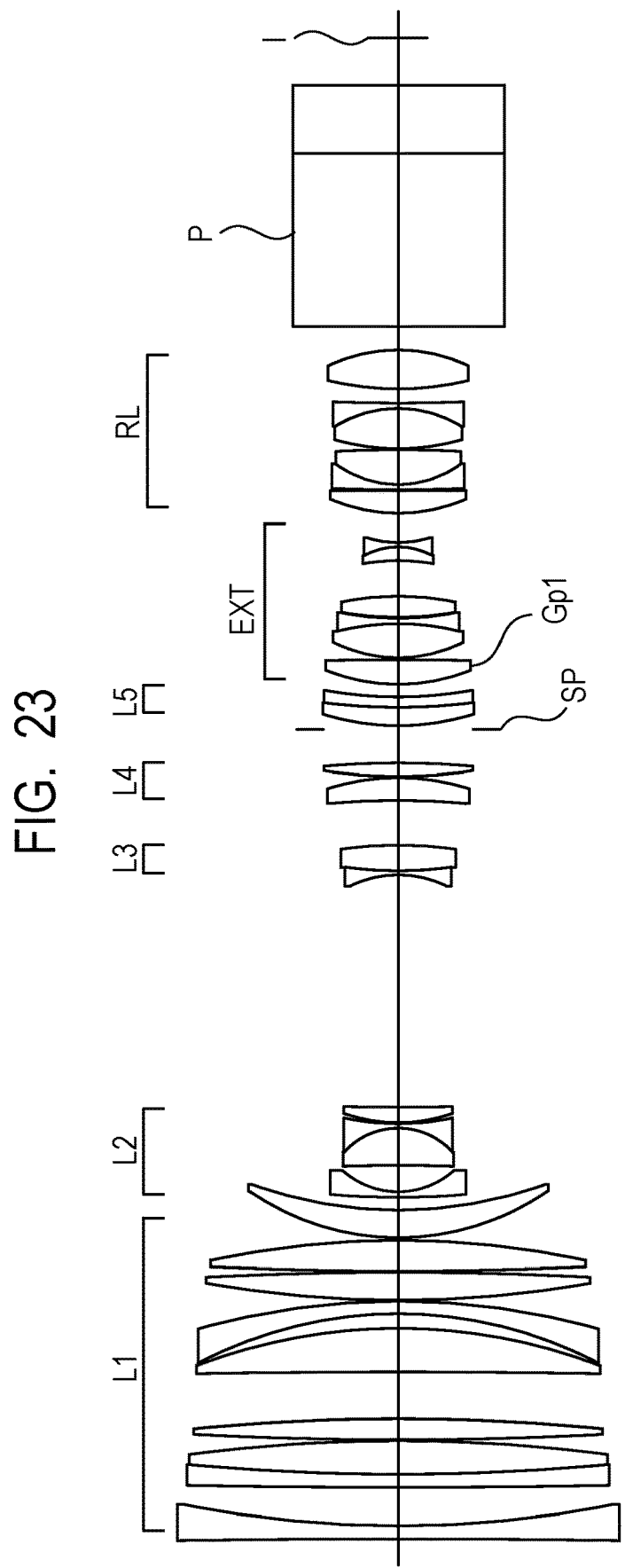
FIG. 23 is a lens cross-sectional view when an extender lens unit IE8 is inserted into the master lens M1 in Example 8 (Numerical Example 8) of the present invention and focus is at an object at infinity at the wide angle end.

Example 8 corresponds to Numerical Example 8, and has a lens configuration in which an extender lens unit IE8 is inserted into the master lens M1. FIG. 23 is a cross-sectional view when the extender lens unit IE8 is inserted into the master lens M1 and focus is at an object at infinity at a wide angle end in a zoom lens according to Example 8 (Numerical Example 8) of the present invention.

Figure 24A:
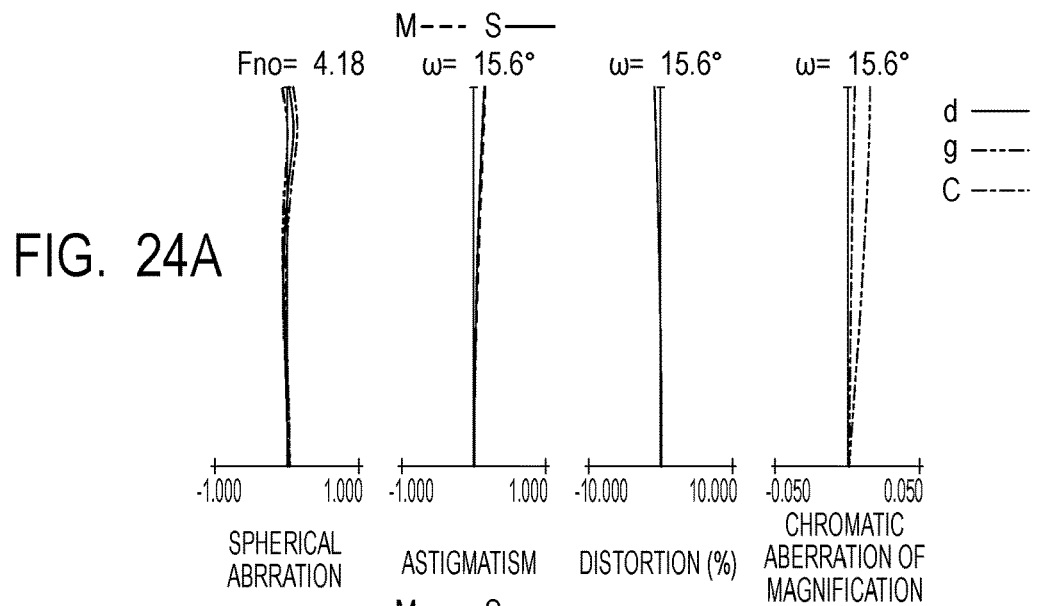
FIG. 24A is an aberration diagram when the extender lens unit IE8 is inserted into the master lens M1 in Numerical Example 8 and focus is at an object at infinity at the wide angle end.
Figure 24B:
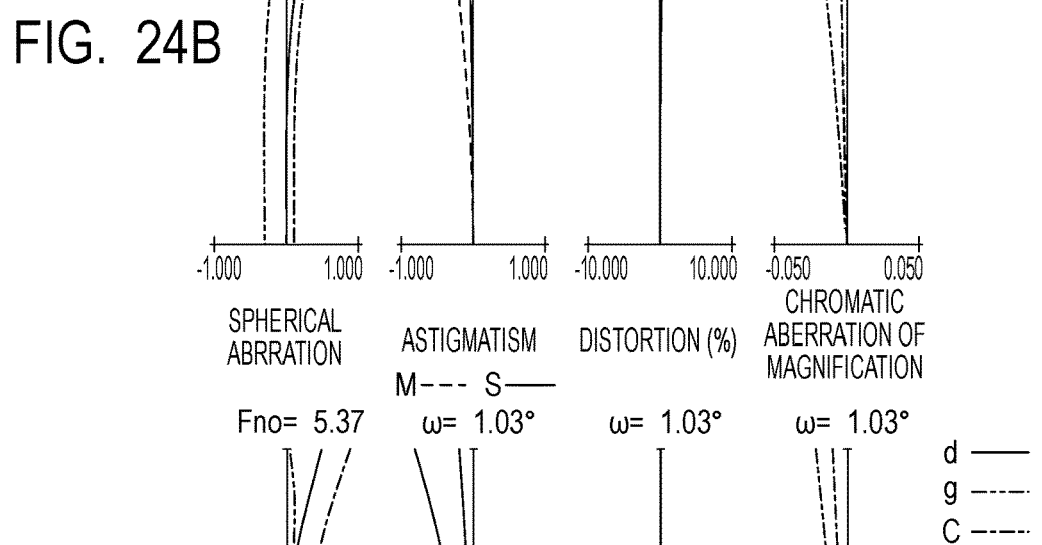
FIG. 24B is an aberration diagram when the extender lens unit IE8 is inserted into the master lens M1 in Numerical Example 8 and focus is at an object at infinity at the intermediate zoom position.
Figure 24C:
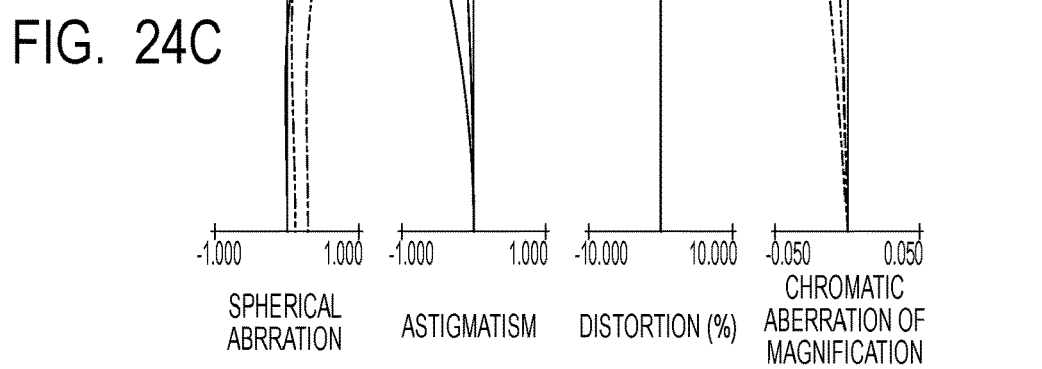
FIG. 24C is an aberration diagram when the extender lens unit IE8 is inserted into the master lens M1 in Numerical Example 8 and focus is at an object at infinity at the telephoto end.

The extender lens unit IE8 in Example 8 corresponds to the surface numbers IE01 to IE10, and consists of, in order from the object side, a positive lens (Gp1) being a positive lens Gp, a positive lens, a cemented lens of a positive lens and a negative lens, a positive lens, and a cemented lens of a positive lens and a negative lens. FIG. 24A, FIG. 24B, and FIG. 24C are longitudinal aberration diagrams when focus is at an object at infinity at the wide angle end, at a focal length of 160.0 mm, and at a telephoto end, respectively. The zoom lens of Example 8 includes the extender lens unit having an extender magnification of 2.2×.

In Table 1, values corresponding to the respective conditional expressions in Numerical Example 8 are shown. Numerical Example 8 satisfies all of the conditional expressions (1) to (6) to suppress, despite the extender having a high magnification, the secondary spectrum of the axial chromatic aberration, and achieve high optical performance.

Example 9

Figure 25:
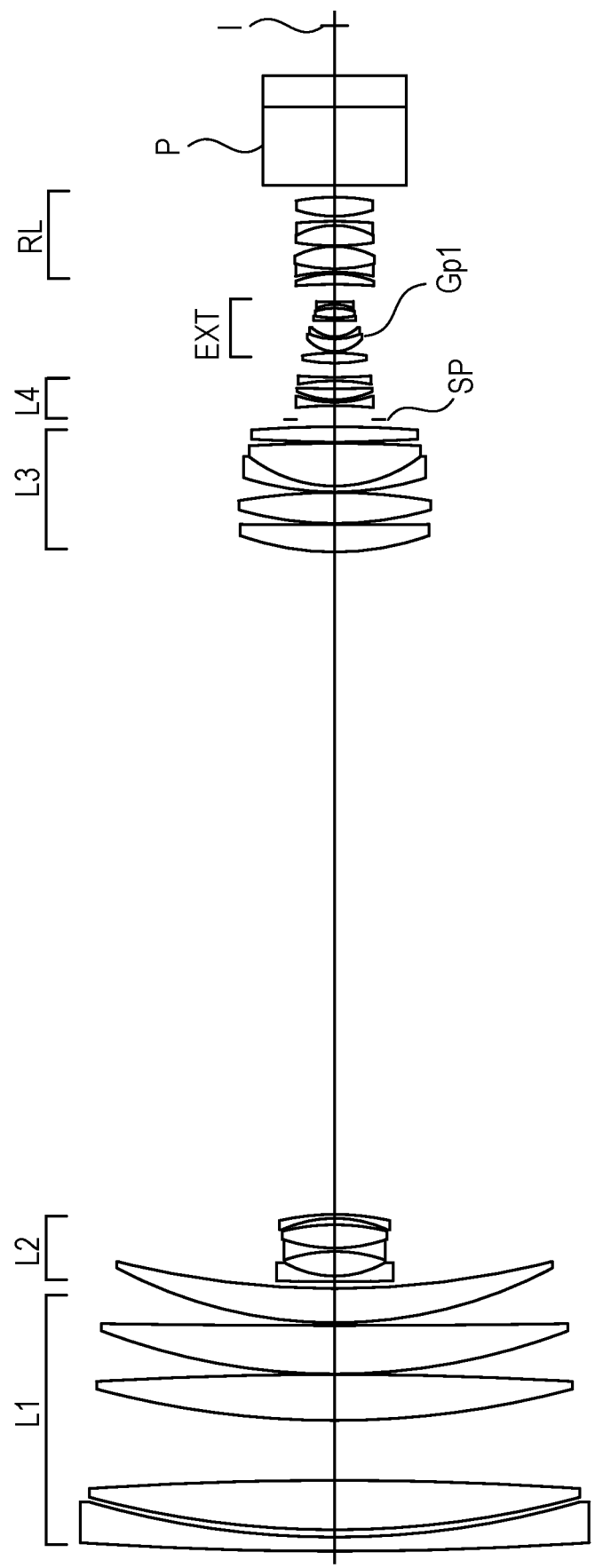
FIG. 25 is a lens cross-sectional view when an extender lens unit IE9 is inserted into the master lens M1 in Example 9 (Numerical Example 9) of the present invention and focus is at an object at infinity at the wide angle end.

Example 9 corresponds to Numerical Example 9, and has a lens configuration in which an extender lens unit IE9 is inserted into the master lens M3. FIG. 25 is a cross-sectional view when the extender lens unit IE9 is inserted into the master lens M3 and focus is at an object at infinity at a wide angle end in a zoom lens according to Example 9 (Numerical Example 9) of the present invention.

Figure 26A:
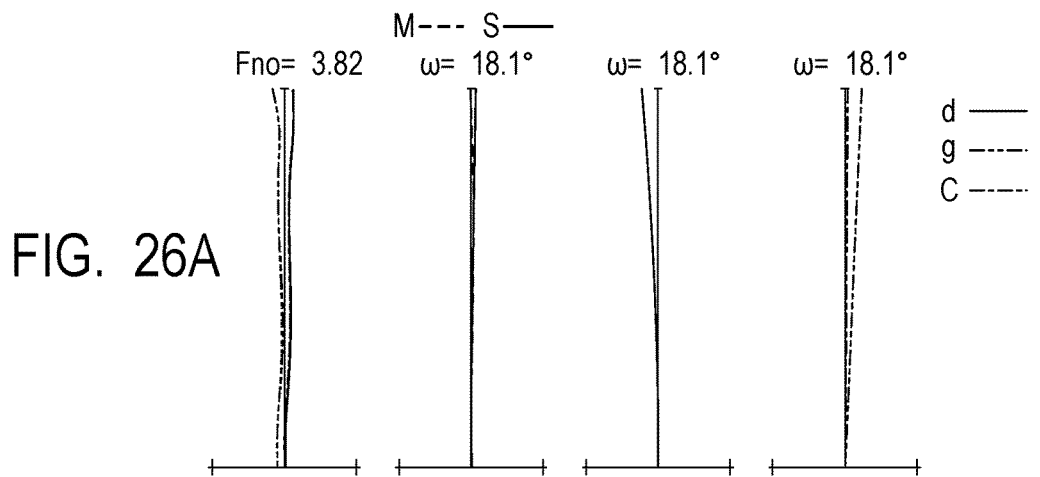
FIG. 26A is an aberration diagram when the extender lens unit IE9 is inserted into the master lens M1 in Numerical Example 9 and focus is at an object at infinity at the wide angle end.
Figure 26B:
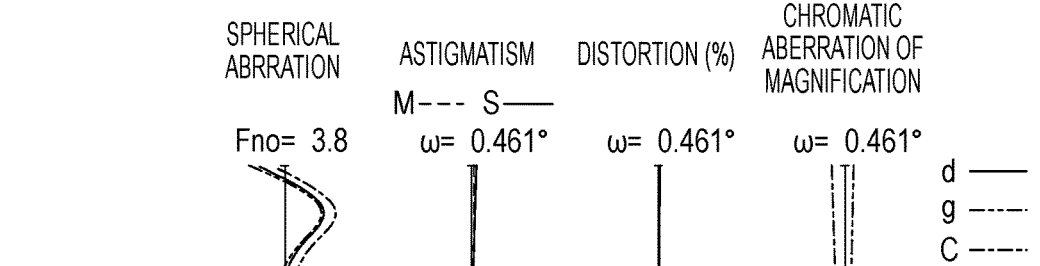
FIG. 26B is an aberration diagram when the extender lens unit IE9 is inserted into the master lens M1 in Numerical Example 9 and focus is at an object at infinity at the intermediate zoom position.
Figure 26C:
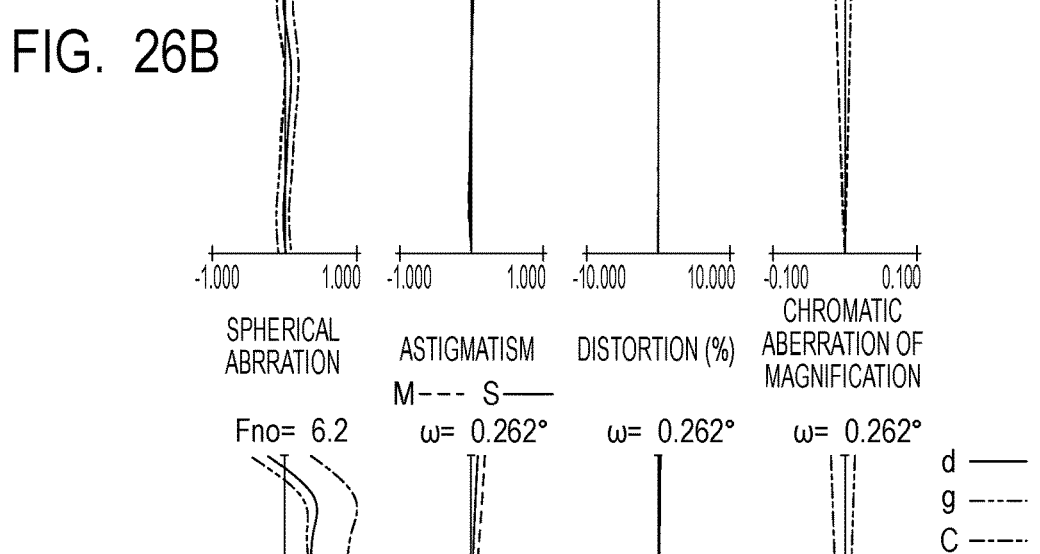
FIG. 26C is an aberration diagram when the extender lens unit IE9 is inserted into the master lens M1 in Numerical Example 9 and focus is at an object at infinity at the telephoto end.

The extender lens unit IE9 in Example 9 corresponds to the surface numbers IE01 to IE10, and consists of a positive lens, a cemented lens of a positive lens (Gp1) being a positive lens Gp and a negative lens, a cemented lens of a negative lens and a positive lens, and a negative lens. FIG. 26A, FIG. 26B, and FIG. 26C are longitudinal aberration diagrams when focus is at an object at infinity at the wide angle end, at a focal length of 682 mm, and a telephoto end, respectively. The zoom lens of Example 9 includes an extender lens unit having an extender magnification of 2.0×.

In Table 1, values corresponding to the respective conditional expressions in Numerical Example 9 are shown. Numerical Example 9 satisfies all of the conditional expressions (1) to (6) to suppress, despite the extender having a high magnification, the secondary spectrum of the axial chromatic aberration, and achieve high optical performance.

Example 10

Example 10 corresponds to Numerical Example 10, and has a configuration in which an extender lens unit IE10 is inserted into the master lens M4.

First, the master lens M4 corresponding to Numerical Example 4 is described. FIG. 7 is a lens cross-sectional view of the master lens M4 when focus is at an object at infinity at a wide angle end. A first lens unit L1 having a positive refractive power is configured not to move for zooming. A part of lens sub-units included in the first lens unit L1 is configured to move during focusing from the object at infinity to the object at close distance. A second lens unit L2 having a negative refractive power for zooming is configured to move toward the image side during zooming from the wide angle end (short focal length end) to a telephoto end (long focal length end). A third lens unit L3 having a positive refractive power for zooming is configured to move on the optical axis during zooming from the wide angle end to the telephoto end. A fourth lens unit L4 having a negative refractive power for zooming is configured to move on the optical axis during zooming from the wide angle end to the telephoto end. A fifth lens unit L5 having a positive refractive power is configured to correct an image plane variation accompanying zooming. A positive sixth lens unit L6 includes an aperture stop SP configured not to move during zooming, and is configured not to move during zooming. A relay lens unit RL is configured not to move during zooming, and has an image forming action. An optical element P is a prism, for example. An image plane I corresponds to an image pickup surface of a solid-state image pickup element (photoelectric transducer).

Figure 8A:
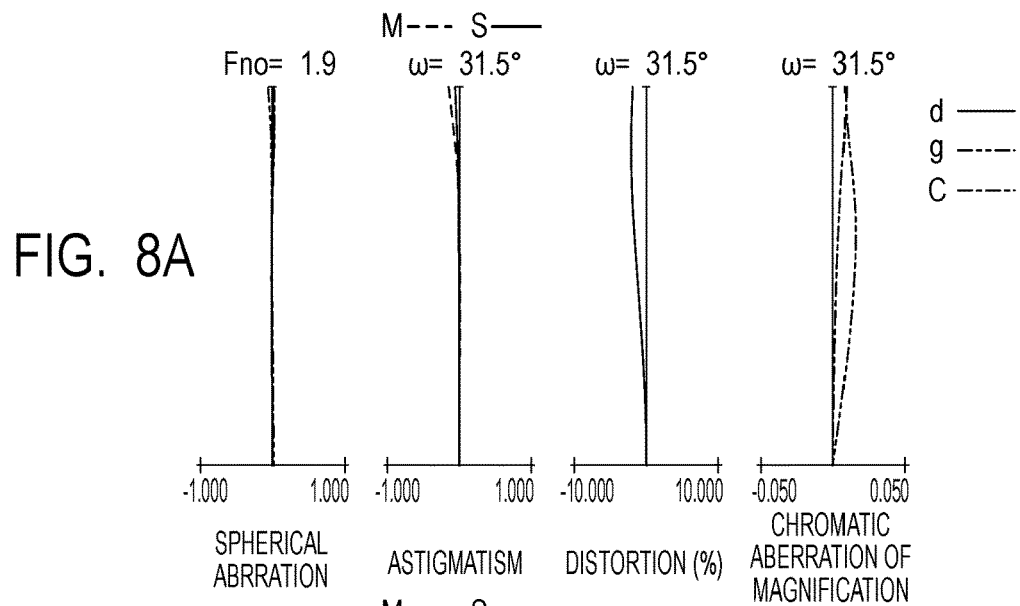
FIG. 8A is an aberration diagram of the master lens M4 when focus is at an object at infinity at the wide angle end.
Figure 8B:
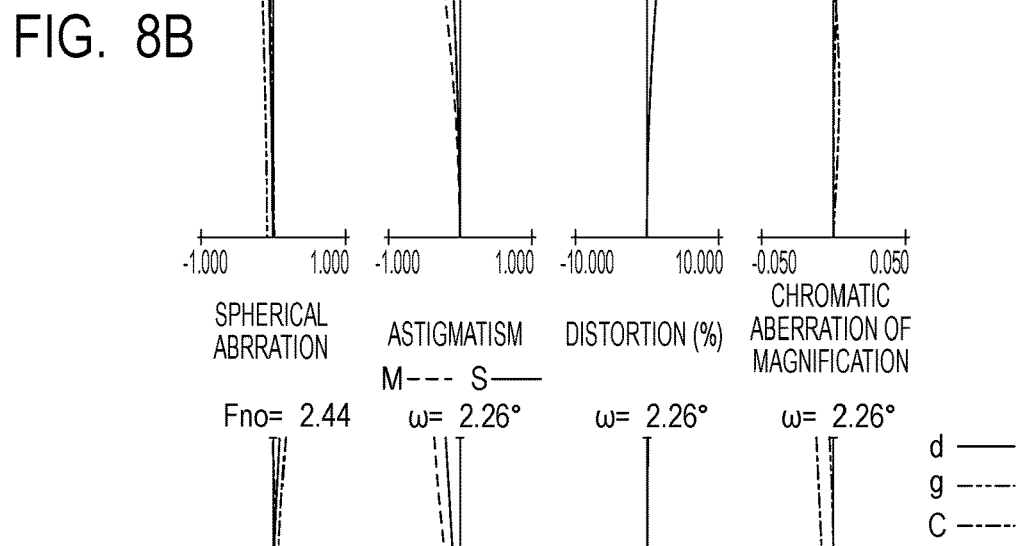
FIG. 8B is an aberration diagram of the master lens M4 when focus is at an object at infinity at an intermediate zoom position.
Figure 8C:
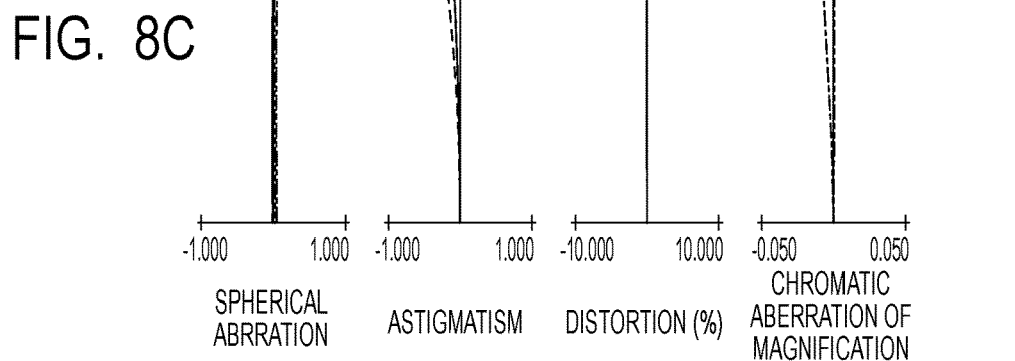
FIG. 8C is an aberration diagram of the master lens M4 when focus is at an object at infinity at a telephoto end.

Next, a configuration of each lens unit of the master lens M4 is described. In the following, the lenses are arranged in order from the object side to the image side. The first lens unit L1 consists of nine lenses of a negative lens, a negative lens, a positive lens, a positive lens, a positive lens, a negative lens, a positive lens, a positive lens, and a positive lens. During focusing, four lenses, namely, the fifth to eighth lenses of the first lens unit from the object side move toward the object side during focusing from the object at infinity to the object at close distance, and one positive lens closest to the image side moves toward the object side along with the movement. The second lens unit L2 consists of a negative lens, a cemented lens of a positive lens and a negative lens, and a positive lens. The fourth lens unit L4 consists of a cemented lens of a negative lens and a positive lens. The fifth lens unit L5 consists of a positive lens and a positive lens. During zooming, the second lens unit, the third lens unit, the fourth lens unit, and the fifth lens unit move. The sixth lens unit L6 consists of a cemented lens of a positive lens and a negative lens. The relay lens unit RL consists of a positive lens, a cemented lens of a negative lens and a positive lens, a cemented lens of a positive lens and a negative lens, and a positive lens. FIG. 8A, FIG. 8B, and FIG. 8C are longitudinal aberration diagrams of the master lens M4 when focus is at an object at infinity at the wide angle end, at a focal length of 33.3 mm, and at the telephoto end, respectively.

Figure 27:
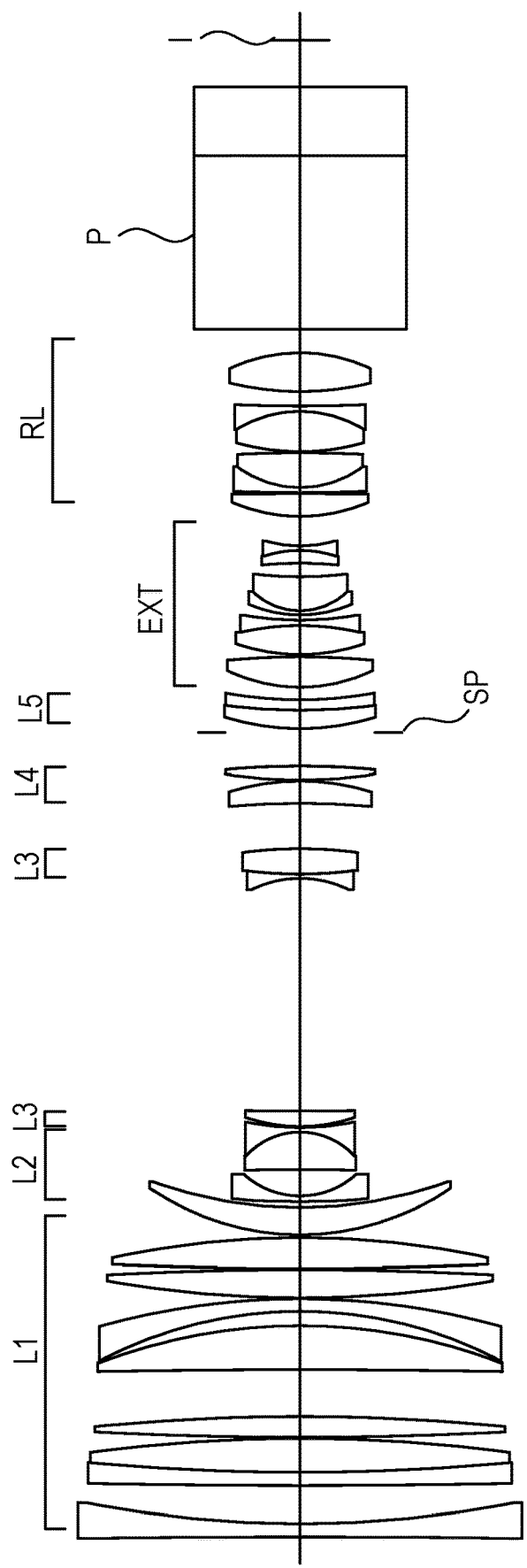
FIG. 27 is a lens cross-sectional view when an extender lens unit IE10 is inserted into the master lens M4 in Example 10 (Numerical Example 10) of the present invention and focus is at an object at infinity at the wide angle end.
Figure 28A:
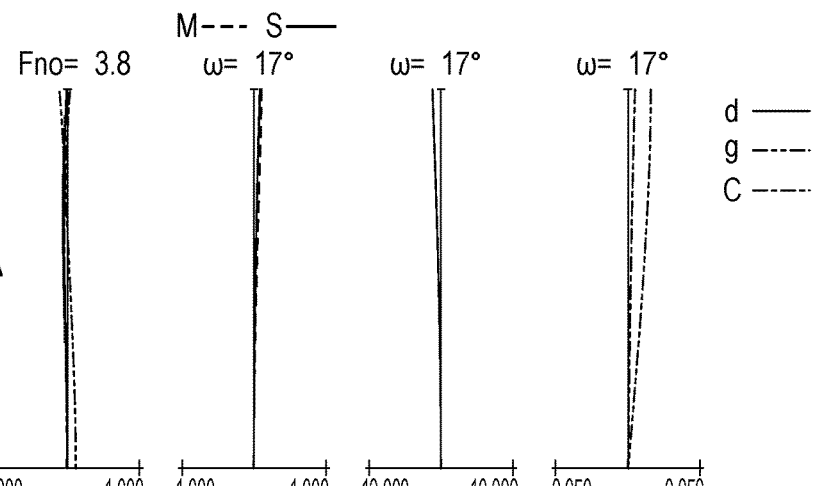
FIG. 28A is an aberration diagram when the extender lens unit IE10 is inserted into the master lens M4 in Numerical Example 10 and focus is at an object at infinity at the wide angle end.
Figure 28B:
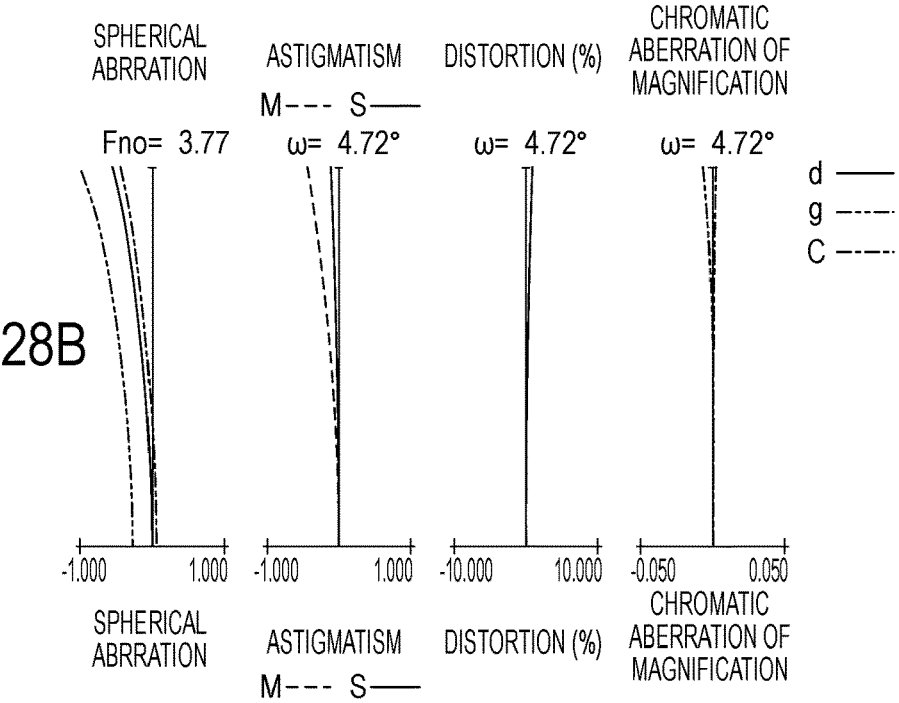
FIG. 28B is an aberration diagram when the extender lens unit IE10 is inserted into the master lens M4 in Numerical Example 10 and focus is at an object at infinity at the intermediate zoom position.
Figure 28C:
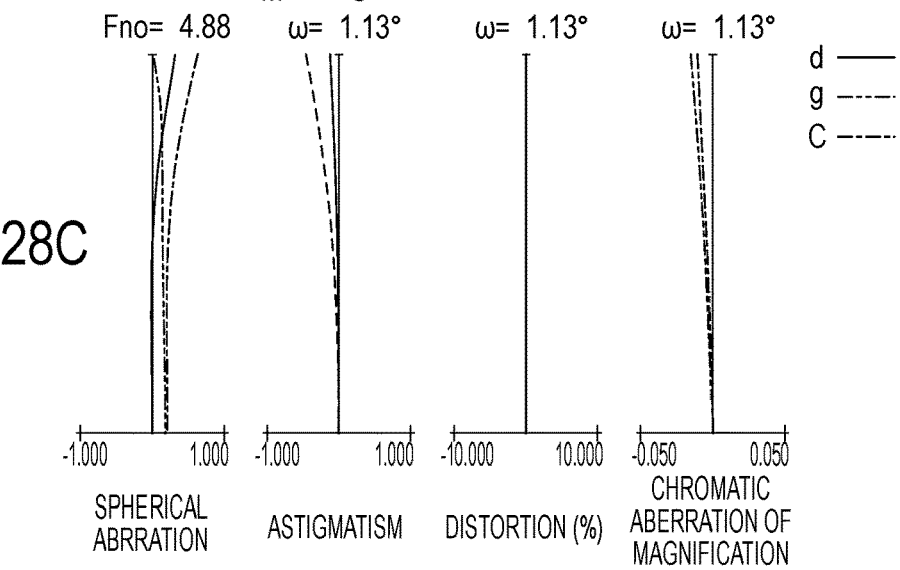
FIG. 28C is an aberration diagram when the extender lens unit IE10 is inserted into the master lens M4 in Numerical Example 10 and focus is at an object at infinity at the telephoto end.

Next, the extender lens unit IE10 configured to increase the focal length of the entire system of the zoom lens to double by being inserted on the object side of the relay lens unit RL of the master lens M4 is described. FIG. 27 is a cross-sectional view when the extender lens unit IE10 is inserted into the master lens M4 and focus is at an object at infinity at the wide angle end in a zoom lens according to Example 10 (Numerical Example 10) of the present invention. The extender lens unit IE10 in Example 10 corresponds to the surface numbers IE01 to IE11, and consists of, in order from the object side, a positive lens (Gp1) being a positive lens Gp, a cemented lens of a positive lens and a negative lens, a cemented lens of a negative lens and a positive lens, and a cemented lens of a positive lens and a negative lens. FIG. 28A, FIG. 28B, and FIG. 28C are longitudinal aberration diagrams when focus is at an object at infinity at the wide angle end, at a focal length of 66.6 mm, and at the telephoto end, respectively. The zoom lens of Example 10 includes the extender lens unit having an extender magnification of 2.0×.

In Table 1, values corresponding to the respective conditional expressions in Numerical Example 10 are shown. Numerical Example 10 satisfies all of the conditional expressions (1) to (6) to suppress, despite the extender having a high magnification, the secondary spectrum of the axial chromatic aberration, and achieve high optical performance.

Figure 29:
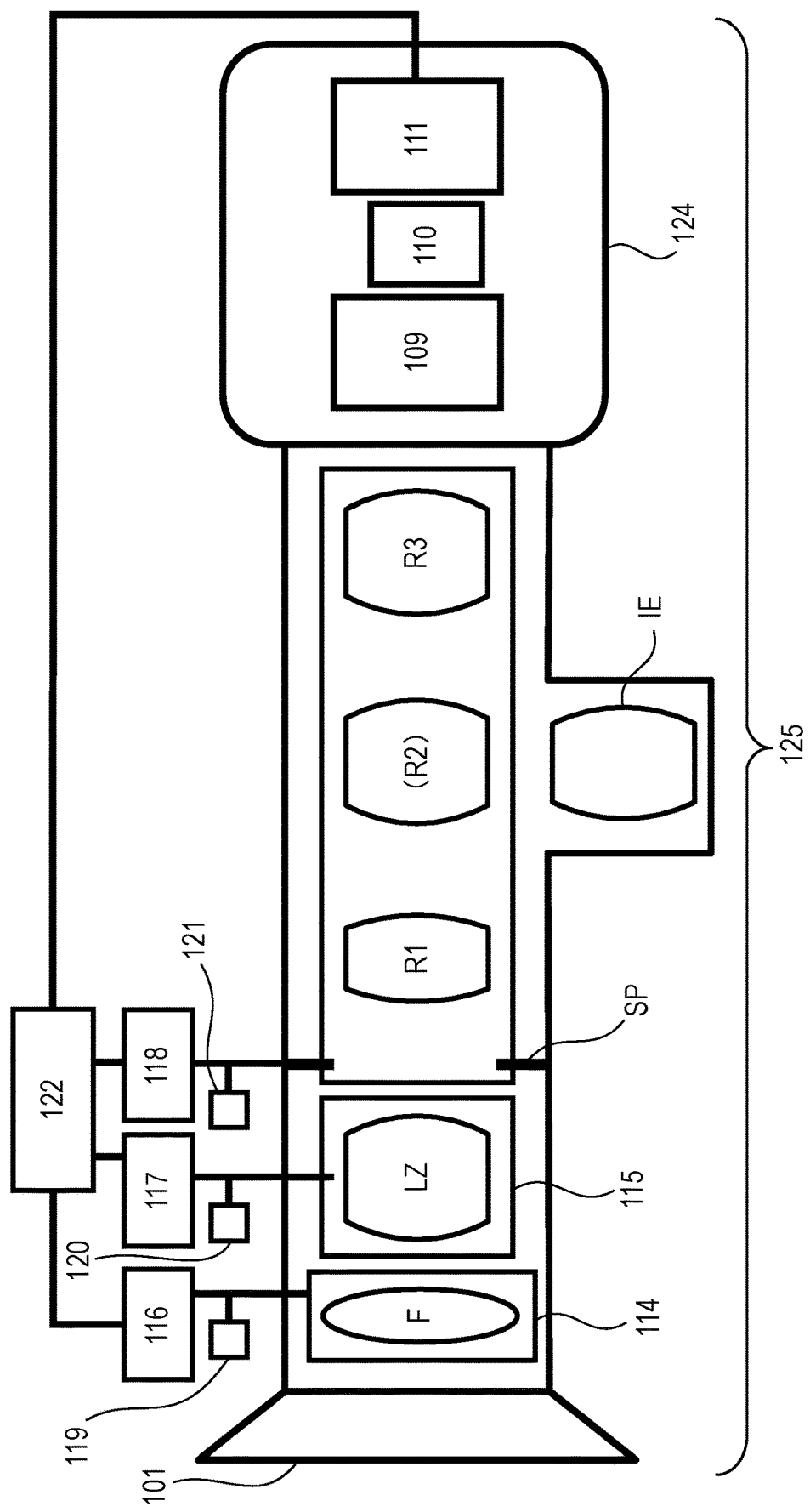
FIG. 29 is a schematic diagram of a main part of an image pickup apparatus according to at least one embodiment of the present invention.

FIG. 29 is a schematic diagram of a main part of an image pickup apparatus (television camera system) using the zoom lens according to any one of Examples 1 to 10 of the present invention as an image pickup optical system. A zoom lens 101 that is the zoom lens according to any one of Examples 1 to 5 is illustrated in FIG. 29. A camera 124 is illustrated in FIG. 29. The zoom lens 101 may be detachably mounted on the camera 124, to thereby construct an image pickup apparatus 125. The zoom lens 101 includes a first lens unit F, a zoom portion LZ, and a lens unit R for imaging. The first lens unit F includes a lens unit configured to move during focusing.

The zoom portion LZ includes at least two lens units configured to move during zooming. On the image side of the zoom portion LZ, an aperture stop SP, a lens unit R1, a lens unit R2, and a lens unit R3 are arranged, and the image pickup apparatus includes an extender lens unit IE, which can be inserted into and removed from an optical path. Switching between the lens unit R2 and the extender lens unit IE enables a focal length range of an entire system of the zoom lens 101 to be changed. Further, in Examples 6 and 7, the image pickup apparatus does not include the lens unit R2, and insertion of the extender lens unit IE into a space between the lens unit R1 and the lens unit R3 enables the focal length range to be changed. Drive mechanisms 114 and 115, such as a helicoid and a cam, drive the first lens unit F and the zoom portion LZ in an optical axis direction, respectively. Motors (drive units) 116 to 118 electrically drive the drive mechanism 114, the drive mechanism 115, and the aperture stop SP, respectively.

Detectors 119 to 121, such as an encoder, a potentiometer, or a photo-sensor, are configured to detect positions of the lens unit and the zoom portion LZ on the optical axis, and an aperture diameter of the aperture stop SP, for example. The camera 124 includes a glass block 109, which corresponds to an optical filter or a color separation optical system provided within the camera 124. Further, a solid-state image pickup element (photoelectric transducer) 110 such as a charge-coupled device (CCD) sensor or a complementary metal-oxide semiconductor (CMOS) sensor, which is arranged at the position of the image plane of the zoom lens 101, is configured to receive an object image formed by the zoom lens 101. Further, central processing units (CPUs) 111 and 122 control the driving of the camera 124 and the zoom lens 101 in a various manner.

By applying the zoom lens according to at least one embodiment of the present invention to a camera system as described above, the image pickup apparatus having the high optical performance may be achieved.

The exemplary embodiments of the present invention are described above, but the present invention is not limited to those embodiments and can be modified and changed variously within the scope of the gist thereof. For example, in the zoom lens including the built-in extender according to at least one embodiment of the present invention, even when the configuration of a focus lens part, the number of lens units and power arrangement of a zoom part, and the like differ from those in at least one embodiment of the present invention, such differences do not substantially affect the configuration of the extender lens unit.

Numerical Example

Unit: mm

Surface data
(Master lens M1)

| Surface number | R | d | nd | vd | θgF |
|---|---|---|---|---|---|
| 1 | −2,739.46495 | 2.50000 | 1.805181 | 25.42 | 0.6161 |
| 2 | 205.98989 | 7.29908 | | | |
| 3 | 2,126.26976 | 2.50000 | 1.800999 | 34.97 | 0.5864 |
| 4 | 431.78657 | 6.46485 | 1.433870 | 95.10 | 0.5373 |
| 5 | −294.19261 | 0.20000 | | | |
| 6 | 737.50581 | 4.00480 | 1.433870 | 95.10 | 0.5373 |
| 7 | −389.59651 | 8.96865 | | | |
| 8 | −1,996.14813 | 8.39539 | 1.433870 | 95.10 | 0.5373 |
| 9 | −105.23558 | 2.78371 | | | |
| 10 | −80.40014 | 2.40000 | 1.749505 | 35.33 | 0.5818 |
| 11 | −137.98129 | 0.15000 | | | |
| 12 | 205.74302 | 5.37081 | 1.595220 | 67.74 | 0.5442 |
| 13 | −688.44975 | 0.20000 | | | |
| 14 | 766.60665 | 5.88590 | 1.595220 | 67.74 | 0.5442 |
| 15 | −166.15828 | 0.47000 | | | |
| 16 | 49.47447 | 5.24681 | 1.763850 | 48.51 | 0.5587 |
| 17 | 80.44158 | (Variable) | | | |
| 18 | 250.56517 | 1.07000 | 2.003300 | 28.27 | 0.5980 |
| 19 | 15.75387 | 5.08366 | | | |
| 20 | −335.94788 | 7.12036 | 1.808095 | 22.76 | 0.6307 |
| 21 | −13.90882 | 0.81000 | 1.882997 | 40.76 | 0.5667 |
| 22 | 47.46254 | 0.23000 | | | |
| 23 | 31.14050 | 2.97701 | 1.761821 | 26.52 | 0.6136 |
| 24 | 525.00963 | (Variable) | | | |
| 25 | −20.49118 | 0.75000 | 1.756998 | 47.82 | 0.5565 |
| 26 | 72.11890 | 4.92901 | 1.846490 | 23.90 | 0.6217 |
| 27 | −76.69435 | (Variable) | | | |
| 28 | −137.79219 | 4.30182 | 1.639999 | 60.08 | 0.5370 |
| 29 | −43.89438 | 0.15000 | | | |
| 30 | 87.53367 | 2.63496 | 1.516330 | 64.14 | 0.5353 |
| 31 | −152.49568 | (Variable) | | | |
| 32 (Stop) | ∞ | 0.74000 | | | |
| 33 | 47.33141 | 3.50000 | 1.589130 | 61.14 | 0.5407 |
| 34 | 107.31103 | 2.00000 | 1.953750 | 32.32 | 0.5898 |
| 35 | 77.30381 | 35.00000 | | | |
| 36 | 32.16272 | 4.30491 | 1.487490 | 70.23 | 0.5300 |
| 37 | −9,350.34066 | 0.20000 | | | |
| 38 | 262.81490 | 1.00000 | 1.882997 | 40.76 | 0.5667 |
| 39 | 19.68393 | 6.72832 | 1.496999 | 81.54 | 0.5375 |
| 40 | −213.64163 | 0.17049 | | | |
| 41 | 43.24329 | 7.71355 | 1.548141 | 45.79 | 0.5686 |
| 42 | −22.79528 | 1.00000 | 1.882997 | 40.76 | 0.5667 |
| 43 | 280.97429 | 2.74860 | | | |
| 44 | 54.43612 | 7.49618 | 1.487490 | 70.23 | 0.5300 |
| 45 | −30.60306 | 4.50000 | | | |

-continued

Unit: mm

| | | | | | |
|---|---|---|---|---|---|
| 46 | ∞ | 33.00000 | 1.608590 | 46.44 | 0.5664 |
| 47 | ∞ | 13.20000 | 1.516330 | 64.14 | 0.5353 |
| 48 | ∞ | BF | | | |
| Image plane | | | | | |

Aspherical surface data
Eighteenth surface

K = 1.72144e+002  A4 = 9.19589e−006  A6 = −1.71369e−008
A8 = 5.48441e−011  A10 = −3.19872e−013  A12 = 7.81761e−016

Various data
Zoom ratio 15.50

| | Wide angle | Intermediate | Telephoto |
|---|---|---|---|
| Focal length | 8.97 | 72.71 | 139.09 |
| F-Number | 1.90 | 1.90 | 2.44 |
| Angle of view | 31.50 | 4.33 | 2.26 |
| Image height | 5.50 | 5.50 | 5.50 |
| Total lens length | 284.05 | 284.05 | 284.05 |
| BF | 7.20 | 7.20 | 7.20 |
| d17 | 1.17 | 45.05 | 49.93 |
| d24 | 44.48 | 5.48 | 4.40 |
| d27 | 8.62 | 9.82 | 2.22 |
| d31 | 6.38 | 0.29 | 4.10 |

Zoom lens unit data

| Unit | First surface | Focal length |
|---|---|---|
| 1 | 1 | 68.87 |
| 2 | 18 | −15.71 |
| 3 | 25 | −42.70 |
| 4 | 28 | 51.54 |
| 5 | 32 | 53.11 |

(Master lens M2)

| Surface number | R | d | nd | vd | θgF |
|---|---|---|---|---|---|
| 1 | 156.94333 | 16.05919 | 1.487490 | 70.23 | 0.5300 |
| 2 | −7,723.21351 | 1.00000 | | | |
| 3 | 163.33528 | 3.40000 | 1.729157 | 54.68 | 0.5444 |
| 4 | 103.98862 | 6.27512 | | | |
| 5 | 122.93423 | 20.71722 | 1.433870 | 95.10 | 0.5373 |
| 6 | −321.06737 | 1.50000 | | | |
| 7 | −263.29804 | 3.20000 | 1.729157 | 54.68 | 0.5444 |
| 8 | 217.24263 | 15.52121 | | | |
| 9 | 156.03224 | 16.09884 | 1.433870 | 95.10 | 0.5373 |
| 10 | −326.84519 | 0.20000 | | | |
| 11 | 139.50198 | 6.99161 | 1.433870 | 95.10 | 0.5373 |
| 12 | 228.87615 | (Variable) | | | |
| 13 | −7,969.42099 | 1.20000 | 1.772499 | 49.60 | 0.5520 |
| 14 | 29.88930 | 6.84679 | | | |
| 15 | −111.68860 | 1.00000 | 1.618000 | 63.33 | 0.5441 |
| 16 | 30.30066 | 7.74543 | 1.720467 | 34.71 | 0.5834 |
| 17 | −67.86327 | 3.09396 | | | |
| 18 | −33.69126 | 1.00000 | 1.618000 | 63.33 | 0.5441 |
| 19 | 381.19561 | 0.20000 | | | |
| 20 | 90.50828 | 2.65978 | 1.548141 | 45.79 | 0.5686 |
| 21 | 8,908.11473 | (Variable) | | | |
| 22 | −69.14204 | 1.00000 | 1.729157 | 54.68 | 0.5444 |
| 23 | 168.09200 | 3.44117 | 1.846660 | 23.78 | 0.6205 |
| 24 | −968.10542 | (Variable) | | | |
| 25 | 124.41442 | 6.23252 | 1.593490 | 67.00 | 0.5361 |
| 26 | −90.29165 | 1.00000 | | | |
| 27 | 47.97354 | 8.89529 | 1.618000 | 63.33 | 0.5441 |
| 28 | −142.42508 | 9.03019 | | | |
| 29 (Stop) | ∞ | 2.00000 | | | |
| 30 | 149.28153 | 7.23459 | 1.438750 | 94.93 | 0.5340 |
| 31 | −33.34714 | 1.20000 | 2.003300 | 28.27 | 0.5980 |
| 32 | 550.26602 | 7.00000 | | | |
| 33 | 95.05592 | 6.81963 | 1.567322 | 42.82 | 0.5731 |
| 34 | −41.26136 | 8.41339 | | | |
| 35 | −59.81298 | 1.20000 | 2.001000 | 29.13 | 0.5997 |
| 36 | 16.22581 | 6.84601 | 1.846660 | 23.78 | 0.6205 |

-continued

Unit: mm

| | | | | | |
|---|---|---|---|---|---|
| 37 | 137.33489 | 40.00000 | | | |
| 38 | 54.39197 | 6.90684 | 1.487490 | 70.23 | 0.5300 |
| 39 | −37.58128 | 3.00000 | | | |
| 40 | −131.67500 | 1.00000 | 1.834807 | 42.73 | 0.5648 |
| 41 | 51.85312 | 5.10607 | 1.728250 | 28.46 | 0.6077 |
| 42 | −63.45539 | 2.31578 | | | |
| 43 | −31.24271 | 1.00000 | 1.882997 | 40.76 | 0.5667 |
| 44 | 604.84283 | 4.42272 | 1.647689 | 33.79 | 0.5938 |
| 45 | −62.62557 | BF | | | |
| Image plane | | | | | |

Aspherical surface data

Thirteenth surface

K = 2.16213e+005  A4 = 2.41572e−006  A6 = 1.80376e−010
A8 = −2.94520e−012  A10 = −7.62036e−014  A12 = 7.98769e−016
A14 = −2.83869e−018  A16 = 3.65020e−021

Twenty-sixth surface

K = −3.17969e−001  A4 = 7.05385e−007  A6 = 3.09137e−010
A8 = −1.06097e−012  A10 = 3.24166e−015  A12 = −2.22180e−018
A14 = −4.33681e−021  A16 = 6.21800e−024

Various data
Zoom ratio 18.00

| | Wide angle | Intermediate | Telephoto |
|---|---|---|---|
| Focal length | 45.00 | 484.20 | 810.00 |
| F-Number | 4.50 | 4.50 | 6.91 |
| Angle of view | 18.21 | 1.75 | 1.05 |
| Image height | 14.80 | 14.80 | 14.80 |
| Total lens length | 450.00 | 450.00 | 450.00 |
| BF | 52.00 | 52.00 | 52.00 |
| d12 | 10.00 | 125.38 | 134.86 |
| d21 | 138.23 | 5.71 | 10.13 |
| d24 | 1.00 | 18.14 | 4.24 |

Zoom lens unit data

| Unit | First surface | Focal length |
|---|---|---|
| 1 | 1 | 216.70 |
| 2 | 13 | −30.00 |
| 3 | 22 | −111.70 |
| 4 | 25 | 55.00 |

(Master lens M3)

| Surface number | r | d | nd | vd | θgF |
|---|---|---|---|---|---|
| 1 | 1,571.41080 | 5.91470 | 1.903660 | 31.32 | 0.5946 |
| 2 | 361.49107 | 3.12774 | | | |
| 3 | 389.83081 | 20.85424 | 1.433870 | 95.10 | 0.5373 |
| 4 | −1,519.13423 | 25.29053 | | | |
| 5 | 379.38765 | 19.39696 | 1.433870 | 95.10 | 0.5373 |
| 6 | −1,690.05989 | 0.24645 | | | |
| 7 | 270.37586 | 20.45891 | 1.433870 | 95.10 | 0.5373 |
| 8 | 5,840.43446 | 1.18294 | | | |
| 9 | 190.77797 | 14.41139 | 1.592400 | 68.30 | 0.5456 |
| 10 | 365.54470 | (Variable) | | | |
| 11 | 11,015.73263 | 2.20000 | 2.003300 | 28.27 | 0.5980 |
| 12 | 41.06524 | 10.48694 | | | |
| 13 | −62.37712 | 1.40000 | 1.882997 | 40.76 | 0.5667 |
| 14 | 65.17588 | 9.87631 | 1.959060 | 17.47 | 0.6598 |
| 15 | −89.08747 | 2.72138 | | | |
| 16 | −51.90853 | 1.60000 | 1.834000 | 37.16 | 0.5776 |
| 17 | −103.31988 | (Variable) | | | |
| 18 | 115.18501 | 11.58196 | 1.592010 | 67.02 | 0.5357 |
| 19 | −2,087.69083 | 0.50000 | | | |
| 20 | 142.75791 | 13.07896 | 1.592010 | 67.02 | 0.5357 |
| 21 | −231.65488 | 0.20000 | | | |
| 22 | 122.79297 | 2.50000 | 1.805181 | 25.42 | 0.6161 |
| 23 | 57.71667 | 18.11494 | 1.433870 | 95.10 | 0.5373 |
| 24 | −564.23367 | 0.50000 | | | |
| 25 | 364.24571 | 6.50233 | 1.496999 | 81.54 | 0.5375 |

-continued

Unit: mm

| | | | | | |
|---|---|---|---|---|---|
| 26 | −414.83534 | (Variable) | | | |
| 27 (Stop) | ∞ | 5.88842 | | | |
| 28 | −147.17199 | 1.40000 | 1.816000 | 46.62 | 0.5568 |
| 29 | 46.92367 | 1.05463 | | | |
| 30 | 37.30299 | 4.69145 | 1.808095 | 22.76 | 0.6307 |
| 31 | 420.50067 | 3.36958 | | | |
| 32 | −76.04681 | 1.40000 | 1.882997 | 40.76 | 0.5667 |
| 33 | 191.16999 | (Variable) | | | |
| 34 | −41.22296 | 1.77937 | 1.651597 | 58.55 | 0.5425 |
| 35 | 580.47197 | 3.52067 | 1.805181 | 25.42 | 0.6161 |
| 36 | −156.41400 | 6.45739 | | | |
| 37 | −103.33214 | 5.70591 | 1.701536 | 41.24 | 0.5765 |
| 38 | −53.97854 | (Variable) | | | |
| 39 | −216.19358 | 4.48509 | 1.501372 | 56.42 | 0.5533 |
| 40 | −43.97315 | 0.74039 | | | |
| 41 | −72.58508 | 1.30098 | 1.882997 | 40.76 | 0.5667 |
| 42 | 61.01087 | 9.51251 | 1.501372 | 56.42 | 0.5533 |
| 43 | −35.67912 | 0.19980 | | | |
| 44 | 96.27220 | 8.68658 | 1.496999 | 81.54 | 0.5375 |
| 45 | −31.82223 | 1.70169 | 1.882997 | 40.76 | 0.5667 |
| 46 | −176.14343 | 2.14479 | | | |
| 47 | 50.45910 | 8.13736 | 1.487490 | 70.23 | 0.5300 |
| 48 | −79.75110 | 5.00000 | | | |
| 49 | ∞ | 33.00000 | 1.608590 | 46.44 | 0.5664 |
| 50 | ∞ | 13.20000 | 1.516330 | 64.15 | 0.5352 |
| 51 | ∞ | BF | | | |
| Image plane | | | | | |

Aspherical surface data

Eleventh surface

K = −2.61129e+006   A4 = 1.14924e−006   A6 = −4.20242e−010
A8 = 7.06050e−012   A10 = 1.71748e−014   A12 = −3.95143e−018
A14 = −2.50492e−020   A16 = 2.74832e−023   A3 = −7.41007e−007
A5 = −2.86209e−008   A7 = 4.68402e−011   A9 = −6.67517e−013
A11 = −2.87644e−016   A13 = 1.44174e−018   A15 = −1.26241e−021

Nineteenth surface

K = −8.09196e+003   A4 = 2.70610e−007   A6 = 1.07566e−009
A8 = −3.82716e−014   A10 = −1.89869e−016   A12 = 1.74435e−020
A14 = −2.31461e−023   A16 = 5.87253e−027   A3 = −1.02923e−007
A5 = −2.58308e−008   A7 = −1.15844e−011   A9 = 3.14187e−015
A11 = 2.64931e−018   A13 = 8.56747e−022   A15 = −2.81713e−025

Twenty-fifth surface

K = 6.92275e+001   A4 = −4.53959e−007   A6 = −6.59771e−011
A8 = −3.55842e−013   A10 = −1.48669e−016   A12 = 8.98957e−020
A14 = 6.50522e−022   A16 = 1.24233e−026   A3 = 7.06566e−007
A5 = −1.77804e−008   A7 = 3.13155e−011   A9 = 8.81552e−016
A11 = −1.46851e−017   A13 = 1.62371e−021   A15 = −1.37737e−023

Various data
Zoom ratio 69.98

| | Wide angle | Intermediate | Telephoto |
|---|---|---|---|
| Focal length | 8.60 | 341.65 | 601.79 |
| F-Number | 1.80 | 1.80 | 3.11 |
| Angle of view | 32.60 | 0.92 | 0.52 |
| Image height | 5.50 | 5.50 | 5.50 |
| Total lens length | 641.10 | 641.10 | 641.10 |
| BF | 18.00 | 18.00 | 18.00 |
| d10 | 3.03 | 178.18 | 184.56 |
| d17 | 279.71 | 41.91 | 15.69 |
| d26 | 3.00 | 65.65 | 85.49 |
| d33 | 11.30 | 11.30 | 11.30 |
| d38 | 10.53 | 10.53 | 10.53 |

Zoom lens unit data

| Unit | First surface | Focal length |
|---|---|---|
| 1 | 1 | 248.14 |
| 2 | 11 | −27.25 |
| 3 | 18 | 70.50 |
| 4 | 27 | −50.95 |

-continued

Unit: mm

| | | |
|---|---|---|
| 5 | 34 | −411.92 |
| 6 | 39 | 52.26 |

(Master lens M4)

| Surface number | r | d | nd | vd | θgF |
|---|---|---|---|---|---|
| 1 | −2,739.46495 | 2.50000 | 1.805181 | 25.42 | 0.6161 |
| 2 | 205.98989 | 7.29908 | | | |
| 3 | 2,126.26976 | 2.50000 | 1.800999 | 34.97 | 0.5864 |
| 4 | 431.78657 | 6.46485 | 1.433870 | 95.10 | 0.5373 |
| 5 | −294.19261 | 0.20000 | | | |
| 6 | 737.50581 | 4.00480 | 1.433870 | 95.10 | 0.5373 |
| 7 | −389.59651 | 8.96865 | | | |
| 8 | −1,996.14813 | 8.39539 | 1.433870 | 95.10 | 0.5373 |
| 9 | −105.23558 | 2.78371 | | | |
| 10 | −80.40014 | 2.40000 | 1.749505 | 35.33 | 0.5818 |
| 11 | −137.98129 | 0.15000 | | | |
| 12 | 205.74302 | 5.37081 | 1.595220 | 67.74 | 0.5442 |
| 13 | −688.44975 | 0.20000 | | | |
| 14 | 766.60665 | 5.88590 | 1.595220 | 67.74 | 0.5442 |
| 15 | −166.15828 | 0.47000 | | | |
| 16 | 49.47447 | 5.24681 | 1.763850 | 48.51 | 0.5587 |
| 17 | 80.44158 | (Variable) | | | |
| 18 | 250.56517 | 1.07000 | 2.003300 | 28.27 | 0.5980 |
| 19 | 15.75387 | 5.08366 | | | |
| 20 | −335.94788 | 7.12036 | 1.808095 | 22.76 | 0.6307 |
| 21 | −13.90882 | 0.81000 | 1.882997 | 40.76 | 0.5667 |
| 22 | 47.46254 | (Variable) | | | |
| 23 | 31.14050 | 2.97701 | 1.761821 | 26.52 | 0.6136 |
| 24 | 525.00963 | (Variable) | | | |
| 25 | −20.49118 | 0.75000 | 1.756998 | 47.82 | 0.5565 |
| 26 | 72.11890 | 4.92901 | 1.846490 | 23.90 | 0.6217 |
| 27 | −76.69435 | (Variable) | | | |
| 28 | −137.79219 | 4.30182 | 1.639999 | 60.08 | 0.5370 |
| 29 | −43.89438 | 0.15000 | | | |
| 30 | 87.53367 | 2.63496 | 1.516330 | 64.14 | 0.5353 |
| 31 | −152.49568 | (Variable) | | | |
| 32 (Stop) | ∞ | 0.74000 | | | |
| 33 | 47.33141 | 3.50000 | 1.589130 | 61.14 | 0.5407 |
| 34 | 107.31103 | 2.00000 | 1.953750 | 32.32 | 0.5898 |
| 35 | 77.30381 | 35.00000 | | | |
| 36 | 32.16272 | 4.30491 | 1.487490 | 70.23 | 0.5300 |
| 37 | −9,350.34066 | 0.20000 | | | |
| 38 | 262.81490 | 1.00000 | 1.882997 | 40.76 | 0.5667 |
| 39 | 19.68393 | 6.72832 | 1.496999 | 81.54 | 0.5375 |
| 40 | −213.64163 | 0.17049 | | | |
| 41 | 43.24329 | 7.71355 | 1.548141 | 45.79 | 0.5686 |
| 42 | −22.79528 | 1.00000 | 1.882997 | 40.76 | 0.5667 |
| 43 | 280.97429 | 2.74860 | | | |
| 44 | 54.43612 | 7.49618 | 1.487490 | 70.23 | 0.5300 |
| 45 | −30.60306 | 4.50000 | | | |
| 46 | ∞ | 33.00000 | 1.608590 | 46.44 | 0.5664 |
| 47 | ∞ | 13.20000 | 1.516330 | 64.14 | 0.5353 |
| 48 | ∞ | BF | | | |
| Image plane | | | | | |

Aspherical surface data
Eighteenth surface

K = 1.72144e+002   A4 = 9.19589e−006   A6 = −1.71369e−008
A8 = 5.48441e−011   A10 = −3.19872e−013   A12 = 7.81761e−016

Various data
Zoom ratio 15.50

| | Wide angle | Intermediate | Telephoto |
|---|---|---|---|
| Focal length | 8.97 | 33.31 | 139.09 |
| F-Number | 1.90 | 1.89 | 2.44 |
| Angle of view | 31.50 | 9.38 | 2.26 |
| Image height | 5.50 | 5.50 | 5.50 |
| Total lens length | 284.05 | 284.05 | 284.05 |
| BF | 7.20 | 7.20 | 7.20 |

-continued

| Unit: mm | | | |
|---|---|---|---|
| d17 | 1.17 | 34.40 | 49.93 |
| d22 | 0.23 | 0.91 | 0.23 |
| d24 | 44.48 | 11.01 | 4.40 |
| d27 | 8.62 | 12.22 | 2.22 |
| d31 | 6.38 | 2.34 | 4.10 |
| d48 | 7.20 | 7.20 | 7.20 |
| Entrance pupil position | 61.66 | 186.55 | 574.23 |
| Exit pupil position | 494.19 | 494.19 | 494.19 |
| Front principal point position | 70.80 | 222.14 | 753.04 |
| Rear principal point position | −1.77 | −26.11 | −131.89 |

Zoom lens unit data

| Unit | First surface | Focal length | Lens unit structure length | Front principal point position | Rear principal point position |
|---|---|---|---|---|---|
| 1 | 1 | 68.87 | 62.84 | 41.97 | −0.50 |
| 2 | 18 | −9.96 | 14.08 | 2.94 | −5.76 |
| 3 | 23 | 43.34 | 2.98 | −0.11 | −1.79 |
| 4 | 25 | −42.70 | 5.68 | −1.48 | −4.74 |
| 5 | 28 | 51.54 | 7.09 | 3.58 | −0.89 |
| 6 | 32 | 53.11 | 123.30 | 58.80 | −54.77 |

(Numerical Example 1) Master Lens M1+Extender Lens Unit IE1

Unit: mm

Surface data
(Extender lens unit IE1)

| Surface number | r | D | nd | νd | θgF | |
|---|---|---|---|---|---|---|
| 35 | 77.30381 | 2.41000 | | | | |
| IE01 | 31.53477 | 5.78333 | 1.594100 | 60.47 | 0.5551 | Gp1 |
| IE02 | −149.03266 | 0.40000 | | | | |
| IE03 | 40.73614 | 5.45596 | 1.595220 | 67.74 | 0.5442 | |
| IE04 | −48.40586 | 1.00000 | 1.846660 | 23.78 | 0.6205 | |
| IE05 | 63.93550 | 1.13930 | | | | |
| IE06 | 22.94771 | 0.80000 | 1.882997 | 40.76 | 0.5667 | |
| IE07 | 12.41842 | 6.28367 | 1.581439 | 40.75 | 0.5774 | |
| IE08 | 53.71007 | 2.58534 | | | | |
| IE09 | −61.71142 | 2.80540 | 1.922860 | 18.90 | 0.6495 | |
| IE10 | −20.91470 | 0.80000 | 1.882997 | 40.76 | 0.5667 | |
| IE11 | 21.97455 | 5.53700 | | | | |
| 36 | 32.16272 | 4.30491 | 1.487490 | 70.23 | 0.5300 | |

Various data
Zoom ratio 15.50

| | Wide angle | Intermediate | Telephoto |
|---|---|---|---|
| Focal length | 17.95 | 145.44 | 278.22 |
| F-Number | 3.79 | 3.79 | 4.89 |
| Angle of view | 17.04 | 2.17 | 1.13 |
| Image height | 5.50 | 5.50 | 5.50 |
| Total lens length | 284.05 | 284.05 | 284.05 |
| BF | 7.20 | 7.20 | 7.20 |

(Numerical Example 2) Master Lens M1+Extender Lens Unit IE2

Unit: mm

Surface data
(Extender lens unit IE2)

| Surface number | r | d | nd | νd | θgF | |
|---|---|---|---|---|---|---|
| 35 | 77.30381 | 2.41000 | | | | |
| IE01 | 27.99045 | 5.58866 | 1.610000 | 66.61 | 0.5897 | Gp1 |
| IE02 | 15,512.49274 | 0.40000 | | | | |
| IE03 | 31.43560 | 6.38521 | 1.639999 | 60.08 | 0.5370 | |
| IE04 | −57.38134 | 1.00000 | 1.892860 | 20.36 | 0.6393 | |
| IE05 | 85.30525 | 1.01564 | | | | |
| IE06 | 13.91892 | 0.80000 | 1.834810 | 42.74 | 0.5648 | |
| IE07 | 8.52343 | 5.04698 | 1.487490 | 70.23 | 0.5300 | |
| IE08 | 14.32059 | 3.72294 | | | | |
| IE09 | −34.11729 | 2.29358 | 1.959060 | 17.47 | 0.6598 | |
| IE10 | −13.46316 | 0.80000 | 1.882997 | 40.76 | 0.5667 | |
| IE11 | 19.93039 | 5.53700 | | | | |
| 36 | 32.16272 | 4.30491 | 1.487490 | 70.23 | 0.5300 | |

Various data
Zoom ratio 15.50

| | Wide angle | Intermediate | Telephoto |
|---|---|---|---|
| Focal length | 22.44 | 181.80 | 347.77 |
| F-Number | 4.74 | 4.74 | 6.11 |
| Angle of view | 13.77 | 1.73 | 0.91 |
| Image height | 5.50 | 5.50 | 5.50 |
| Total lens length | 284.05 | 284.05 | 284.05 |
| BF | 7.20 | 7.20 | 7.20 |

(Numerical Example 3) Master Lens M1+Extender Lens Unit IE3

Unit: mm

Surface data
(Extender lens unit IE3)

| Surface number | r | D | nd | νd | θgF | |
|---|---|---|---|---|---|---|
| 35 | 77.30381 | 2.44661 | | | | |
| IE01 | 69.09202 | 5.86031 | 1.481157 | 80.19 | 0.5451 | Gp1 |
| IE02 | −66.59456 | 0.40000 | | | | |
| IE03 | 29.50543 | 8.60316 | 1.639999 | 60.08 | 0.5370 | |
| IE04 | −44.00652 | 1.00000 | 1.846660 | 23.87 | 0.6205 | |
| IE05 | 86.18208 | 6.82578 | | | | |
| IE06 | −153.97598 | 3.57114 | 1.922860 | 18.90 | 0.6495 | |
| IE07 | −27.12142 | 0.80000 | 1.882997 | 40.76 | 0.5667 | |
| IE08 | 22.57559 | 5.49300 | | | | |
| 36 | 32.16272 | 4.30491 | 1.487490 | 70.23 | 0.5300 | |

Various data
Zoom ratio 15.50

| | Wide angle | Intermediate | Telephoto |
|---|---|---|---|
| Focal length | 16.15 | 130.89 | 250.39 |
| F-Number | 3.42 | 3.41 | 4.40 |
| Angle of view | 18.80 | 2.41 | 1.26 |
| Image height | 5.50 | 5.50 | 5.50 |
| Total lens length | 284.05 | 284.05 | 284.05 |
| BF | 7.20 | 7.20 | 7.20 |

(Numerical Example 4) Master Lens M1+Extender Lens Unit IE4

Unit: mm

Surface data (Extender lens unit IE4)

| Surface number | r | D | nd | vd | θgF | |
|---|---|---|---|---|---|---|
| 35 | 77.30381 | 2.37398 | | | | |
| IE01 | 65.86667 | 3.19875 | 1.650000 | 65.49 | 0.5451 | Gp1 |
| IE02 | 427.34126 | 0.20000 | | | | |
| IE03 | 63.29267 | 4.21003 | 1.516330 | 64.14 | 0.5353 | |
| IE04 | −110.07576 | 0.20000 | | | | |
| IE05 | 29.91226 | 5.90947 | 1.650000 | 65.49 | 0.5451 | Gp2 |
| IE06 | −48.31934 | 0.80000 | 1.854780 | 24.80 | 0.6122 | |
| IE07 | 45.60018 | 9.98277 | | | | |
| IE08 | −98.79867 | 2.32500 | 1.959060 | 17.47 | 0.6598 | |
| IE09 | −24.06690 | 0.80000 | 1.882997 | 40.76 | 0.5667 | |
| IE10 | 21.50669 | 5.00000 | | | | |
| 36 | 32.16272 | 4.30491 | 1.487490 | 70.23 | 0.5300 | |

Various data
Zoom ratio 15.50

| | Wide angle | Intermediate | Telephoto |
|---|---|---|---|
| Focal length | 17.95 | 145.40 | 278.15 |
| F-Number | 3.80 | 3.79 | 4.88 |
| Angle of view | 17.04 | 2.17 | 1.13 |
| Image height | 5.50 | 5.50 | 5.50 |
| Total lens length | 284.05 | 284.05 | 284.05 |
| BF | 7.20 | 7.20 | 7.20 |

(Numerical Example 5) Master Lens M2+Extender Lens Unit IE5

Unit: mm

Surface data (Extender lens unit IE5)

| Surface number | r | d | nd | vd | θgF | |
|---|---|---|---|---|---|---|
| 37 | 137.33489 | 5.00000 | | | | |
| IE01 | 17.63663 | 3.53145 | 1.481065 | 80.00 | 0.5491 | Gp1 |
| IE02 | 33.67235 | 5.00000 | | | | |
| IE03 | 331.44092 | 0.80000 | 2.001000 | 29.13 | 0.5997 | |
| IE04 | 14.54502 | 5.64466 | 1.673000 | 38.15 | 0.5754 | |
| IE05 | −70.37634 | 2.49195 | | | | |
| IE06 | −223.79035 | 0.80000 | 1.481065 | 80.00 | 0.5491 | |
| IE07 | 14.31874 | 6.92346 | 1.639799 | 34.46 | 0.5922 | |
| IE08 | −29.90251 | 4.00848 | | | | |
| IE09 | −21.37121 | 0.80000 | 1.772499 | 49.60 | 0.5520 | |
| IE10 | 56.79687 | 5.00000 | | | | |
| 48 | 54.39197 | 6.90684 | 1.487490 | 70.23 | 0.5300 | |

Various data
Zoom ratio 18.00

| | Wide angle | Intermediate | Telephoto |
|---|---|---|---|
| Focal length | 67.50 | 726.30 | 1,215.00 |
| F-Number | 6.75 | 6.75 | 10.37 |
| Angle of view | 12.37 | 1.17 | 0.70 |
| Image height | 14.80 | 14.80 | 14.80 |
| Total lens length | 450.00 | 450.00 | 450.00 |
| BF | 52.00 | 52.00 | 52.00 |
| d12 | 10.00 | 125.38 | 134.86 |
| d21 | 138.23 | 5.71 | 10.13 |
| d24 | 1.00 | 18.14 | 4.24 |

(Numerical Example 6) Master Lens M2+Extender Lens Unit IE6

Unit: mm

Surface data (Extender lens unit IE6)

| Surface number | r | d | nd | vd | θgF | |
|---|---|---|---|---|---|---|
| 37 | 137.33489 | 4.46226 | | | | |
| IE01 | 17.77968 | 2.85066 | 1.550000 | 56.79 | 0.5581 | Gp1 |
| IE02 | 25.74928 | 5.00000 | | | | |
| IE03 | −967.95250 | 0.80000 | 2.001000 | 29.13 | 0.5997 | |
| IE04 | 16.42054 | 4.45165 | 1.673000 | 38.15 | 0.5754 | |
| IE05 | −88.53934 | 4.64345 | | | | |
| IE06 | 108.84078 | 0.80000 | 1.438750 | 94.66 | 0.5340 | |
| IE07 | 18.35311 | 6.43038 | 1.639799 | 34.46 | 0.5922 | |
| IE08 | −33.73518 | 4.76159 | | | | |
| IE09 | −25.19707 | 0.80000 | 1.772499 | 49.60 | 0.5520 | |
| IE10 | 56.79687 | 5.00000 | | | | |
| 48 | 54.39197 | 6.90684 | 1.487490 | 70.23 | 0.5300 | |

Various data
Zoom ratio 18.00

| | Wide angle | Intermediate | Telephoto |
|---|---|---|---|
| Focal length | 63.00 | 677.88 | 1,134.00 |
| F-Number | 6.30 | 6.30 | 9.68 |
| Angle of view | 13.22 | 1.25 | 0.75 |
| Image height | 14.80 | 14.80 | 14.80 |
| Total lens length | 450.00 | 450.00 | 450.00 |
| BF | 52.00 | 52.00 | 52.00 |

(Numerical Example 7) Master Lens M3+Extender Lens Unit IE7

Unit: mm

Surface data (Extender lens unit IE7)

| Surface number | r | d | nd | vd | θgF | |
|---|---|---|---|---|---|---|
| 33 | 191.16999 | (Variable) | | | | |
| IE01 | 59.66665 | 4.21718 | 1.640000 | 66.08 | 0.5581 | Gp1 |
| IE02 | −98.37173 | 0.49901 | | | | |
| IE03 | 14.85066 | 6.11142 | 1.517417 | 52.43 | 0.5564 | |
| IE04 | 39.09070 | 1.00000 | 2.001000 | 29.13 | 0.5997 | |
| IE05 | 14.78268 | 6.68702 | | | | |
| IE06 | −151.54368 | 1.00000 | 1.953750 | 32.32 | 0.5898 | |
| IE07 | 88.96309 | 3.76110 | 1.805181 | 25.42 | 0.6161 | |
| IE08 | −24.32687 | 1.55033 | | | | |
| IE09 | −19.41823 | 1.00000 | 1.834810 | 42.74 | 0.5648 | |
| IE10 | 150.34659 | 7.46887 | | | | |
| 39 | −216.19358 | 4.48509 | 1.501372 | 56.42 | 0.5533 | |

| Unit: mm | | |
|---|---|---|
| Various data Zoom ratio 69.81 | | |
| | Wide angle | Intermediate | Telephoto |
| Focal length | 17.20 | 682.10 | 1,200.47 |
| F-Number | 3.81 | 3.79 | 6.20 |
| Angle of view | 17.74 | 0.46 | 0.26 |
| Image height | 5.50 | 5.50 | 5.50 |
| Total lens length | 641.08 | 641.08 | 641.08 |
| BF | 18.00 | 18.00 | 18.00 |

(Numerical Example 8) Master Lens M1+Extender Lens Unit IE8

Unit: mm

Surface data
(Extender lens unit IE8)

| Surface number | r | d | nd | νd | θgF | |
|---|---|---|---|---|---|---|
| 35 | 77.30381 | 2.41000 | | | | |
| IE01 | 36.31627 | 4.72681 | 1.650000 | 54.96 | 0.5784 | Gp1 |
| IE02 | −651.26620 | 0.40000 | | | | |
| IE03 | 26.81410 | 6.53372 | 1.537750 | 74.70 | 0.5392 | |
| IE04 | −47.56255 | 1.00000 | 2.000690 | 25.46 | 0.6133 | |
| IE05 | 51.37093 | 0.22749 | | | | |
| IE06 | 60.91837 | 4.01876 | 1.618000 | 63.33 | 0.5441 | |
| IE07 | −51.56085 | 6.79323 | | | | |
| IE08 | −34.23840 | 2.59700 | 1.922860 | 18.90 | 0.6495 | |
| IE09 | −13.11565 | 0.80000 | 1.882997 | 40.76 | 0.5667 | |
| IE10 | 19.54394 | 5.49300 | | | | |
| 36 | 32.16272 | 4.30491 | 1.487490 | 70.23 | 0.5300 | |

Various data
Zoom ratio 15.50

| | Wide angle | Intermediate | Telephoto |
|---|---|---|---|
| Focal length | 19.74 | 159.96 | 306.00 |
| F-Number | 4.18 | 4.17 | 5.37 |
| Angle of view | 15.57 | 1.97 | 1.03 |
| Image height | 5.50 | 5.50 | 5.50 |
| Total lens length | 284.05 | 284.05 | 284.05 |
| BF | 7.19 | 7.19 | 7.19 |

(Numerical Example 9) Master Lens M3+Extender Lens Unit IE9

Unit: mm

Surface data
(Extender lens unit IE9)

| | r | d | nd | νd | θgF | |
|---|---|---|---|---|---|---|
| 33 | 191.16999 | 5.99785 | | | | |
| IE01 | 64.51582 | 4.37179 | 1.516330 | 64.14 | 0.5353 | |
| IE02 | −75.97803 | 0.49843 | | | | |
| IE03 | 14.78005 | 5.28469 | 1.640000 | 66.08 | 0.5581 | Gp1 |
| IE04 | 26.57038 | 1.00000 | 2.001000 | 29.13 | 0.5997 | |
| IE05 | 13.69747 | 6.97763 | | | | |
| IE06 | −201.67746 | 1.00000 | 1.953750 | 32.32 | 0.5898 | |
| IE07 | 44.16083 | 4.12472 | 1.805181 | 25.42 | 0.6161 | |
| IE08 | −24.60014 | 1.56880 | | | | |

| Unit: mm | | | | | |
|---|---|---|---|---|---|
| IE09 | −18.37580 | 1.00000 | 1.834810 | 42.74 | 0.5648 |
| IE10 | 150.14504 | 7.46887 | | | |
| 34 | −216.19358 | 4.48509 | 1.501372 | 56.42 | 0.5533 |

Various data
Zoom ratio 69.81

| | Wide angle | Intermediate | Telephoto |
|---|---|---|---|
| Focal length | 17.20 | 682.27 | 1,200.76 |
| F-Number | 3.82 | 3.80 | 6.20 |
| Angle of view | 17.73 | 0.46 | 0.26 |
| Image height | 5.50 | 5.50 | 5.50 |
| Total lens length | 641.08 | 641.08 | 641.08 |
| BF | 17.98 | 17.98 | 17.98 |

(Numerical Example 10) Master Lens M4+Extender Lens Unit IE10

Unit: mm

Surface data
(Extender lens unit IE10)

| Surface number | r | d | nd | νd | θgF | |
|---|---|---|---|---|---|---|
| 35 | 77.30381 | 2.41000 | | | | |
| IE01 | 31.07282 | 5.88628 | 1.594100 | 60.47 | 0.5551 | Gp1 |
| IE02 | −136.45347 | 0.40000 | | | | |
| IE03 | 36.67646 | 5.54283 | 1.537750 | 74.70 | 0.5392 | |
| IE04 | −50.04380 | 1.00000 | 1.846660 | 23.78 | 0.6205 | |
| IE05 | 58.39910 | 0.99996 | | | | |
| IE06 | 24.19030 | 0.80000 | 1.882997 | 40.76 | 0.5667 | |
| IE07 | 12.76110 | 6.52549 | 1.581439 | 40.75 | 0.5774 | |
| IE08 | 70.28877 | 2.64566 | | | | |
| IE09 | −65.28024 | 2.45279 | 1.922860 | 18.90 | 0.6495 | |
| IE10 | −20.97337 | 0.80000 | 1.882997 | 40.76 | 0.5667 | |
| IE11 | 21.97455 | 5.53700 | | | | |
| 36 | 32.16272 | 4.30491 | 1.487490 | 70.23 | 0.5300 | |

Various data
Zoom ratio 15.50

| | Wide angle | Intermediate | Telephoto |
|---|---|---|---|
| Focal length | 17.95 | 66.63 | 278.21 |
| F-Number | 3.80 | 3.77 | 4.88 |
| Angle of view | 17.04 | 4.72 | 1.13 |
| Image height | 5.50 | 5.50 | 5.50 |
| Total lens length | 284.04 | 284.04 | 284.04 |
| BF | 7.20 | 7.20 | 7.20 |

TABLE 1

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| | vd1 | 60.47 | 66.1 | 80.19 | 65.49 | 80 | 56.79 | 66.08 | 54.96 | 66.08 | 60.47 |
| | θgF1 | 0.5551 | 0.5897 | 0.5451 | 0.5451 | 0.5491 | 0.5581 | 0.5581 | 0.5784 | 0.5581 | 0.5551 |
| | vd2 | | | | 65.49 | | | | | | |
| | θgF2 | | | | 0.5451 | | | | | | |
| | Fw | 8.97 | 8.97 | 8.97 | 8.97 | 45 | 45 | 8.6 | 8.97 | 8.6 | 8.97 |
| | Fiew | 17.95 | 22.44 | 16.15 | 17.95 | 67.5 | 63 | 17.2 | 19.74 | 17.2 | 17.95 |
| | Lie | 27.05 | 27.05 | 27.06 | 27.62 | 30 | 30.54 | 25.83 | 27.22 | 25.83 | 27.05 |
| | LGp1 | 0 | 0 | 0 | 0 | 0 | 0 | 0 | 0 | 4.87 | 0 |
| Gp1 | Conditional Expression (1) | 0.006 | 0.047 | 0.012 | 0.002 | 0.016 | 0.005 | 0.015 | 0.022 | 0.015 | 0.006 |
| | Conditional Expression (2) | 0.5551 | 0.5897 | 0.5451 | 0.5451 | 0.5491 | 0.5581 | 0.5581 | 0.5784 | 0.5581 | 0.5551 |
| | Conditional Expression (3) | 60.47 | 66.1 | 80.19 | 65.49 | 80 | 56.79 | 66.08 | 54.96 | 66.08 | 60.47 |
| Gp2 | Conditional Expression (1) | | | | 0.002 | | | | | | |
| | Conditional Expression (2) | | | | 0.5451 | | | | | | |
| | Conditional Expression (3) | | | | 65.49 | | | | | | |
| | Conditional Expression (4) | 2.00 | 2.50 | 1.80 | 2.00 | 1.50 | 1.40 | 2.00 | 2.20 | 2.00 | 2.00 |
| | Conditional Expression (5) | 0 | 0 | 0 | 0 | 0 | 0 | 0 | 0 | 0.19 | 0 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-133622, filed Jul. 13, 2018, which is hereby incorporated by reference herein in its entirety.

What is claimed is:

1. A zoom lens comprising:
a master lens including in order from an object side to an image side:
a first lens unit having a positive refractive power and configured not to move for zooming;
a second lens unit having a negative refractive power and configured to move for zooming;
at least one lens unit configured to move for zooming; and
a relay lens unit having a positive refractive power and arranged closest to the image side; and
an extender lens unit configured to be insertable into or removable from an optical path of the zoom lens between the at least one lens unit and the relay lens unit to extend a focal length of the zoom lens by one of: being inserted in place of a lens unit arranged adjacent to the relay lens unit and being inserted into a space adjacent to the relay lens unit,
wherein the extender lens unit includes a positive lens Gp, and the positive lens Gp satisfies conditional expressions $$\theta gF - (-1.6650 \times 10^{-7} \cdot vd^3 + 5.2130 \times 10^{-5} \cdot vd^2 - 5.6560 \times 10^{-3} \cdot vd + 0.7370) > 0;$$

$$0.5450 < \theta gF; \text{ and}$$

$$50.0 < vd < 85.0,$$

where vd and θgF represent an Abbe number and a partial dispersion ratio of the positive lens Gp, respectively, and wherein an Abbe number vd and a partial dispersion ratio θgF of a material are expressed by expressions $$vd = (Nd-1)/(NF-NC); \text{ and}$$

$$\theta gF = (Ng-NF)/(NF-NC), \text{respectively},$$

where Ng, NF, NC, and Nd represent refractive indices of the material with respect to a g-line (wavelength of 435.8 nm), an F-line (wavelength of 486.1 nm), a C-line (wavelength of 656.3 nm), and a d-line (wavelength of 587.6 nm), respectively.

2. The zoom lens according to claim 1, wherein the zoom lens satisfies a conditional expression $$1.3 < fiew/fw < 3.0,$$

where fw represents a focal length of the master lens at a wide angle end, and fiew represents a focal length of the zoom lens at the wide angle end in a state in which the extender lens unit is inserted.

3. The zoom lens according to claim 1, wherein the zoom lens satisfies a conditional expression $$0 < LGp1/Lie < 0.4,$$

where Lie represents a distance from an apex of a surface of the extender lens unit closest to the object side to an apex of a surface of the extender lens unit closest to the image side, and LGp1 represents a distance from the apex of the surface closest to the object side to an apex of a surface on the object side of a positive lens Gp1, which is arranged closest to the object side of the positive lens Gp.

4. The zoom lens according to claim 1, wherein the extender lens unit consists of, in order from the object side to the image side, a positive lens and three cemented lenses.

5. The zoom lens according to claim 1, wherein the extender lens unit consists of, in order from the object side to the image side, at least one positive lens and two cemented lenses.

6. The zoom lens according to claim 1, wherein the extender lens unit consists of, in order from the object side to the image side, one positive lens, two cemented lenses, and one negative lens.

7. An image pickup apparatus comprising:
a zoom lens; and
an image pickup element configured to receive an image formed by the zoom lens, wherein the zoom lens comprising:
a master lens including in order from an object side to an image side:
a first lens unit having a positive refractive power and configured not to move for zooming;
a second lens unit having a negative refractive power and configured to move for zooming;
at least one lens unit configured to move for zooming; and
a relay lens unit having a positive refractive power and arranged closest to the image side; and
an extender lens unit configured to be insertable into or removable from an optical path of the zoom lens between the at least one lens unit and the relay lens unit to extend a focal length of the zoom lens by one of: being inserted in place of a lens unit arranged adjacent to the relay lens unit; and being inserted into a space adjacent to the relay lens unit,
wherein the extender lens unit includes a positive lens Gp, and the positive lens Gp satisfies conditional expressions $\theta gF-(-1.6650\times10^{-7}\cdot vd^3+5.2130\times10^{-5}\cdot vd^2-5.6560\times10^{-3}\cdot vd+0.7370)>0;$ $0.5450<\theta gF;$ and $50.0<vd<85.0,$ where $vd$ and $\theta gF$ represent an Abbe number and a partial dispersion ratio of the positive lens (Gp), respectively, and
wherein an Abbe number $vd$ and a partial dispersion ratio $\theta gF$ of a material are expressed by expressions $vd=(Nd-1)/(NF-NC);$ and $\theta gF=(Ng-NF)/(NF-NC),$ respectively, where Ng, NF, NC, and Nd represent refractive indices of the material with respect to a g-line (wavelength of 435.8 nm), an F-line (wavelength of 486.1 nm), a C-line (wavelength of 656.3 nm), and a d-line (wavelength of 587.6 nm), respectively.

8. An extender lens unit configured to be insertable into or removable from an optical path of an image pickup apparatus to extend a focal length of the image pickup apparatus,
wherein the extender lens unit includes a positive lens Gp, and the positive lens Gp satisfies conditional expressions $\theta gF-(-1.6650\times10-7\cdot vd3+5.2130\times10-5\cdot vd2-5.6560\times10-3\cdot vd+0.7370)>0;$ $0.5450<\theta gF;$ and $50.0<vd<85.0,$ where $vd$ and $\theta gF$ represent an Abbe number and a partial dispersion ratio of the positive lens Gp, respectively, and
wherein an Abbe number $vd$ and a partial dispersion ratio $\theta gF$ of a material are expressed by expressions $vd=(Nd-1)/(NF-NC);$ and $\theta gF=(Ng-NF)/(NF-NC),$ respectively, where Ng, NF, NC, and Nd represent refractive indices of the material with respect to a g-line (wavelength of 435.8 nm), an F-line (wavelength of 486.1 nm), a C-line (wavelength of 656.3 nm), and a d-line (wavelength of 587.6 nm), respectively.

9. The extender lens unit according to claim 8, wherein the extender lens unit satisfies a conditional expression $1.3<fiew/fw<3.0,$ where fw represents a focal length of a master lens, and fiew represents a focal length of the image pickup apparatus in a state in which the extender lens unit is inserted into the optical path.

10. The extender lens unit according to claim 8, wherein the extender lens unit satisfies a conditional expression $0<LGp1/Lie<0.4,$ where Lie represents a distance from an apex of a surface of the extender lens unit closest to an object side to an apex of a surface of the extender lens unit closest to an image side, and LGp1 represents a distance from the apex of the surface closest to the object side to an apex of a surface on the object side of a positive lens Gp1, which is arranged closest to the object side of the positive lens Gp.

11. The extender lens unit according to claim 8, wherein the extender lens unit consists of, in order from an object side to an image side, a positive lens and three cemented lenses.

12. The extender lens unit according to claim 1, wherein the extender lens unit consists of, in order from the object side to the image side, at least one positive lens and two cemented lenses.

13. The extender lens unit according to claim 1, wherein the extender lens unit consists of, in order from the object side to the image side, one positive lens, two cemented lenses, and one negative lens.

14. An image pickup apparatus comprising:
an extender lens unit; and
an image pickup element configured to receive an image formed via the extender lens unit,
wherein the extender lens unit includes a positive lens Gp, and the positive lens Gp satisfies conditional expressions $\theta gF-(-1.6650\times10-7\cdot vd3+5.2130\times10-5\cdot vd2-5.6560\times10-3\cdot vd+0.7370)>0;$ $0.5450<\theta gF;$ and $50.0<vd<85.0,$ where $vd$ and $\theta gF$ represent an Abbe number and a partial dispersion ratio of the positive lens Gp, respectively, and
wherein an Abbe number $vd$ and a partial dispersion ratio $\theta gF$ of a material are expressed by expressions $vd=(Nd-1)/(NF-NC);$ and $\theta gF=(Ng-NF)/(NF-NC),$ respectively, where Ng, NF, NC, and Nd represent refractive indices of the material with respect to a g-line (wavelength of 435.8 nm), an F-line (wavelength of 486.1 nm), a C-line (wavelength of 656.3 nm), and a d-line (wavelength of 587.6 nm), respectively.

* * * * *